(12) United States Patent
Heppe

(10) Patent No.: US 9,139,279 B2
(45) Date of Patent: Sep. 22, 2015

(54) SYSTEMS AND METHODS FOR LONG ENDURANCE AIRSHIP OPERATIONS

(71) Applicant: Stephen B. Heppe, Hood River, OR (US)

(72) Inventor: Stephen B. Heppe, Hood River, OR (US)

(73) Assignee: STRATOSPHERIC AIRSHIPS, LLC, Hood River, OR (US)

( * ) Notice: Subject to any disclaimer, the term of this patent is extended or adjusted under 35 U.S.C. 154(b) by 659 days.

(21) Appl. No.: 13/623,757

(22) Filed: Sep. 20, 2012

(65) Prior Publication Data

US 2013/0037650 A1   Feb. 14, 2013

Related U.S. Application Data

(63) Continuation-in-part of application No. 13/228,212, filed on Sep. 8, 2011, now Pat. No. 8,668,161, which is a continuation-in-part of application No. 13/159,215, filed on Jun. 13, 2011, now Pat. No. 8,864,063, and a continuation-in-part of application No. 13/048,625, filed on Mar. 15, 2011, application No. 13/623,757, which is a continuation-in-part of application No. 13/227,966, filed on Sep. 8, 2011, now Pat. No. 8,678,309, which is a continuation-in-part of application No. 13/159,215, filed on Jun. 13, 2011, now Pat. No. 8,864,063, and a continuation-in-part of application No. 13/048,625, filed on Mar. 15, 2011.

(51) Int. Cl.
*B64C 37/02* (2006.01)
*B64B 1/54* (2006.01)

(52) U.S. Cl.
CPC .. *B64B 1/54* (2013.01); *B64C 37/02* (2013.01)

(58) Field of Classification Search
USPC ................ 244/24, 29, 30, 31, 33, 96, 97, 115
See application file for complete search history.

(56) References Cited

U.S. PATENT DOCUMENTS

| 1,549,061 | A |   | 5/1923 | Chenu |
|---|---|---|---|---|
| 1,372,924 | A |   | 3/1929 | Anderson |
| 1,818,138 | A |   | 8/1931 | Howland |
| 2,471,599 | A | * | 5/1949 | Young .............................. 244/2 |

(Continued)

FOREIGN PATENT DOCUMENTS

| GB | 2141088 A | 12/1984 |
|---|---|---|
| WO | 2005081680 A2 | 9/2005 |

OTHER PUBLICATIONS

U.S. Appl. No. 11/698,969, filed Jan. 26, 2007 entitled: "Modular airship system and method" published as US20080179453.

(Continued)

*Primary Examiner* — Justin Benedik
(74) *Attorney, Agent, or Firm* — Jeffrey K. Riddle; Van Cott, Bagley, Cornwall & McCarthy P.C.

(57) ABSTRACT

In one example, a long endurance airship system includes a payload airship and a first logistics airship mechanically joined to the payload airship to form a first combined airship, the payload airship and the logistics airship having design capabilities differing by at least a factor of two with regard to at least one of: power generation capability, propulsion capability, endurance capability, and lift capability, in which the first combined airship is free flying, lighter-than-air, and configured to maintain aloft for greater than 30 days without physical connection to the ground. Illustrative methods for long endurance airship operations are also provided.

42 Claims, 40 Drawing Sheets

(56) References Cited

U.S. PATENT DOCUMENTS

| | | | |
|---|---|---|---|
| 2,475,839 A * | 7/1949 | Jalbert | 244/24 |
| 2,863,618 A | 12/1958 | Doyle et al. | |
| 3,412,958 A * | 11/1968 | Struble, Jr. | 244/33 |
| 3,834,655 A * | 9/1974 | Crosby, Jr. | 244/135 R |
| 4,082,063 A | 4/1978 | Strickland | |
| 4,476,576 A * | 10/1984 | Wheeler et al. | 455/97 |
| 4,601,444 A * | 7/1986 | Lindenbaum | 244/26 |
| 4,995,572 A | 2/1991 | Piasecki | |
| 5,090,637 A * | 2/1992 | Haunschild | 244/97 |
| 5,857,645 A | 1/1999 | Hodgson | |
| 6,220,543 B1 | 4/2001 | Uskolovsky | |
| 6,224,015 B1 * | 5/2001 | Reinhard | 244/24 |
| 6,325,330 B1 * | 12/2001 | Lavan, Jr. | 244/33 |
| 6,422,506 B1 * | 7/2002 | Colby | 244/1 TD |
| 6,843,448 B2 * | 1/2005 | Parmley | 244/30 |
| 7,046,934 B2 * | 5/2006 | Badesha et al. | 398/121 |
| 7,055,777 B2 | 6/2006 | Colting | |
| 7,708,222 B2 | 5/2010 | Lee | |
| 8,061,648 B2 | 11/2011 | Lachenmeier | |
| 2004/0195431 A1 | 10/2004 | Yumlu et al. | |
| 2006/0000945 A1 * | 1/2006 | Voss | 244/97 |
| 2008/0087762 A1 * | 4/2008 | Holloman et al. | 244/30 |
| 2008/0179453 A1 | 7/2008 | Thompson | |
| 2008/0265086 A1 | 10/2008 | Lee | |
| 2009/0152391 A1 * | 6/2009 | McWhirk | 244/30 |
| 2012/0234964 A1 * | 9/2012 | Heppe | 244/2 |
| 2012/0234965 A1 * | 9/2012 | Heppe | 244/2 |
| 2012/0312918 A1 * | 12/2012 | Heppe | 244/30 |
| 2012/0312919 A1 * | 12/2012 | Heppe | 244/30 |
| 2013/0037650 A1 * | 2/2013 | Heppe | 244/2 |

OTHER PUBLICATIONS

Naval Research Advisory Committe, Lighter-Than-Air Systems for Future Naval Missions, Flag Officers and Senior Executive Service, The Pentagon Auditorium, Oct. 4, 2005.
Sanswire Corporation, Unmanned Airship Solutions for Integrated ISR Systems; Technical White Paper, Jul. 24, 2007.
Graham Warwick, Higher ground: Stratospheric airships special report—Aug. 15, 2006—Washington DC—Flight International.
Craig L. Nickol et al., High Altitude Long Endurance UAV Analysis of Alternatives and Technology Requirements Development, NASA/TP-2007-214861.
JP Aerospace, Something new at the boundary of Earth and space; Tandem Class Airships, http://www.jpaerospace.com/Tandem/tandem.html[Nov. 20, 2010 4:50:26 PM].
Mitre, 12 Miles High; An Integrated Airship-Radar is on the Horizon, Mar. 2010.

* cited by examiner

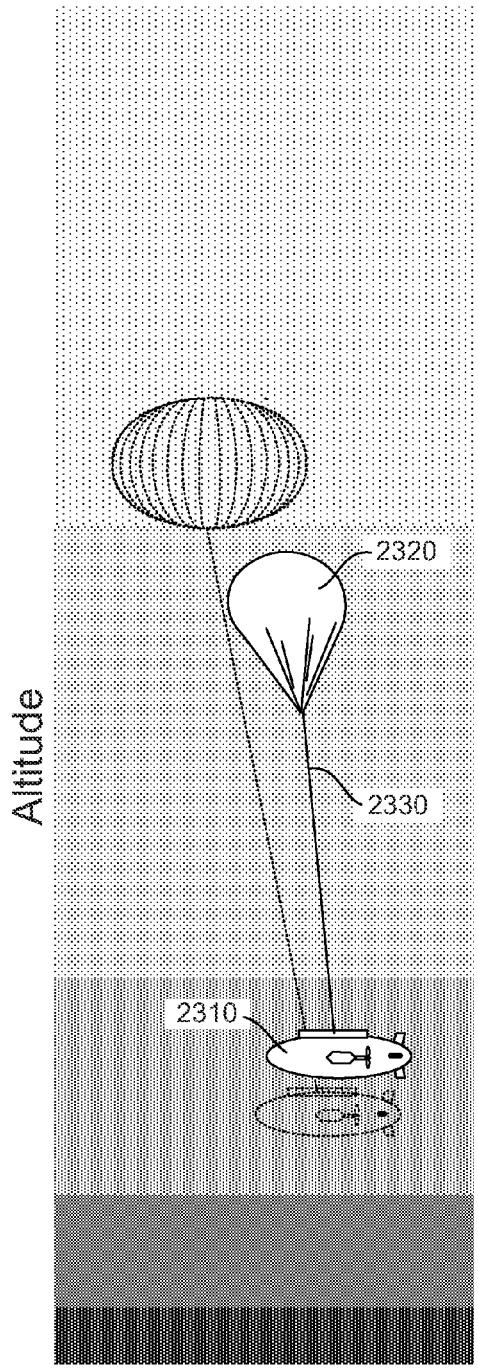
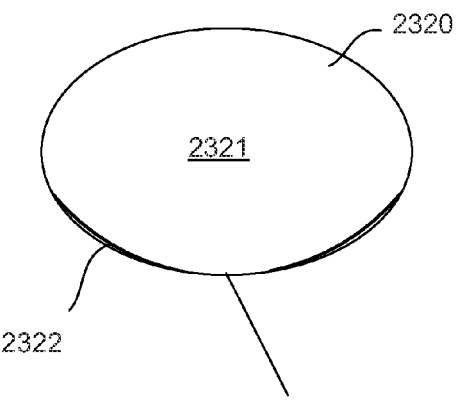
At neutrally bouyant (max design) altitude
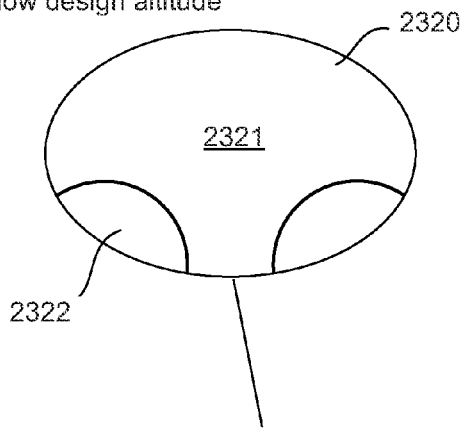
Below design altitude
Fig. 23F
Fig. 23E

Fig. 23G  Fig. 23H

Inflate balloon shuttle with lifting gas

2905

↓

The balloon shuttle moves upward along the tether toward the upper aiship

2910

↓

Lifting gas is transferred from the balloon shuttle to the upper airship

2915

↓

The balloon shuttle descends along the tether

2920

↓

The balloon shuttle docks with the lower airship

2925

SYSTEMS AND METHODS FOR LONG ENDURANCE AIRSHIP OPERATIONS

RELATED APPLICATIONS

The present application is a continuation-in-part, and claims the benefit under 35 U.S.C. §120, of U.S. application Ser. No. 13/228,212, filed Sep. 8, 2011, which claims the benefit under 35 U.S.C. §120 of U.S. application Ser. No. 13/159,215, filed Jun. 13, 2011 and U.S. application Ser. No. 13/048,625, filed Mar. 15, 2011. The present application is also a continuation-in-part, and claims the benefit under 35 U.S.C. §120, of U.S. application Ser. No. 13/227,966, filed Sep. 8, 2011, which also claims the benefit under 35 U.S.C. §120 of U.S. application Ser. No. 13/159,215, filed Jun. 13, 2011 and U.S. application Ser. No. 13/048,625, filed Mar. 15, 2011. These applications are hereby incorporated by reference in their entireties.

BACKGROUND

There is a recognized need for long endurance aeronautical operations that can, for example, provide persistent surveillance, maintain a communication link, or make in situ science measurements over an extended period of time comprising weeks, months or even years without maintaining a physical connection to the ground, a ship, or a maritime platform. However, current aircraft have limited endurance for free-flight operations, whether those operations involve flight over an extended route, or stationkeeping at a station, or a combination of the two. Consequently, extended aeronautical operations typically involve cycling through multiple aircraft. Specifically, while one or more aircraft is/are performing, the intended mission, one or more other aircraft is/are being refueled and possibly refurbished on the ground (or perhaps on a ship, or on a maritime platform). This can be both expensive and hazardous. The take off and landing of aircraft are typically the highest risk portions of a mission, and each takeoff and landing increases the risk of damage or loss of the aircraft and payload. This is particularly true for lighter-than-air aircraft that tend to be large and relatively slow-moving. As a consequence, there is a need to reduce the cost and risk of extended aeronautical free-flight operations.

SUMMARY OF THE INVENTION

A long endurance airship system includes a payload airship and a first logistics airship mechanically joined to the payload airship to form a first combined airship. The payload airship and the logistics airship have design capabilities differing by at least a factor of two with regard to at least one of: power generation capability, propulsion capability, endurance capability, and lift capability. The first combined airship is free flying, lighter-than-air, and configured to maintain station-keeping for greater than 30 days while in a free flying mode (i.e., without maintaining a physical connection to the ground, or a ship, or a maritime platform). It may also (or alternatively) be configured to operate over an extended route for periods in excess of 30 days. In the specification and appended claims, the term "long endurance" refers to airship systems that are designed to remain aloft without physical connection to the ground for at least 30 days. Long endurance airship systems may have capacities that allow for missions much longer than 30 days. For some missions, the long endurance airship systems may be designed to stay aloft for at least a 30 day mission but the particular mission parameters can be satisfied by a shorter mission. In the specification and appended claims, the term "without physical connection to the ground" refers to an airship that is not connected by any type of physical structure (such as a tether) to any ground based object. These ground based objects include moving objects, such as ships or vehicles as well as stationary objects such as towers, buildings, and maritime platforms. Airships without physical connections to the ground are free flying, even though they may be connected to other airships that are aloft. Airship systems that are not physically connected to the ground typically maintain electromagnetic communications with one or more ground, space, or airborne data stations.

According to one aspect of principles described herein, the first combined airship has at least twice the station keeping endurance (flight endurance) of the payload airship alone. In some embodiments, the first combined airship may be configured for stationkeeping at a predetermined station during meteorological conditions with wind speeds below a predetermined threshold. The system also includes a reconfiguration of the first combined airship to form a second combined airship that includes the payload airship and at least a second logistics airship, the second combined airship being configured for stationkeeping at the predetermined station in meteorological conditions with wind speeds above the predetermined threshold. For example, the second combined airship may include any number of logistics airships and a payload airship. Two of the airships may be joined by a tether, or the airships may be directly connected to each other. In one example, the payload airship and the first logistics airship are reversibly mated together and support rendezvous, mating, and demating, while in flight. The mate between the payload airship and first logistics airship may be a soft mate where no substantial structural loads are transferred between the airships, a hard mate that is configured to transfer structural loads between the payload airship and the first logistics airship, or a combination of a soft mate and a hard mate. The mate may take a variety of forms as described in the specification below. In some examples, a second logistics airship may be configured to reversibly mate with the payload airship.

According to one aspect of principles described herein, the system includes a tether connecting the payload airship and the first logistics airship, or the first logistics airship and a second logistics airship (which may also be mated to a payload airship). The first logistics airship is configured to be equiliberally buoyant, while carrying the tether, in a first altitude range and the payload airship with its payload, or second logistics airship (or combination of second logistics airship and payload airship with its payload) is configured to be equiliberally buoyant in a second altitude range. In one embodiment, the first altitude range is higher than the second altitude range, such that the first logistics airship is at least one kilometer above the other airship or airships and the tether mechanically transmits drag forces and lift forces between the airships. In such an embodiment, the first logistics airship may be termed an "upper airship" and the payload airship, second logistics airship, or combination of second logistics airship and payload airship, may be termed a "lower airship". Note that, for simplicity of discussion, the "lower airship" may refer to one or a plurality of airships. In some embodiments, the first altitude range is between 20 and 50 kilometers above sea level and the second altitude range is between 10 and 30 kilometers above sea level. Optionally, balloon shuttle may be included in the system. The balloon shuttle is configured to travel up the tether toward the first logistics airship (the upper airship) carrying a payload of lifting gas from the lower airship. The payload airship or second logistics airship attached to the lower end of the tether includes a supply of lifting gas for transfer to the balloon shuttle. In some embodiments, the lower airship is configured to receive replenishment from a ground station, the replenishment comprising at least one of fuel, lifting gas, and new payloads. This replenishment may be received in a variety of ways, including using another logistics airship to shuttle the replenishment up to the lower airship. In one implementation, a lower end of the tether is attached to the payload airship and a second logistics airship is mated to the payload airship. Alternatively, the lower end of the tether may be attached to the second logistics airship and the payload airship is mated to the second logistics airship.

A method for providing long endurance aeronautical operations includes monitoring resources and capabilities of a combined airship, the combined airship operating over a route or maintaining stationkeeping at a station. The future meteorological conditions are forecast for the station and a determination is made if the resources and capabilities of the combined airship are sufficient for operating over the route or stationkeeping at the station during the forecasted meteorological conditions. If the resources and capabilities are sufficient, the combined airship continues operating or remains on station. If the resources and capabilities of the combined airship are not sufficient a relief logistics airship is launched and the combined airship is reconfigured to include the relief airship or resources from the relief logistics airship such that the reconfigured combined airship has resources and capabilities sufficient for operation or stationkeeping during the forecasted meteorological conditions. The reconfiguration of the combined airship may include, in any order, demating a first logistics airship from a payload airship and mating the relief logistics airship to the payload airship. For example, the relief logistics airship may mate to the payload airship prior to demating the payload airship from the first logistics airship. This can be advantageous when the payload airship has minimal propulsion capabilities. Alternatively, the payload airship may demate from the first logistics airship prior to mating with the relief logistics airship.

In some embodiments, the method may additionally include assessing the probability of favorable wind conditions at each of a plurality of achievable altitude pairs for an upper airship and a lower airship; assessing the cost for achieving each altitude pair; selecting an itinerary of potential altitude pairs; executing the itinerary; and evaluating improvement of the operation or stationkeeping. The itinerary may be executed in a variety of ways, including changing the deployed length of the tether connecting the upper airship and lower airship. Additionally or alternatively, the method may include assessing the probability of favorable wind conditions at each of a plurality of deployed tether lengths between the upper airship and the lower airship, assessing the cost for achieving each deployed tether length, selecting an itinerary of deployed tether lengths, executing the itinerary, and evaluating improvement of the operation or stationkeeping. These steps can be iterated after achieving a deployed tether length of the itinerary.

The combined airship may include an upper airship at a first altitude and a lower airship at a second altitude, the upper and lower airships being connected by a tether, in which the first altitude and second altitude are stratospheric altitudes that are vertically separated by at least five kilometers. Maintaining stationkeeping at a station involves altering the aerodynamic characteristics of at least one of the airships to improve the stationkeeping performance of the tethered airship system. This may be done in a variety of ways. When the winds at the first altitude and winds at the second altitude are traveling in substantially different directions, altering the aerodynamic characteristics of the combined airship may include at least one of: altering the heading of one of the airships, deploying a parachute, altering aerodynamic characteristics of the parachute, deploying a parafoil, altering the aerodynamic characteristics of the parafoil, changing at least one of the first attitude and the second attitude, or other suitable change, such as altering the attachment point of the tether or altering the attitude of one or more of the airships. These methods may also be used to maneuver the combined airship from one location to another, restore position at a desired station, or even follow a desired route. With winds operating primarily in an east-west direction (and in substantially different directions at the first altitude and second altitude), east-west maneuvering can be performed by adjusting the drag of the two airships (by e.g. altering the aerodynamic characteristics of the parachutes). North-south maneuvering can be performed by adjusting the aerodynamic characteristics of the parafoils, so that the lift vectors of the parafoils, considered together, provide a net northward or southward component. Vertical maneuvering, within the limits of the combined airship's design, can be performed by adjusting the length of the tether as well as by altering the aerodynamic characteristics of the parafoils, so that the lift vectors of the parafoils, considered together, provide a net upward or downward component.

In one aspect, the method includes replenishing lifting gas in the upper airship by transporting lifting gas from an airship connected to the lower end of the tether to the airship attached to the upper end of the tether. In one example, the lifting gas is transported by: inflating a balloon shuttle with lifting gas, moving the balloon shuttle upward along the tether toward the upper airship, and transferring the lifting gas from the balloon shuttle to the upper airship.

In one implementation, a long endurance airship system includes a first combined airship and a second combined airship. The first combined airship includes a payload airship and a first logistics airship, the first combined airship being configured for stationkeeping at a predetermined station during meteorological conditions with wind speeds below a predetermined threshold. A second combined airship includes a reconfiguration of the first combined airship, the second combined airship comprising the payload airship and a second logistics airship, the second combined airship being configured for stationkeeping at the predetermined station in meteorological conditions with wind speeds above the predetermined threshold.

The payload airship may be configured to reversibly mate to at least one of the first logistics airship and the second logistics airship. Alternatively, the payload airship may be configured to be simultaneously mated to both the first logistics airship and the second logistic airship. In some implementations, the payload airship may have no propulsion capability. Alternatively, the payload airship may have propulsion capability sufficient to maintain a heading of the payload airship, the payload airship being configured to demate from the first logistics airship prior to mating with the second logistics airship.

In one embodiment, a combined airship may include a soft mate between the payload airship and a logistics airship, the soft mate transferring electrical power from the logistics airship to the payload airship. Alternatively, the mate between the payload airship and the logistics airship may be a hard mate configured to transfer structural loads between the payload airship and the logistics airship. In some examples, the mate between the payload airship and the logistics airship comprises at least a portion of upper surface of the payload airship being contained within a nadir cavity in the underside of the logistics airship.

In some implementations, the first combined airship may have at least twice the endurance of the payload airship alone. The second combined airship may be configured to generate at least two times more thrust than the first combined airship. The first combined airship may have at least two times longer endurance than the second combined airship. According to one aspect, the second combined airship comprises the first logistics airship, the second logistics airship, and the payload airship. In some examples, the first combined airship and the second combined airship are configured to maintain stationkeeping without propulsion from the payload airship.

In one example, a combined airship includes two airships reversibly mated together, in which the airships are configured to support rendezvous, mating, and demating, while in flight, wherein the two airships have design capabilities differing by at least a factor of two with regard to at least one of: power generation capability, propulsion capability, endurance capability, and lift capability. A first airship may be configured for stationkeeping in high winds and/or can provide electrical power to a second airship, wherein said second airship can receive electrical power from said first airship. In a variety of implementations, the first airship is capable of providing stationkeeping at a station without propulsion from a second airship.

In one implementation, a combined airship may include a tether connecting a first airship to a second airship such that the first airship is at least one kilometer above the second airship, in which the first airship is configured to be equiliberally buoyant, while carrying the tether, in a first altitude range and the second airship is configured to be equilibrately buoyant in a second altitude range, the first altitude range being higher than the second altitude range. In one implementation, the first altitude range is between 20 and 50 kilometers above sea level and the second altitude range is between 10 and 30 kilometers above sea level. In some circumstances, the first airship in the first attitude range may be subject to winds blowing in a first direction and the second airship in the second altitude range may be subject to winds blowing in a second direction, such that the drag force produced by the first airship and the drag force produced by the second airship are in substantially opposing directions. The tether mechanically transmits drag forces between the airships. In some embodiments, a parachute configurable to adjust the aerodynamic drag may be connected to one or more of the first airship, second airship, or tether. In some embodiments, a parafoil may be attached to at least one of the first airship or the second airship or the tether, in which the parafoil is controllable to induce vertical forces, drag forces parallel to the wind vector, and lateral forces perpendicular to the wind vector. The parafoil may or may not include an envelope containing lighter-than-air gas, an envelope that contains heavier than air gas, and/or ram filled chambers. The parachute and parafoil may each be present on the first airship, the second airship, both, or neither. In some embodiments, the first airship includes two pressurized envelopes connected to a truss. The truss may be a cruciform truss having a main truss and a crossbar, in which a parafoil is attached to a crossbar of the cruciform truss. Additionally or alternatively, a crossbar may be attached to the truss by cables and partially or completely suspended above the truss by buoyant or dynamic lift generated by the parafoil. Each airship may include an energy generating system for producing electrical power. Examples of energy generating systems include, but are not limited to, a wind power generator, a solar power generator, or an electrostatic power generator. The wind power generator may include a propeller which is also adapted to propel the airship. In some examples, electrical power generated in the second airship is transmitted to the first airship via the tether. In one implementation, the second airship includes a tether mount with at least one of a movable axle, a take up reel, and a brake. The tether mount may be connected to the first airship and/or second airship such that an attachment angle between the tether mount and a gas envelope of the airships can be changed. In some embodiments, depending on the intended operating altitudes and expected temperatures, and the material characteristics of the tether at low temperatures, a tether mount with a take up reel is further equipped with a heater to warm the tether as it is drawn onto the reel and deployed from the reel.

The long endurance airship system may also include a system for lifting gas replenishment that includes a balloon shuttle configured to travel up the tether toward the first airship carrying a payload of lifting gas, in which the tethered airship system is free flying and configured to maintain long duration stationkeeping. The second airship includes a supply of lifting gas for transfer to the balloon shuttle. The first airship may include a docking fixture fluidically connected to the first airship in which an upper surface of the balloon shuttle includes a mating fixture configured to mate with the docking fixture and transfer lifting gas via the docking fixture. In some examples, the pressure of the lifting gas in the balloon shuttle is higher than a pressure of lifting gas in the upper airship and the transfer of at least a portion of the lifting gas in the balloon shuttle is driven by a difference in pressure. The second airship may include a lower docking fixture fluidically connected to the lower airship. In one implementation, the balloon shuttle may include a reinforced tube passing through the balloon shuttle, the reinforced tube configured to receive the tether and allow the tether to pass through the tube as the balloon shuttle moves along the tether. The balloon shuttle may be positively buoyant when carrying the payload of lifting gas such that the balloon shuttle ascends the tether under its own buoyant force. In some embodiments, the balloon shuttle may be negatively buoyant after transferring at least a portion of the lifting gas to the upper airship and descend the tether under its own weight. Additionally or alternatively, the balloon shuttle may be configured with a drive mechanism that moves it along the tether. The airship system may also include a sheath covering a portion of the tether, the sheath being configured to protect the balloon shuttle from damage by the tether when the balloon shuttle is not in use.

Thus, in some embodiments, the airship system may include a first (upper) airship, second airship comprising a supply of lifting gas for transfer to the upper airship, a tether, an upper end of the tether attached to the first airship and a lower end of the tether attached to the second airship, in which the airship system is free flying. The airship system may also include an upper docking fixture in fluidic communication with the first airship and a lower docking fixture in fluidic communication with the second airship. A balloon shuttle controllably accepts lifting gas from the lower docking fixture, travels up the tether to the upper docking fixture and controllably delivers at least a portion of the lifting gas to the first airship via the upper docking fixture.

In some embodiments, a logistics tug (a logistics airship) is configured to reversibly mate with the second airship and deliver fuel, energy, lifting gas and/or a payload airship to the first airship. For example, the second airship may comprise a replenishable reservoir of lifting gas and the logistics tug is configured to deliver lifting gas to the replenishable reservoir.

This lifting gas may be delivered in a variety of ways including through a payload airship docked with both the second airship and the logistics tug.

In one implementation, the logistics tug may be configured to perform any or all of the following: support the operation of the payload airship, have a mission duration of at least 30 days, support two mating fixtures, and to shift the payload airship from one mating fixture to another.

Thus, in some embodiments, the airship system may include a first (upper) airship and a second airship, the second airship including a replenishable supply of lifting gas for transfer to the upper airship. The airship system is free flying and includes a tether with an upper end attached to the first airship and a lower end attached to the second airship.

The airship system may include a balloon shuttle configured to accept lifting gas from the replenishable supply while it is mated to a docking fixture associated with the second airship, travel up the tether to a docking fixture associated with the first airship, and deliver at least a portion of the lifting gas to the first airship. The airship system may optionally include a logistics airship and a payload airship that is configured to dock to both the second airship and the logistics airship. The logistics airship is configured to transport the payload airship to the second airship and to transfer lifting gas to the replenishable supply.

A method for gas replenishment of a tethered airship may include inflating a balloon shuttle with lifting gas, moving the balloon shuttle upward along the tether toward the upper airship; and transferring the lifting gas from the balloon shuttle to the airship. In some implementations, the tether passes through the balloon shuttle and controls a path of the balloon shuttle. In some configurations, the balloon shuttle is positively buoyant with sufficient buoyancy to reach the upper airship at the airship's current operating altitude and the balloon shuttle moves upward along the tether by ascending the tether under its own buoyant force. The balloon shuttle becomes negatively buoyant after transferring lifting gas to the airship and returns back down the tether under its own weight. For example, transferring the lifting gas from the balloon shuttle to the airship comprises transferring less than half of the lifting gas in the balloon shuttle to the airship. In other embodiments, substantially all the lifting gas in the balloon shuttle is transferred to the airship, the balloon shuttle employing a braking mechanism during descent along the tether. In some situations, an active drive mechanism may be engaged to move the balloon shuttle away from a docking fixture. The airship may be an upper airship in a free flying tethered airship system. The relative speed of the airship system may be altered with respect to the surrounding air to reduce aerodynamic forces on the balloon shuttle.

Thus, one embodiment of an illustrative method for long term stratospheric airship operations may include deploying a lower airship connected to an upper airship by a tether with a shuttle running along the tether to deliver lifting gas to the upper airship. Resupplying lifting gas to the upper airship from the lower airship via the shuttle uses a supply of lifting gas stored in a gas reservoir in the lower airship. A payload may be delivered to the lower airship using a logistics tug and returning the logistics tug to the ground. Airship operation may be continued until the reservoir of lifting gas reaches a predetermined depletion level and then the logistics tug is dispatched to resupply lifting gas to the lower airship. Additionally, the logistics tug may resupply fuel to the lower airship. The method may also include selecting operational altitudes for the lower airship and upper airship such that wind forces on the lower airship are in a substantially different direction than wind forces on the upper airship and/or adjusting lift and drag compensation between the lower airship and upper airship to minimize operating and/or station-keeping power requirements.

BRIEF DESCRIPTION OF THE DRAWINGS

The accompanying drawings illustrate various embodiments of the principles described herein and are a part of the specification. The illustrated embodiments are merely examples and do not limit the scope of the claims.

FIGS. 23A-23K show a variety of techniques and systems that can be used according to the principles described herein.

Throughout the drawings, identical reference numbers designate similar, but not necessarily identical, elements.

DETAILED DESCRIPTION

Figure 1:
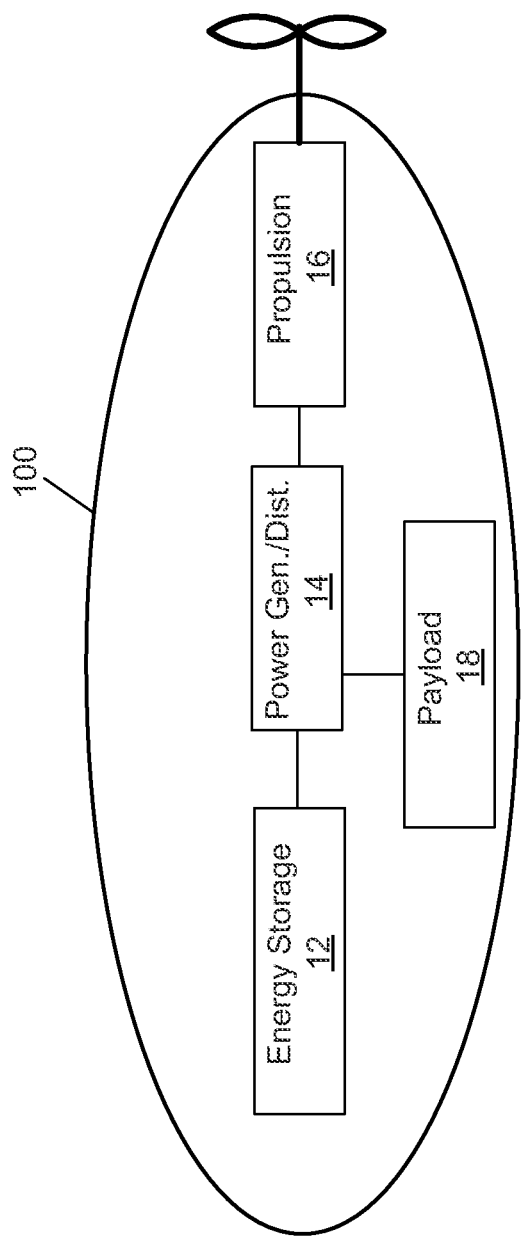
FIG. 1 is a schematic diagram of a high-altitude long-endurance (HALE) airship, according to one example of principles described herein.

There is a recognized need for long-endurance aeronautical operations. Desirable missions include low-altitude or tropospheric radio relay, high-altitude or stratospheric radio relay (aircraft supporting this mission are sometimes called "stratsats"), low-altitude surveillance, high-altitude surveillance, signals intercept, and in situ atmospheric observations, among others. Many of these missions could, conceivably, persist for months or years. For example, an operator of a stratospheric radio relay might desire a single aircraft to remain on-station for years (if such a feat were possible) in order to maximize return on investment and minimize the chance for loss of (or damage to) the aircraft during launch, recovery, and low-altitude operations. Barring the availability of an aircraft that can remain aloft indefinitely while performing a useful mission, an operator might be forced to rely on multiple aircraft that are "cycled" in such a way that one aircraft is always flying a desired route or staying "on station" performing its mission. A counter-piracy surveillance mission could also benefit from a long-endurance aircraft that could remain aloft and on-station, performing, its mission for months or years (or indefinitely).

Unfortunately, current aircraft are limited in their achievable endurance. Unmanned heavier-than-air aircraft can operate for tens of hours without refueling, and even lighter-than-air aircraft ("airships") are generally limited to operations on the order of a few days. The Airship Association, on its web site in 2010, repotted that the non-rigid airship record for un-refueled distance and endurance remains the flight of the US Navy ZPG 2 'Snowbird' in March 1957, that covered 15,205 kilometers in 264 hours. This is a flight of 11 days. Steve Fossett's solo around-the-world balloon flight did not involve a propulsion system per se, and was only slightly longer at 14 days, 20 hours. Endurance of unmanned airships is generally limited by fuel and, to a lesser extent, leakage of lifting gas. This low endurance means that an airship must either be refueled in-flight, or return to the ground for refueling, refurbishment and subsequent re-launch. Airships tend to be delicate and their launch and recovery, and low-altitude operations, represent a time of significantly increased risk. Also, airships tend to have relatively low speed so travel time to-and-from the mission area adversely affects overall system usefulness.

Previous inventors have sought to solve some of the issues noted above, as well as other issues, but have not recognized the benefits of mating together distinctly different airships with differing capabilities in order to reduce the cost of long-endurance operations. A few of these references are noted below along with a non-exhaustive discussion of differences relative to the present concepts and principles.

U.S. Pat. No. 1,818,138, awarded to Howland in 1931, teaches longitudinally coupled airships that can be coupled and decoupled in order to form a train. The disclosure includes a discussion of electrical connections between the airships and the potential for one airship that is totally or temporarily out of commission to be pushed or pulled by the other airship(s) in a train. Howland cites safety and operational benefits. However, he does not recognize the benefits or teach distinctly different airships with differing capabilities, and the swapping of multiple support airships in support of a single payload airship, to reduce the cost of long-endurance operations. Indeed, Howland does not appear to address the question of long-endurance operations where even a single one of his airships may remain aloft, performing useful work, for a long or indefinite period of time. Howland does not appear to teach the coupling and decoupling or airships while in flight. Airships of similar design, as taught in Howland, would not offer the economic and functional benefits described herein for long-endurance operation of a payload airship.

U.S. Pat. No. 2,863,618, awarded to Doyle in 1958, teaches wingtip-to-wingtip coupling of heavier-than-air aircraft, such as a bomber and one or more fighters, in order to extend the range of the fighters. While coupled together, the engines of the fighters can be turned off in order to conserve fuel. In this concept, the fighters are essentially "cargo" or "nonfunctional payload" while attached to the parent ship, and only perform their intended function when they are detached. Furthermore, the fighters are designed to operate detached from the bomber in all relevant meteorological conditions. This differs from the current invention where the payload airship performs its primary function while attached to the logistics airship (although it may also operate for short periods of time while detached), and where the payload airship is typically incapable of performing its full mission (which may include station keeping) in all relevant and anticipated meteorological conditions. Of course, Doyle is focused on heavier-than-air aircraft in contrast to the current disclosure which is focused on lighter-than-air aircraft.

U.S. application Ser. No. 11/698,969 (Thompson) describes a system of modular airships that may be assembled and disassembled in flight, where an electrical communication system permits navigation, monitoring and/or power subsystems to be shared and/or synchronized, and where the assembled airship provides improved lift and loft characteristics. Thompson also teaches that fluids (such as lifting gas) may be transferred between the modular airships while they are assembled together, and that a different kind of modular airship can be used for maintenance purposes such as refueling, recharging, or downloading information. However, Thompson does not describe a system where the modular airship is incapable of operating in all relevant and anticipated meteorological conditions, or where a logistics or support airship is continuously mated to a modular airship (except possibly for short periods of time to replace one airship with another) in order to perform the mission. Airships of modular design, as taught in Thompson, would not offer the economic or functional benefits described herein for long-endurance operation of a payload airship. Indeed, Thompson does not teach a system that can provide long-endurance free-flying operations for periods in excess of 30 days.

Numerous concepts have been proposed for long-endurance airships—including some that could potentially stay aloft unrefueled for months or years. These airship concepts tend to involve very large and expensive airships with limited payload capacity—on the order of only a few percent of total vehicle mass.

An airship that is not ground tethered but intended to remain roughly stationary with respect to the Earth despite the effect of winds must support power generation and propulsion sufficient to overcome wind-induced drag. Drag tends to be proportional to surface area and also tends to be proportional to the second power (square) of airspeed (which is the equivalent of wind speed if the airship is attempting to remain stationary with respect to a point on the Earth). Power necessary to overcome the drag is proportional to the third power (cube) of airspeed. It is recognized that a "sweet spot" exists in the lower stratosphere where ambient winds are generally low. However, even when operating at these altitudes (which are only suitable for some missions), there is a need to provide power generation and propulsion for peak wind speeds in the range of 20 to 50 m/s (depending on location). Because of the relationship between wind speed and drag, the power generation and propulsion systems are "driven" in an engineering sense by these peak wind speed conditions. For example, an airship that relies on hydrogen fuel and a system of fuel cells for power generation must maintain a large supply of fuel to survive through the peak wind speed conditions, must carry a heavy complement of fuel cells or batteries to generate high levels of peak power, and must carry a heavy complement of engines and propellers to generate sufficient thrust to overcome the effects of drag (and thereby remain stationary with respect to a point on the Earth, despite the ambient wind). This weight penalty, in turn, forces the airship to be relatively large and expensive. Lockheed Martin has proposed a high altitude airship that is 500 feet long and 160 feet in diameter, and can carry 4000 pounds of payload. Sanswire has proposed a "stratsat" that is 245 feet long, contains roughly 1.3 million cubic feet of lifting gas, and can carry 3000 pounds of payload. The unit cost of this system is reported to be in the range of $30 million. The National Aeronautics and Space Administration (NASA) assessed a number of heavier-than-air and lighter-than-air concepts for a pair of candidate high-altitude long-endurance missions (radio relay and hurricane chasing); one representative fuel-cell-based design ("Concept 12" optimized for radio relay) was roughly 500 feet long, weighed roughly 30,000 pounds, yet carried only about 500 pounds of payload. In order to remain on-station under the projected worst-case winds, this NASA concept devoted almost 21,000 pounds of gross vehicle weight to propulsion, fuel cells, and fuel and tankage. Hence the vehicle support systems needed to support the mission out-weighed the actual payload by roughly 40:1, and the overall size of the vehicle was driven by the need to lift these various support systems.

As an airship of a given geometry gets larger, its volume and associated lift capacity go up as the cube of each linear dimension yet the hull weight only goes up as the square of each linear dimension (assuming the hull material can remain the same thickness, so that its weight is proportional to surface area). So a larger airship can carry more weight after allowing for the increased weight of the hull. However, drag is also roughly proportional to surface area so the weight of the associated propulsion system and power generation system increases as well (roughly in proportion to vehicle surface area). Total fuel requirement for a given duration mission, in a nominal meteorological condition, will also increase in proportion to surface area. Hence, payload capacity tends to increase only relatively slowly as the size of the airship design is increased. NASA estimates for payload mass fraction (payload mass as a fraction of total vehicle mass) of its high-attitude long-endurance airship concepts are on the order of 1 to 2 percent. As a consequence, high-altitude long-endurance airship designs tend to be very large and expensive, yet support only limited payload capability. Thus, there is clearly a need for system concepts that can support long-endurance aeronautical missions at reduced cost.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Multi-Vehicle Airship

The inventive principles discussed below include a tandem or multi-vehicle airship where the separate subsystems such as payload, energy storage, power generation, and propulsion, are collectively carried by two or more airships, and where at least two of the airships can be mated and demated while in flight. For purposes of description, an airship dedicated primarily to payload will be called a "Payload Airship" or PA. Similarly, an airship dedicated primarily to support subsystems such as energy or fuel storage, power generation, and propulsion will be called a "Logistics Airship" or LA. When operating together on-station, a PA and LA can perform all the functions of a traditional HALE airship. For example, the tandem combination can support the payload mission requirements white performing station-keeping in strong winds. The PA is relatively small compared to a traditional HALE airship since it must only be large enough to carry the payload—although it might also support limited energy storage, power generation and propulsion capability (for example, enough to support payload power requirements while maintaining attitude and heading control when it is not mated to a LA). The LA is expected to be larger than the PA since it must carry the support systems for long endurance and/or peak wind conditions. The LA might be similar in size to a HALE airship intended for the same duration mission, although this is not required. The LA can be mated and demated from the PA while in flight—for example, while the PA is operating on-station. When one LA has exhausted its fuel supply, or otherwise becomes unable to support the mission, it can be replaced with another LA. Hence the PA remains on-station, supported by the new (nearly fully fueled) LA, while the depleted or otherwise unusable LA is returned to base for resupply or refurbishment.

In this tandem or multi-vehicle airship system, the PA is relatively small and low-cost compared to a single HALE that could support an equivalent long-endurance mission in the same meteorological conditions. Also, from a conceptual standpoint (and ignoring vehicle losses due to accidents or war), only a single PA is required since it can remain aloft indefinitely, either traversing a route or remaining at a station. The risk of payload loss is relatively low, since the PA stays aloft indefinitely and avoids the relatively risky activities of low-altitude operation, launch and recovery (except for the first launch and climb to altitude). The LA elements are cycled back-and-forth between a ground base and the PA. The LA elements do not carry a payload (in the baseline concept) and can be sized for optimum mission duration and cost-effectiveness, among other possible criteria. For example, the LA might be the minimum size needed to allow for continuous mission support while requiring only two LA for any given PA (accounting for travel time and refueling/maintenance time). Because they do not carry a payload and can be generally smaller than a traditional HALE designed for the same mission, they are relatively lower-cost.

By splitting the payload and support functions onto different airships, this tandem concept incorporates the concept of "interchangeable parts." An LA can potentially support a variety of PA (and their associated payloads), enabling a single service provider with a plurality of LA to support a variety of customers and diverse applications. From an aggregate standpoint, LA's can then be "pooled" or shared across applications in order to minimize the cost of achieving a given level of mission availability or a given level of mission reliability.

FIG. 1 illustrates a HALE airship 100 along with several of its subsystems. These comprise an energy storage subsystem 12, power generation and distribution subsystem 14, propulsion subsystem 16, and payload 18. Many alternatives exist for each of these subsystems. For example, the energy storage subsystem 12 might be tanks of gaseous or liquid hydrogen; the power generation and distribution subsystem 14 might include a stack of fuel cells designed to generate electrical power when supplied with hydrogen from the energy storage subsystem 12 and oxygen (either stored on board or ambient), and the propulsion system 16 might be a set of electric motors and propellers. HALE concepts include multiple alternatives for these subsystems such as alternative fuels, solar power, regenerative systems that can store solar power either in rechargeable batteries or alternative form (including electrolysis of water into hydrogen and oxygen), internal combustion engines, jets, and the like. FIG. 1 is not intended to be a complete or exhaustive illustration since it is also recognized that other subsystems would be present in a practical airship—such as command and control subsystems, navigation, attitude and heading sensors, launch/recovery accommodations, and the like. However, FIG. 1 provides sufficient description to illustrate the major differences and benefits of the present inventive concept.

The engineering community has striven for years to develop practical HALE airship designs that can either remain aloft indefinitely (on the order of years), or merely for very long periods of time (months). The inventor is not aware of any such airship design that has been successfully flown for such long periods of time. In a practical or achievable design, if the endurance of the airship is less than the length of the mission (such as a radio relay mission, or a counter-piracy surveillance mission, which could require mission support for an indefinite period of time into the future), continuous mission support requires at least two airships that would "take turns" providing support in a given area. Specifically, while one airship is providing mission support, the other airship is returned to base, refueled and possibly refurbished, and thence returned to the mission area. If the system operator or customer is concerned about hardware losses, a third airship might be procured to provide a spare asset. Typically, each of these airships (two or three) would be similar in design and capabilities, and similar in cost.

The cost of an airship depends on many factors and detailed cost estimation can be exceedingly complex. However, the following conceptual analysis illustrates the benefits of the illustrative long duration airship methods and system. The economic cost of an airship can be estimated based on: a) the projected weights of the individual subsystems; and b) "cost coefficients" or cost ratios that associate an approximate cost per unit of weight (e.g., pounds or kilograms) for each subsystem. This approach will not necessarily yield an accurate absolute cost for any given airship; however, for airships of similar technology content and not too dissimilar sizes, this approach can provide a rough indication of relative cost.

The subsystem weights can be estimated based on the particulars of a candidate design. For example, the NASA Concept 12 optimized for a radio relay mission of 6 month duration, unrefueled, resulted in a HALE airship design with performance and weights for several subsystems tabulated in Table 1 below. This same airship design could be used to carry certain alternative payloads of similar weight, such as surveillance or signals intelligence payloads.

The cost coefficients can be derived from historical data on fielded systems (if such data can be obtained), or estimated based on engineering experience. Estimated cost ratios in Table 1 are for illustration only.

TABLE 1

Subsystems for HALE Radio Relay

| SUBSYSTEM | PERFORMANCE | ESTIMATED WEIGHT (KG) | ESTIMATED COST RATIOS | ESTIMATED COST |
| --- | --- | --- | --- | --- |
| HULL | 136834 m³ plus structures/ballonets | 4,738 | $500/kg | $2.4 M |
| FUEL & FUEL STORAGE | 6670 kWh | 3,335 | $30/kg | $0.1 M |

TABLE 1-continued

Subsystems for HALE Radio Relay

| SUBSYSTEM | PERFORMANCE | ESTIMATED WEIGHT (KG) | ESTIMATED COST RATIOS | ESTIMATED COST |
|---|---|---|---|---|
| POWER GENERATION (fuel cell stack and PMAD) | 705 kW | 4,305 | $1,300/kg | $5.6 M |
| PROPULSION | 12,655 N | 1,798 | $700/kg | $1.3 M |
| PAYLOAD | (unspecified) | 212 | $20,000/kg | $4.2 M |
| TOTAL* | | 14,388 | | $13.6 M |

*Note: Using undisclosed cost coefficients and assumptions for system integration, and assuming a production run of 18 airships, NASA calculated a unit flyaway cost of $41 M - roughly 3x higher than calculated here. Nevertheless, for the purpose of illustration, the illustration will rely on the tabulated cost ratios (coefficients).

For the illustrative system of Table 1, the unit production cost of one airship is estimated at $13.6M based on the tabulated cost ratios. A system intended to support a mission of indefinite duration would require at least two such airships and possibly three (depending on the need for spares and redundancy). It should be recognized that the cost ratios in Table 1 are provided for illustrative purposes only, and should not be construed as necessarily being representative of the costs of particular systems. Costs will depend on the specific technology used, the state of the art in that technology, inflation, and other factors.

Figure 2:
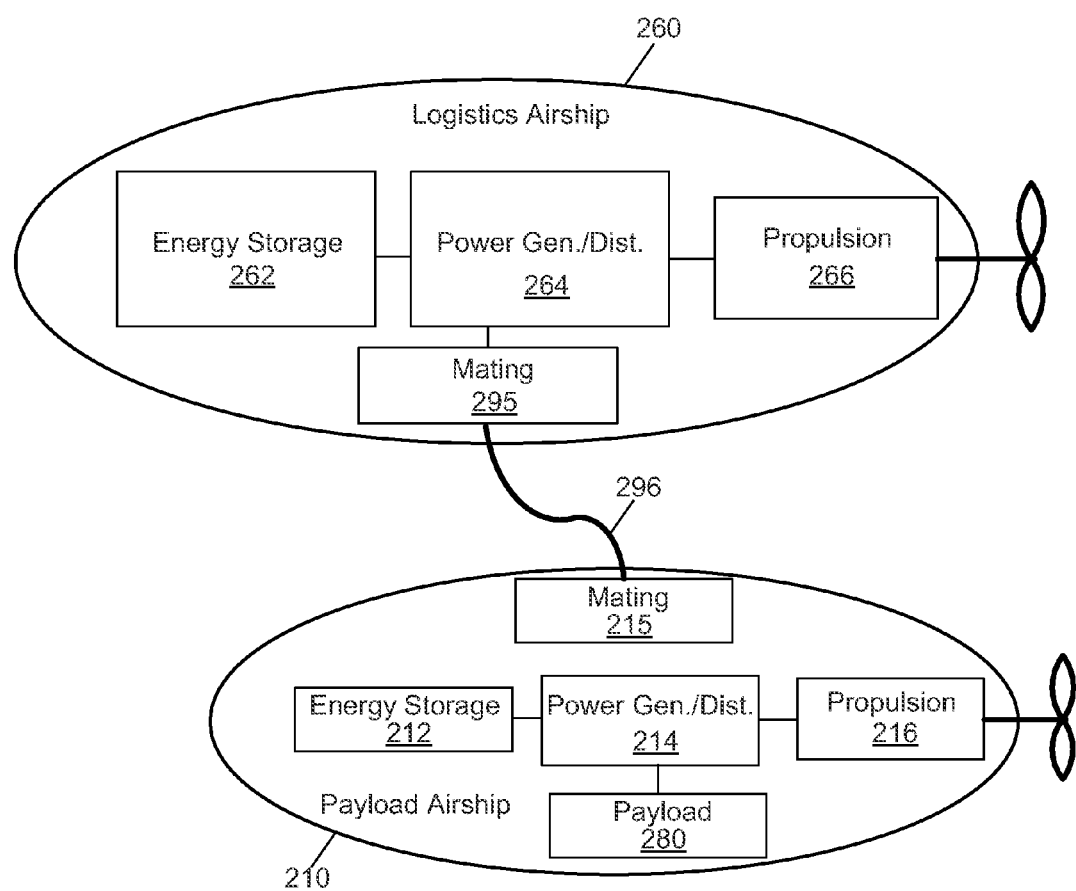
FIG. 2 is a diagram of a logistics airship supporting a payload airship, according to one example of principles described herein.

FIG. 2 illustrates an embodiment that includes two airships where one airship 210 is designated the "Payload Airship" or PA, and the second airship 260 is designated the "Logistics Airship" or LA. In this embodiment, while both airships have energy storage, power generation and distribution systems, and propulsion systems, and the two airships are illustrated similarly, the PA 210 and its energy storage subsystem 212, power generation/distribution subsystem 214, and propulsion subsystem 216 are all relatively small compared to the equivalent LA 260 and its internal subsystems 262, 264 and 266, respectively. The PA only has sufficient lift capacity to lift the payload 280 (identical to, or similar to, the payload 18 in FIG. 1), its small complement of subsystems 212, 214 and 216, and possible minimal additional subsystems such as, inter alia, command and control, housekeeping, and launch/recovery accommodations. It is not able to support long-term autonomous operations or propulsion in peak wind conditions (although it may support heading and attitude control and minimal propulsion for calm or low-wind conditions).

Because it does not need to support large quantities of fuel, or high peak power generation and propulsion systems for peak load conditions, PA 210 is relatively small and hence relatively low-cost compared to LA 260. In one example, the payload airship and logistics airship are capable of rendezvous, mating, and demating, while in flight. The payload airship and logistics airship have design capabilities differing by at least a factor of two with regard to at least one of: power generation capability (Watts of generating capacity); propulsion capability (thrust); endurance capability (days of continuous mission support in a defined meteorological environment); and lift capability (gross vehicle weight).

Table 2 illustrates an illustrative cost estimate for the PA based on rough estimates of subsystem sizes in order to support payload operations for short periods of time during LA exchange, attitude and heading control, and launch/recovery in low winds (possibly assisted by a larger airship). These cost estimates use the same cost ratios (coefficients) as the example of Table 1 for an existing HALE airship designed to early the same payload in the same meteorological conditions. As may be seen, the overall cost of the airship is substantially less than that of the HALE airship, and is dominated by the cost of the payload. Of course, this PA cannot operate unassisted for extended periods of time, or perform station-keeping in strong winds.

TABLE 2

Illustrative Subsystems for Payload Airship

| SUBSYSTEM | PERFORMANCE | ESTIMATED WEIGHT (KG) | ESTIMATED COST RATIOS | ESTIMATED COST |
|---|---|---|---|---|
| HULL | 15300 m^3 plus structures/ballonets | 1100 | $500/kg | $0.6 M |
| FUEL & FUEL STORAGE | 300 kWh @ 2 kWh/kg | 150 | $30/kg | <$0.1 M |
| POWER GENERATION (fuel cell stack and PMAD) | 8 kW @ 0.164 kW/kg | 50 | $1,300/kg | <$0.1 M |
| PROPULSION | 140 N @ 7.04 N/kg | 20 | $700/kg | <$0.1 M |
| MATING SYSTEM | (generic) | 50 | $1000/kg | <$0.1 M |
| PAYLOAD | (unspecified) | 212 | $20,000/kg | $4.2 M |
| TOTAL | | 1,582 | | <$5.0 M |

Also shown in FIG. 2 is the LA 260 which is expected to be larger than PA 210 since it contains more extensive fuel and higher peak power and propulsion capability sufficient for longer-term operations (although not necessarily indefinite operations), including operations in peak expected wind conditions. The LA in this embodiment does not contain the mission payload although it does contain command and control and other auxiliary systems (not shown). Because it contains extensive fuel and higher peak power and propulsion capability compared to the PA, it is relatively larger and more expensive than the PA. As a first-order approximation, in this embodiment, it is roughly the same size as a traditional HALE airship intended to support the same length of mission, in the same meteorological environment, with a mission payload. The LA and PA are mated together in this embodiment, and the LA provides power for the mission payload as well as peak power and propulsion capability for peak wind conditions.

Both the PA 210 and LA 260 use a mating subsystem 215 and 295, respectively, in order to provide for transfer of power as well as (possibly) lifting gas and structural/aerodynamic loads. The mating subsystem can take many forms as discussed below. The generic mating system illustrated in FIG. 2 is illustrated as being flexible, with a fixed part 295 and umbilical 296 associated with the LA, and a fixed part 215 associated with the PA. Other designs are possible. Together, the mating subsystems 295 (with 296) and 215 provide for transfer of electrical power from the LA to the PA. This is primarily intended to support the needs of the PA such as power to run the payload, housekeeping systems, and perhaps propulsion systems. However, the mating subsystems 295 (with 296) and 215 may also provide for the transfer of electrical power from the PA to the LA—for example, using excess power produced by solar cells on the PA to help recharge batteries on the LA. They may also provide for data exchange, transfer of gases or liquids, transfer of structural loads (e.g., those associated with differences in buoyancy or forces exerted on the mating system due to hull contact), and transfer of aerodynamic loads associated with drag induced by peak wind conditions on the PA. If these structural and/or aerodynamic loads are supported by the mating subsystem, the LA can provide stationkeeping in peak wind conditions, and the propulsion system in the PA can be reduced in size. Alternatively, if the mating subsystem does not provide for these structural loads, the propulsion system on the PA can be larger so as to compensate for some or all of the drag induced by the peak winds while drawing electrical power from the LA. For example, the payload airship and first logistics airship may be mechanically joined with a flexible umbilical adapted to support the transfer of at least one of: electrical power, lifting gas, other gases, liquid fuel, other liquids, and data. The "other gases" my include gases that are used as fuel. For example, hydrogen gas may be transferred from the logistics airship to the payload airship and consumed in a fuel cell to provide electrical power. In addition to liquid fuel, other liquids may also be transferred from the logistics airship to the payload airship. For example, cryogenic lifting gas may be transferred to the payload airship.

In one embodiment where a flexible mating system is used, the PA can be positioned closely behind the LA so as to "draft" behind the LA, thereby reducing the total drag on the two airships considered together. For example, in high wind conditions or to conserve fuel, the payload airship may be maneuvered to closely follow the logistics airship. The logistics airship can then "break the wind" for the payload airship. This drafting mode of flight could also be reversed, with the payload airship breaking the wind and the logistics airship drafting behind the payload airship. The logistics airship could provide some or all of the energy used by the payload airship in this mode of operation.

In one implementation, a plurality of LAs provides support to a PA. One LA is typically mated to the PA while the remaining LAs are either loitering, or en route, or on the ground. In-flight mating and demating of the LA and PA may occur either with a make-before-break procedure, so that the PA is always attached to at least one or a break-before-make procedure, so that there are short periods of time where the PA is not attached to any LA.

A cost comparison between the previous designs and the present embodiment can be challenging for a number of reasons. For example, the individual airships will have differing designs, the cost ratios are dependent on many factors varying over time and with technology used, and the overall concept of operations may differ as well. Nevertheless, a first "motivating comparison" can be performed by comparing a high-reliability system of three large HALE airships, each with a payload, with three large airships (LA) without a payload and one small airship (PA) with a payload. Each LA and PA includes a mating fixture. The mating fixtures could be androgynous, or alternatively they can be designed such that the LA fixtures can each mate with the PA fixture, but not with each other. Since the combination of LA's and PA eliminates two payloads and adds one small PA plus four mating fixtures, if the small PA and four mating fixtures are less than twice the cost of a payload, the total system cost of the LA's and PA is lower than the cost of the system with three large and identical HALE airships each supporting payload. Using the rough cost data of Tables 1 and 2 above, the standard approach would involve three large payload-equipped airships with a total cost (for the three airships) of approximately $41M. Conversely, three LA (priced similar to a standard airship but without a payload) plus a smaller PA containing a payload would have a total cost (for the four airships) of approximately $33M. In this cost comparison, the absolute costs of the two alternatives are not expected to be accurate and even the absolute value of the difference in cost ($8M) is not expected to be accurate. However, the large relative cost reduction, even with this simplified cost model, indicates the potential for an economic benefit.

Interchangeable Parts

There are additional benefits of the inventive concept. One benefit is that the inventive concept extends the idea of interchangeable parts. Interchangeable parts provide significant benefits including greater operational flexibility, lower replacement costs, ready availability of spares, etc. In the present case, the PA can be considered a "special purpose" or "custom" part whereas the LA can be considered a "general purpose" part. Different missions and customers may require different PA and payloads, but many could rely on a common LA. Hence, LA's can be built in large numbers to support a plurality of missions and customers, thereby enabling economies of scale in production (thereby reducing unit production costs). Furthermore, a group of missions or customers could share a group of LA for reliability and redundancy purposes, reducing the total number of LA needed by the group of missions or customers for a given level of mission availability, and so reducing overall life cycle costs for supporting the plurality of missions (i.e., when compared to separate missions each with their own customized HALE airships including redundant units).

Sharing of LA's can provide for a novel business concept where a service provider offers generic logistics support for a multitude of customers (and/or missions) with the service provider delivering payload airships to desired locations, and then supporting the payload airships with a plurality of logistics airships. The service provider relies on economies of scale in production and operations, and efficient sparing and redundancy associated with pooled resources, to reduce overall costs. Total fees charged to a given customer, to provide for delivery and long-term support of a given payload would be less than the costs associated with a plurality of dedicated airships for each mission sufficient to achieve the same level of mission availability. Within such a service provider business concept, the decision to dispatch an LA to a PA, or to a combined airship comprising at least one PA and at least one LA, can be based on a request from a customer (e.g., an entity that is operating the PA), or a decision process based on monitoring data available to the service provider (e.g., telemetry data originated from the PA or combined airship indicating status of fuel, status of lifting gas, damage reports, or other parameters of interest).

Tailored Logistics Airships

Figure 3:
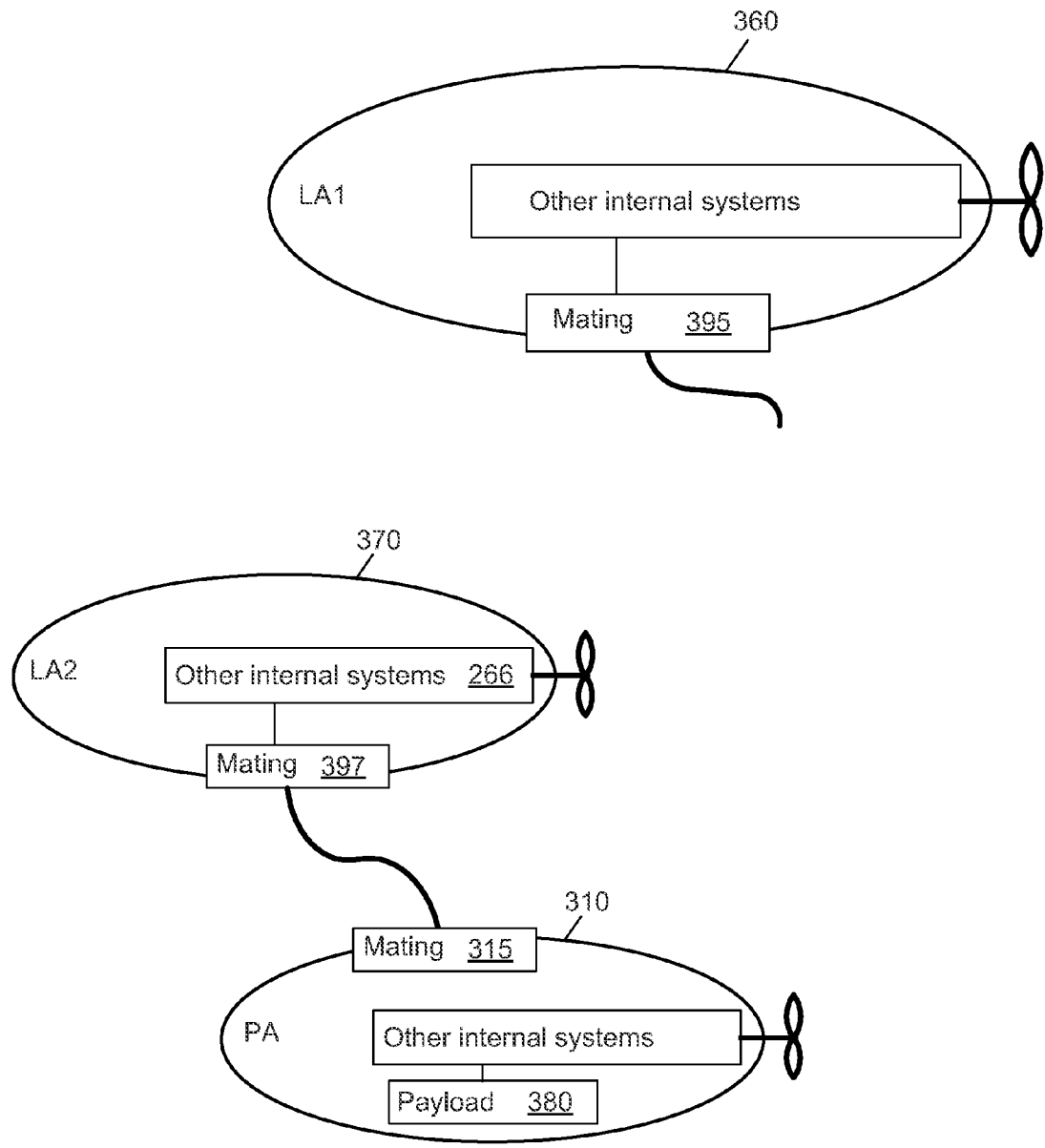
FIG. 3 is a diagram of two logistics airships that support a payload airship, where the logistics airships have different designs, according to one example of principles described herein.

FIG. 3 is a diagram of an illustrative example of a long endurance airship system where at least two different types of LA, numbered 360 and 370, can each mate with, and support, a PA 310. In the illustrated example, the two different LA differ in peak power and propulsion capability, with LA1 360 able to support higher peak power and propulsion (thrust) than LA2 370. LA1 and LA2 may be generally the same size or different sizes. If generally the same size, LA2 (with lower peak power and propulsion capability, hence lower weights for these subsystems) could carry substantially greater fuel stores than LA1 and could therefore remain on-station with the PA for substantially longer periods of time (but with a more limited thrust capability). When weather forecasts indicated an impending period of high winds, LA1 could be used while LA2 is returned to base for refueling and refurbishment.

Since power requirements are proportional to surface area as well as the third power of wind speed, LA2 could also be smaller than LA1 while still providing significant on-station support time. The weight of a power generation subsystem is assumed herein to be roughly proportional to peak output power (for a given technology); similarly, the weight of a propulsion subsystem is assumed herein to be roughly proportional to peak thrust (for a given technology). Subsystem cost is assumed to be roughly proportional to weight (for a given technology). As a consequence of the third-power relationship between wind speed and peak power and propulsion needs, significant cost savings can be achieved for airships with lower wind speed requirements.

Since peak winds at operational altitudes tend to occur for just a few months every year, LA1 could be sized for support during the peak wind condition (high peak power and thrust; fuel stores sufficient for the duration of the peak wind season), while LA2 could be sized for support during the remainder of the year (lower peak power and thrust, but fuel stores sufficient for the remainder of the year). For example, one study of stratospheric winds in support of high altitude airship concepts [Modica, 2007] indicated that winds above Colorado Springs, Colo., at the 50 hectopascal (hPa) level (roughly 65,000 feet) tended to be in the range of 10 m/s or less for most of the year, but were in the range of 20-30 m/s for one or two months of the year, and during these periods, peak wind speeds occasionally hit 40 m/s. Thus, if is designed for a peak wind speed of 50 m/s, and if LA2 is designed for a peak wind speed of 20 m/s, and the two are equal in size (hence equal drag at the same wind speed), the power generation and propulsion subsystems will differ in weight and cost by roughly a factor of $(2.5)^3$ or approximately 15:1. In terms of total fuel load, since LA2 generally experiences lighter winds than LA1, it can stay aloft longer than LA1 with the same fuel load. But because the power generation and propulsion systems are smaller, the airship can be smaller as well—and this reduces drag and allows for a further reduction in peak power generation capability, propulsion (thrust) and total fuel storage. Alternatively, LA2 could be the same size as LA1 but trade power generation and propulsion capability for greater fuel stores, enabling much longer endurance. Of course, intermediate designs are also feasible (slightly smaller airship but with moderately longer endurance).

Table 3 below shows one example of a long endurance airship system where LAs of two different and tailored designs are used to support stationkeeping of a single PA (although the system could also be used for missions that do not involve long-term stationkeeping). In this embodiment, LA1 is designed for peak wind conditions and is sized (in this example) similar to NASA Concept 12, although LA1 is intended for a mission duration of only 90 days (corresponding to the period of peak winds). LA2 is designed for a 400 day mission with peak winds of 20 m/s and average winds of 5 m/s. As may be seen, it is slightly smaller than LA1 but substantially lower in unit cost due to the reduced weight of power generation and propulsion systems designed for the lower peak winds. The mission durations of LA1 plus LA2, taken together, allow for the typical period between peak wind conditions in the lower stratosphere—around 14 months—with design margin. The PA is even smaller than LA2—only about 68 meters long—with on-board fuel stores sized for an aggregate of 10 days of stand-alone operation intended to support a plurality of short intervals of time for docking/undocking on-station (with a break-before-mate mating concept), and also autonomous launch/recovery if required. For this illustrative sizing exercise, the PA is designed to handle the same peak wind conditions as LA2 so that a flexible non-structural mating system, able to transfer electrical power (for example), could be used for the period of time that the PA is being supported by LA2. However, with this PA design, a mating system that can support structural loads present during peak wind conditions is also required, when the PA is being supported by LA1. In one embodiment, a common mating system able to support structural loads present during peak wind conditions is used for both LA1 and LA2.

TABLE 3

Illustrative System with Two Tailored Logistics Airships and One Payload Airship

| PARAMETER | UNITS | LA1 | LA2 | PA |
| --- | --- | --- | --- | --- |
| Length | meters | 145 | 119 | 68 |
| Volume | meters^3 | 131,000 | 73,800 | 13,800 |
| Surface Area | meters^2 | 15,400 | 10,500 | 3,420 |
| Max Wind | m/s | 56 | 20 | 20 |
| Avg Wind* | m/s | 10 | 5 | 5 |
| Endurance | Days | 90 | 400 | 10 |
| Payload + Avionics Power | kWatts | 1.25 | 1.25 | 1.125 |
| Max Drag | Newtons | 13,200 | 1200 | 350 |
| Peak Power | kWatts | 687 | 23 | 8 |
| Avg Power* | kWatts | 5.16 | 1.58 | 1.23 |
| Hull Mass | kg | 4610 | 3140 | 1020 |
| Propulsion Mass | kg | 1740 | 54 | 18 |
| Power Gen. Mass | kg | 4200 | 143 | 55 |
| Fuel + Tankage Mass | kg | 3200 | 4360 | 85 |
| Payload Mass | kg |  |  | 212 |
| Mating System Mass | kg | 50 | 50 | 50 |
| Gross Vehicle Weight | kg | 13,800 | 7759 | 1440 |
| Estimated Cost |  | $9.13 M | $1.96 M | $4.89 M (payload = $4.24 M) |

*Avg wind is the assumed wind speed that, if maintained continuously and without variation for the duration of the mission (endurance) would result in the indicated avg drag and avg power upon which total mission duration energy consumption, and required fuel mass, is calculated.

The entries in Table 3 are estimates based on the general concepts described below. First, it should be understood that all values are approximate, intended for illustration, and are only given to at best three significant digits. The estimation equations used in this example are simplified and a detailed design would likely result in different values due to differences in airship shape, materials, technologies, and other factors.

The airship hull geometry and lifting volume is assumed to be a scaled version of NASA Concept 12. Of course, other shapes are possible and a different shape would result in different airship characteristics. Total required lifting volume is calculated by multiplying gross vehicle weight (GVW) by 9.524, which is the approximate ratio embodied by the NASA Concept 12 for operation in the lower stratosphere. Once total volume is determined, length is scaled from the NASA Concept 12 by multiplying by the cube root of the ratio of volumes. Surface area is also scaled by multiplying by the ratio of volumes raised to the 2/3 power.

The equations are iterative since airship size depends on GVW, but GVW is affected by hull surface area (since each square meter of surface area is assumed to have a characteristic weight). Also, drag is a function of surface area and the propulsion system and power generation system capabilities and masses are sensitive to drag.

The maximum wind condition along with airship surface area influences the calculation of peak drag, associated peak propulsion system capability to compensate for peak drag, and peak electric power generation system capability to support the propulsion system (assuming electric motors). The peak electric power generation capability is scaled from the NASA Concept 12 airship design based on the ratio of surface areas and the cube of the ratio of design peak wind speeds.

The PA should be sized first, before the LA's, since part of the power generation requirement and propulsion requirement for the LA's will depend on the burden represented by the PA. In the example of Table 3, the burden of the PA, levied on the LA's, is calculated by applying a heuristic algorithm for LA peak power (propulsion). This algorithm augments the LA airship volume, calculated to carry the LA gross vehicle weight (GVW), by the PA airship volume in order to calculate an equivalent surface area for purposes of drag calculations. To a first order of approximation, this is equivalent to an assumption of conformal airship designs such that the effective drag of an LA plus PA is roughly equivalent to the effective drag of a single larger airship with the same total lifting volume of the two airships taken together. This heuristic algorithm is imprecise since it fails to account for the detailed drag characteristics of the tandem combination, which depend in turn on the mating technique discussed below. For example, a loosely-coupled tandem configuration, such as illustrated in FIG. 2, would have greater drag. In a more detailed design exercise, these detailed drag characteristics (tandem combination) could be assessed based on the specific airship geometries and selected mating configuration.

Average power for propulsion can be estimated from peak power (propulsion) by calculating the cube of the ratio of "average wind" to peak wind, and multiplying peak power (propulsion) by this number. Note that for this calculation, "average wind" is the wind speed that, if maintained continuously over the mission duration, would result in the expected total energy consumption (propulsion) for the mission. This is different from the average meteorological wind speed. In Table 3, values for this parameter of "average wind speed" have been assumed, rather than calculated or measured. One way to determine expected total energy consumption (propulsion) would be to run Monte Carlo simulations of a mission using a candidate airship design over representative meteorological conditions for the projected mission interval. These Monte Carlo simulations could be used to generate expected values for total energy consumption (propulsion), among other things. One could then calculate average power (propulsion) and average wind speed (as used here) based on the drag characteristics of the candidate airship design.

Both peak and average power (propulsion) are augmented by the power requirements for non-propulsion needs (such as, inter alia, avionics and payload) to yield peak and average power (total). In Table 3, the airships were sized based on a budget of 1 kW for payload and 0.125 kW for avionics. The PA carries a payload and all airships carry avionics (sized equivalently in this exercise). While operating in a tandem configuration, the PA airship consumes none of its own fuel, relying instead on power provided by the LA. Hence the LA provides electrical power for its own avionics, the payload and avionics of the PA, and propulsion needs for the tandem combination. When the PA is operating independently, it relies on its internal fuel stores. In the example of Table 3, the PA was sized to support independent operations in nominal winds for an aggregate of 10 days. This would be sufficient for a large number of mate/demate cycles (assuming break-before-make) plus independent launch/recovery, if required by the system.

Hull mass is estimated, in this example, by multiplying hull surface area with a characteristic ratio of mass per square meter taken from the final NASA Concept 12 airship design. The thickness and weight (per square meter) of hull is dependent on several factors including expected meteorological conditions, pressure differential between internal and external spaces, and physical durability. Also, the hull may include special sections and accommodations for launch-recovery, mating, and the like. These considerations will affect total hull mass in a more detailed design.

Propulsion system mass is estimated, in this example, by multiplying peak power (propulsion) by a characteristic ratio of mass (propulsion system) per kW (propulsion) taken from the final NASA Concept 12 airship design. Similarly, the power generation mass is estimated, in this example, by multiplying peak power (propulsion+payload+avionics) by a characteristic ratio of mass (power system) per kW (total) taken from the final NASA Concept 12 airship design.

Fuel and tankage mass is estimated, in this example, based on average power (total) over the mission duration, with a 50% safety margin, assuming hydrogen gas in high pressure tanks with fuel mass fraction of 0.268. Hydrogen has an energy density of 39000 Wh/kg, and a conversion efficiency of 50% was assumed. Payload and mating system masses were taken as assumptions for this example.

The combined cost of LA1+LA2+PA in this example (Table 3), including the payload in the PA, is roughly $16M based on the same cost coefficients used above. In contrast, a comparison system of three large airships similar in size to LA1, but each carrying a payload, would cost roughly 3×(9.13+4.24)~$40M. Thus, if sparing and redundancy for logistics airships is shared across a large number of users, customers or missions, as is feasible for the inventive concept, the effective total system production cost associated with support for a single payload can be on the order of 40% of the cost of three large HALE airships (each with a payload). Of course, detailed cost comparisons will depend on payload costs as well as LA and PA designs and mission requirements. Nevertheless, the present principles and examples offer the potential for significant cost savings compared to the current alternatives.

Using the design and costing principles noted above, one can explore a variety of design excursions. For example, a logistics airship intended to support the same peak wind conditions as LA1, specifically 56 m/s, but "average wind" of 20 m/s instead of only 10 m/s, for a design mission duration of 150 days, would have to be on the order of 450 m long, have a GVW of roughly 420,000 kg, and would cost on the order of $96M. However, if the design mission duration is reduced to 45 days, the airship may be sized at roughly 215 m, 45,000 kg, and $20M. If the design mission duration is reduced further to 30 days, the airship may be sized at roughly 180 m, 27,000 kg, and $14M. Hence, one embodiment tailored to areas with relatively long-duration and high "average wind" is to use multiple LA with high peak wind capability during the periods of peak winds, but relatively low endurance, cycling them as needed for refurbishment and refueling, and one or more LA with lower peak wind capability for the long periods of low wind. This approach may yield lower total system cost than a system with only two logistics airships, where the "high wind" airship is used to support an extended mission duration of many months.

Mated Systems of Three or More Vehicles

Figure 4:
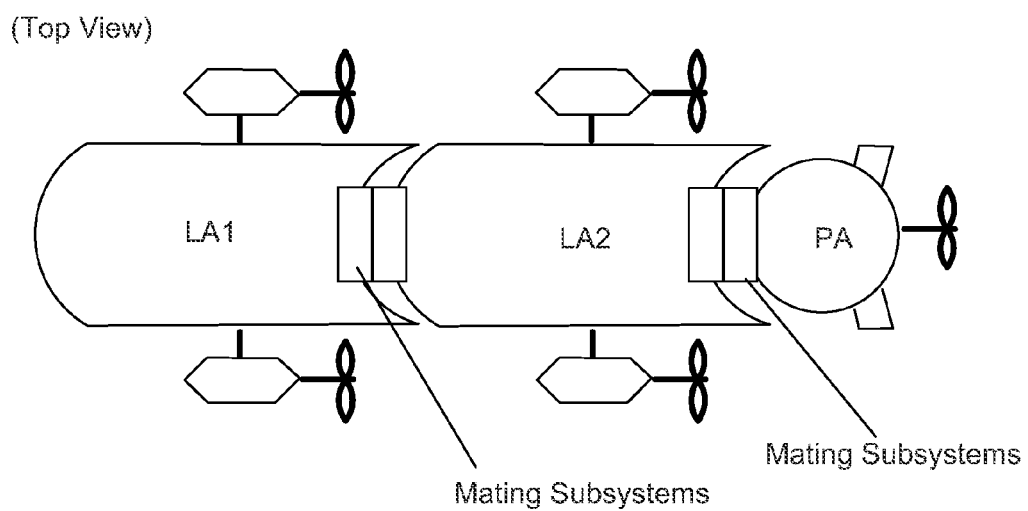
FIG. 4 is a diagram of two logistics airships simultaneously supporting a single payload airship, according to one example of principles described herein.

FIG. 4 is an illustrative example of a long endurance airship system wherein a multi-segment airship is comprised of three airships mated together. FIG. 4 illustrates two LA and one PA, but other combinations are possible including two PA and one or a plurality of LA and a plurality of PA. When more than two airships are mated together, at least one of the airships has a plurality of mating fixtures. In principle, all airships could have a plurality of mating fixtures, although this is not required.

In a configuration with two LA and one PA, the two LA can jointly support the energy storage, power generation and propulsion needs of the three-vehicle system. The LA might also differ in terms of unique support capabilities, such as inter alia solar regenerative power, alternative command and control, or communications systems.

In a configuration with one LA and two PA, the two PA might support different payloads, or two similar payloads tasked to work together or independently.

Mating Fixtures and Systems

Figure 5A:
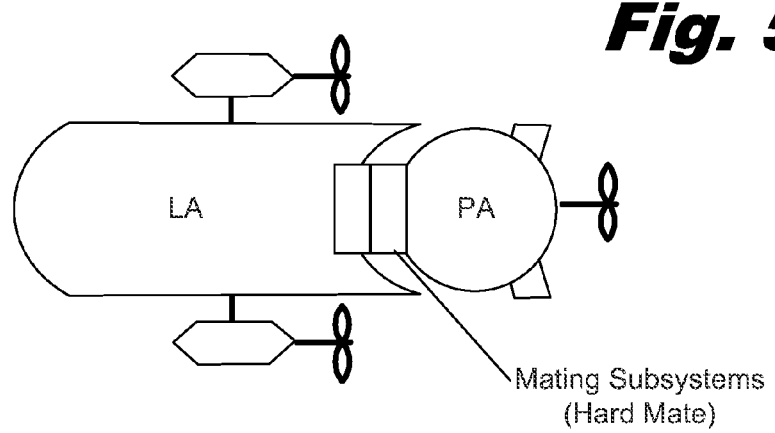
FIGS. 5A-5D show several mating configurations between logistics airships and payload airships for long endurance operations, according to one example of principles described herein.
Figure 5B:
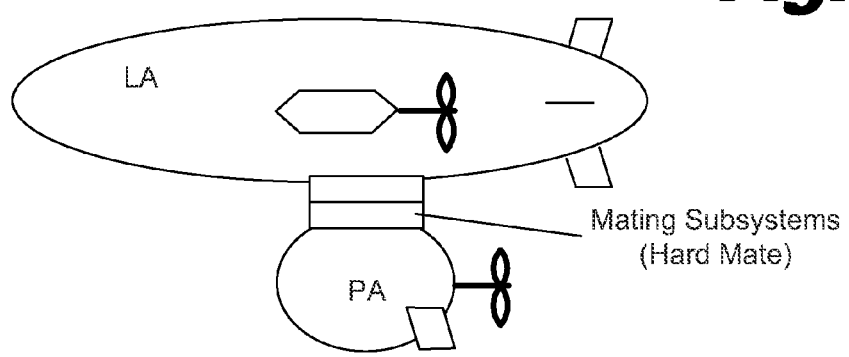

FIGS. 5A-5D illustrate a number of mating systems that may be used for docking two or more airships together. In FIG. 5A, a top view similar to the triple airship embodiment of FIG. 4 illustrates an LA and PA mated longitudinally with a hard mate fixture that provides for transfer of structural and aerodynamic loads as well as electrical power. A longitudinal mating configuration will tend to reduce drag in comparison to an alternative mating configuration such as shown in FIG. 5B.

Turbulence around the junction between the LA and the PA should be minimized if feasible and cost-effective, since turbulence will contribute to drag and thereby increase energy requirements. Turbulence will be reduced if the gap between the LA and the PA is small and the outer dimensions of the two airships are commensurate as shown; however, a small gap may make it challenging to correctly position the two airships for aerial rendezvous and successful mating/demating. If the gap consistent with reliable rendezvous, mating and demating is considered excessive, methods to minimize resulting drag include, inter alia:

a) an inflatable "balloon skirt" that can be reversibly filled, the balloon skirt located within the gap or at least the perimeter of the gap, so as to create a more seamless joint between the two airships that improves the aerodynamics of the system by minimizing turbulence. The balloon skirt is deflated and possibly pulled away front the junction for mating and demating, and inflated for normal tandem operations;

b) reversibly extendable mating fixtures that can provide for rendezvous and mating/demating with minimal concern for structural interference (i.e., in an "extended" configuration), and that can then be "retracted" so as to bring the two airships closer together in a controlled manner (following rendezvous and mating) for tandem operation with reduced drag; or c) ambient air can be allowed to enter the LA through an inlet, channeled to the gap with suitable ducting, and exhausted into the gap in a controlled manner so as to provide overpressure in the gap and thereby create more laminar flow around the PA.

The techniques described above can be used separately or in combination. For example all three techniques could be combined in a single embodiment.

FIG. 5B illustrates an "external carriage z-axis" mating configuration where the PA is mated below the LA with a hard mate fixture that provides for transfer of structural and aerodynamic loads as well as electrical power. If the mating fixture is vertically-aligned with the center of mass and center of lift of the LA, non-zero airspeed in this configuration will generate a torque that will tend to force the LA into an undesirable "nose down" attitude. This can be compensated in several ways including, inter alia:

a) Vectored thrust on the LA;

b) Deflecting surfaces (elevators or canards or both) on the LA;

c) A compensating propulsive force from a propulsion system on the PA (if the PA is so equipped).

Figure 5C:
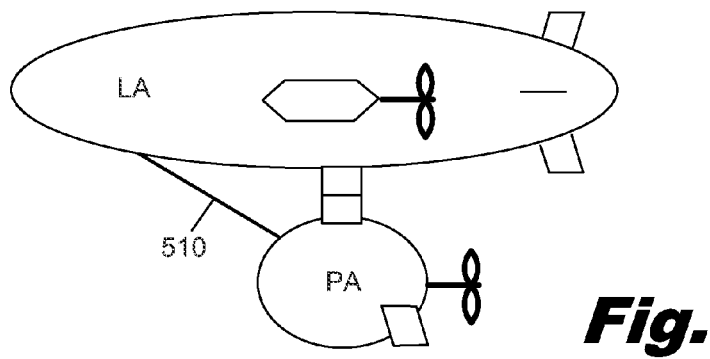

FIG. 5C illustrates a similar "z-axis" mating configuration where the PA is mated below the LA, although in this case the system uses a soft mate fixture that provides for transfer of electrical power but not structural or aerodynamic loads. In order to compensate for this lack of support, one or several cable(s) or guy wire(s) is/are provided for strain relief (one guy wire 510 is shown).

Figure 5D:
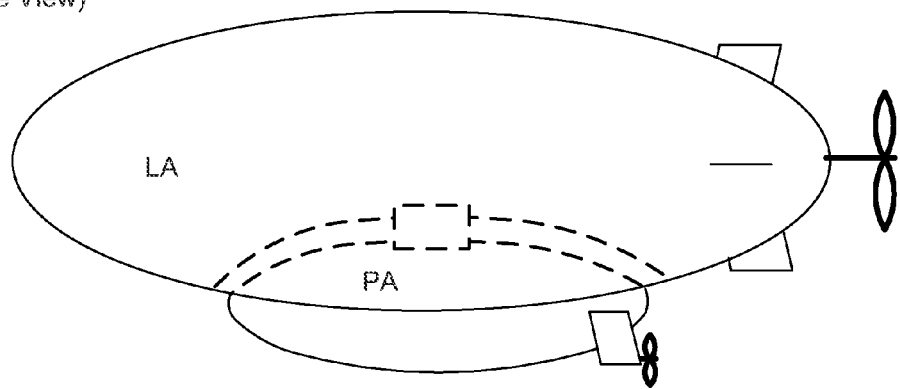

FIG. 5D illustrates an "internal carriage z-axis" mating configuration where the PA is mated below the LA, within a nadir cavity or crater in the LA that allows the tandem airship to experience lower drag forces than if the two airships were mated in an external carriage configuration as shown in FIG. 5B. As with the configuration of FIG. 5A, an inflatable balloon skirt can be used to minimize turbulence and drag associated with the interface between the two airships.

Returning to FIG. 3, a flexible mating configuration is shown where the LA and PA are connected by a cable or umbilical that can provide for the transfer of at least electrical power. The cable or umbilical may also provide for the transfer of liquids, gases and structural and aerodynamic loads.

The concept of a cable or umbilical as in FIG. 3 can be combined with the concepts of FIG. 5. For example, an initial rendezvous and soft mate could be achieved with a cable as shown in FIG. 3, at an airship separation distance that minimizes the complexity of airborne rendezvous, and the cable could then be "reeled in" until the PA is proximate to the LA. This technique could be used to help align the mating fixtures for nominal tandem operations.

All the mating fixtures illustrated in FIG. 5 can be augmented with capabilities for liquid and/or gas exchange between the airships. The mating fixtures can be androgynous, meaning that two mating fixtures of identical design will mate with each other, or "differentiated", meaning that a mating fixture on an LA could be mated to a compatible mating fixture of differentiated design on a PA, but could not be mated to an incompatible mating fixture of identical design on another LA.

The mating fixtures on the airships can be at fixed locations on the hulls, as generally shown in FIG. 5, or at movable locations. A movable mating fixture could be mounted on rails on as to provide for adjustable positioning of the mating fixture over a range of locations on the hull. For example, a track longitudinally aligned on the top of the PA could be used to provide a range of locations for the mating fixture on the PA. Various methods of locomotion and locking/unlocking at a desired location may include, inter alia, electric motors driven by power provided through a set of rails, linear induction motors, latches, and brakes.

The reversibly inflatable skirt discussed with regard to the embodiments of FIG. 5A and FIG. 5D can also be used as a means of strain relief for the mating fixture, and can provide for the transfer of some or all of the aerodynamic loads to accommodate tandem operation in high winds. For example, consider the embodiment in FIG. 5A, but augment the PA with an engineered trough running circumferentially around its forward fuselage (i.e., the trough lays substantially in a plane perpendicular to the longitudinal axis of the airship). The mating LA has a reversibly inflatable skirt that can engage this trough when the two airships are properly aligned and the skirt is inflated. Following mating, this inflatable skirt can be inflated so as to engage the trough and thereby provide for transfer of aerodynamic loads.

Rendezvous and Mating Procedures

Rendezvous in the stratosphere can be achieved as long as at least one airship has an ability to maneuver in three dimensions. This condition is satisfied since the LA, at least, has this ability (see also buoyancy and trim control below). However, if ambient winds exceed the airspeed capability of at least one of the airships, the rendezvous and mating phase may involve a period of "downwind drift" following initial rendezvous and before a final mating, able to sustain aerodynamic loads, is achieved. Actual mating is facilitated if both airships have the ability to control attitude and heading; however, this is not a strict requirement.

By way of explanation, "mating" in this disclosure is associated with the act of making a physical connection that can sustain the transfer of electrical power. The physical connection associated with "mating" may also sustain the transfer of gases, liquids, or physical forces, although this is not required. The tandem airship systems illustrated in FIG. 2, FIG. 3, and FIG. 10 may be considered to be "mated". A somewhat related concept is "docking", which in this disclosure is associated with the act of bringing two objects into close proximity—for example, the tandem airship concepts illustrated in FIG. 4 and FIG. 5 are "docked" as well as "mated". These concepts have a certain degree of definitional overlap since a mating system also involves two physical objects brought into close proximity; however, in general the disclosure will refer to a docking procedure in relation to airship hulls brought into close proximity. All tandem airship concepts disclosed herein use a "mating" procedure; however, not all tandem airship concepts require a "docking" procedure. If a docking procedure is used, the mating procedure can occur either before the docking procedure, during the docking procedure, as an integral part of the docking procedure, or following the docking procedure.

Once two airships requiring docking and mating are in relative proximity, they can achieve physical contact and alignment of their mating fixtures. One method is to "fly one airship into the other", in a controlled manner much as a Space Shuttle docking with the International Space Station. The mating fixtures adapted to such an approach would provide accommodation for misalignment, and as they are mated, would ultimately provide the fine alignment for a soft mate or hard mate. The mating fixtures might provide for the transfer of physical forces; alternatively, other accommodations on the hulks) of the airship(s), such as guy wires, struts, and interlocking structural features (such as the inflatable skirt discussed above) might provide for the transfer of physical forces.

Large airships maneuver slowly, and it may be difficult to model airflow between two large airships and provide for suitable control laws to enable reliable approach and docking (if required). The following techniques can be applied to overcome docking and mating difficulties associated with turbulence and close-quarter formation flying of large airships:

As noted previously, an umbilical or cable can be deployed from one airship and used for initial physical contact with the other. For example, the LA could deploy an umbilical that is captured by the PA using mechanical or electromagnetic capture systems. By way of example and not limitation, the mechanical systems could involve mechanical grappling, latching or grasping mechanisms. Electromagnetic capture systems could be based on electromagnetic attraction between the deployed cable or a probe end at the end of the deployed cable, and the mating fixture (or part of the mating fixture) located on the PA. It is also possible to combine electromagnets with mechanical grappling, latching or grasping mechanisms. Following initial contact, the cable could be "reeled in" by the LA to bring the airships and mating fixtures into contact, and allow a hard mate.

The mating fixtures or initial capture mechanisms can be mounted on a movable platform, for example a rail-borne fixture, so as to allow for rapid repositioning and alignment of the mating fixtures without having to significantly reposition one or both of the airships. A movable platform can be used to ease initial capture, and subsequently repositioned (if necessary) to support final docking.

For mating configurations to those illustrated in FIGS. 5A and 5D, where an extended surface exists between the two airships, one or both of the airships could be equipped with a plurality of actuators or repositioners across the extended surface, such as motorized wheels, that can be used to reposition one airship relative to the other as they come into contact. The wheels or actuators would be driven to bring the mating fixtures of the two airships into alignment. Once alignment of the mating fixtures is achieved, one or both of the mating fixtures can be extended to make contact and achieve a mate. Other methods for final mating include, inter alia, retraction of the wheels or actuators (thereby allowing the airships to come into closer proximity) and intentional distortion of the hull(s) around the mating fixture(s) to achieve a mate.

For continuous operation of a PA over extended periods of time, it will be necessary to exchange one LA for another, or at least replenish consumables such as fuel for propulsion or energy generation, or lifting gas, by mating with a second LA adapted to provide these consumables to the already-mated pair, performing the transfer of consumables, and subsequently demoting the second LA so that it can return to a supporting ground facility. When one LA is exchanged for another, the exchange can be achieved in a so-called "break-before-make" approach where the PA is demoted from a first LA and subsequently mated to a second LA, or a so-called "make-before-break" approach where the PA is mated to a new LA before demoting from a first LA. Each of these methods has advantages and disadvantages. The break-before-make approach requires only a single mating fixture on the PA but also requires the PA to operate autonomously for a period of time. This may involve a period of drifting or low-airspeed flight. The make-before-break approach requires at least two mating fixtures on the PA, but does not require any period of autonomous operation by the PA.

Figure 6A:
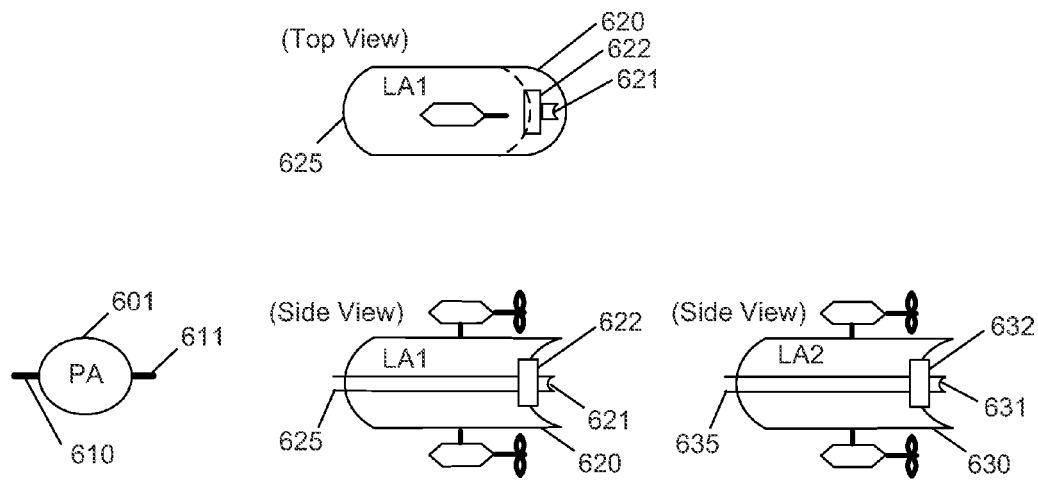
FIGS. 6A-6C show several mating configurations for long endurance airship operations, according to one example of principles described herein.
Figure 6B:
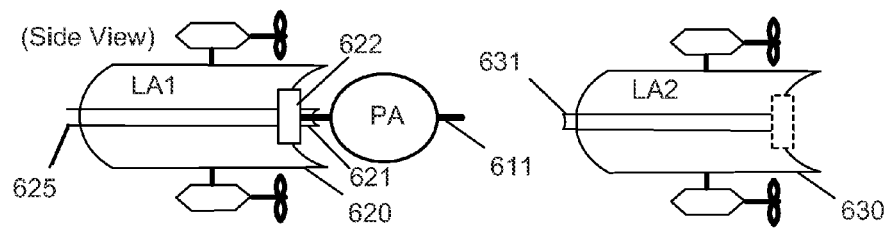
Figure 6C:
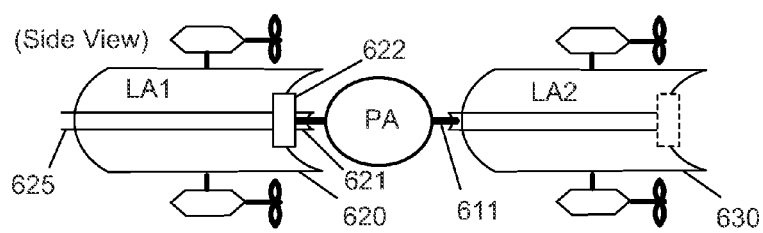

A third approach may be considered "break-before-make" in the sense of a mated connector providing for the transfer of electrical power, but still providing for continuous handling of a PA by the two LA's with no period of free flight by the PA. In one embodiment of this third approach, as illustrated in FIG. 6A, the PA 601 supports two grappling fixtures 610 and 611 at fixed antipodal locations on the PA. In this embodiment, each grappling fixture is associated with a mating connector (not shown). However, this association of a grappling fixture and a mating connector is not an inherent requirement of the inventive concept (the two could be separate). In the illustrated embodiment, each LA 620 and 630 supports a grappling appendage with end effector 621 and 631, respectively, that can grapple with either of the grappling fixtures 610 and 611 on the PA. In this embodiment, the grappling appendages with their end effectors 621 and 631 are at movable locations on rails 625 and 635 mounted on the LA 620 and 630, respectively. For discussion purposes, LA 620 will be considered to have "initial control" of the PA, and LA 630 will be considered the "new" LA that is intended to take over control of the PA. Prior to rendezvous, as illustrated in FIG. 6B, the PA 601 is mated to a mating, fixture 622 of LA 620, at a rear longitudinal location of LA 620, with the grappling appendage and end effector 621 of LA 620 grappling the fixture 610 on PA 601, said grappling providing a docking of the PA with the LA 620. In order to transfer control of the PA to LA 630, the LA 630 positions its grappling appendage and end effector 631 at its bow and uses it to grapple the PA's grappling fixture 611 as illustrated in FIG. 6B and FIG. 6C. LA 620 then demates with the PA and releases the PA's grappling fixture 610. Once released, the LA 620 moves off (it may return to base for refueling and refurbishment). The movable grappling appendage on LA 630 then moves along the rail 635 until it is in position to mate the PA to its own mating fixture 632 at a rear longitudinal location.

For a system that employs "make-before-break" operations, as well as for a system that uses the third alternative described above and illustrated in FIG. 6, the PA does not require any accommodation for propulsion since it is always attached to an LA.

In the third alternative described above, with LA as illustrated in FIG. 6A with propulsion systems mounted top and bottom and the rail running horizontally (equatorially), the PA is mounted "backwards" every other handoff but remains "upright" throughout the handoff process and during tandem operations.

Buoyancy and Trim Control

The LA and PA may have slightly different buoyancy characteristics, and in any case an LA that consumes fuel to provide propulsion or electrical power will tend to become more buoyant over time as it consumes its fuel supply. Buoyancy can be reduced by venting the lifting gas or compressing some of the lifting gas and storing it in a tank. If the lifting gas is hydrogen, it can also (or alternatively) be consumed in a fuel cell. This method can be used to marginally extend overall endurance. For example, since the inventive concept uses about 10 m$^3$ of lifting volume for every kg of gross vehicle weight (at the nominal altitudes discussed above), a kg of hydrogen fuel also requires about 10 m$^3$ of lifting volume (which is also assumed to be comprised of hydrogen, but at low density). If the density of air at 60,000 feet is approximately 0.2 kg/m$^3$, and assumed to be mostly nitrogen as opposed to hydrogen (atomic weights differ by 14:1), the density of hydrogen at altitude, at equivalent pressure, is about 0.014 kg/m$^3$. Ten cubic meters of lifting gas would have a mass of about 0.14 kg, and after burning a kg of fuel, this amount of lifting gas could either be compressed into the fuel tank, or also burned directly as fuel (thereby avoiding the weight burden of a compressor), in order to extend endurance by about 14% while maintaining constant buoyancy.

If the LA and PA are mated via a flexible cable, and are not identical in terms of buoyancy, the two will tend to float at slightly different altitudes with the cable in tension between the two. This is illustrated in FIG. 2. The more buoyant airship would tend to float at a higher altitude than the less buoyant airship, but the overall system will float at an altitude where the two together achieve neutral buoyancy.

If the LA and PA are mated end-to-end, in a rigid configuration, a difference in buoyancy may tend to cause the tandem combination to float in either a "nose up" or "nose down" attitude. This could increase drag and should therefore be avoided. Various methods can be employed to avoid improper attitude of the tandem combination including: a) lift surfaces on one or both airships that can be adjusted to provide a upward or downward force at a point that is far away from the center of mass of the tandem system (thereby providing a torque at the expense of some additional aerodynamic drag); b) venting or compressing lifting gas in the more buoyant airship to reduce its buoyancy; c) releasing lifting gas from a storage tank into a lifting cell (ballonet) in the less buoyant airship, to increase its buoyancy; d) exchanging low-pressure lifting gas between the two airships via the mating fixture between the two, so as to equalize their buoyancies; e) burning lifting gas in the more buoyant airship, as fuel, to reduce its buoyancy and extend its fuel supply; f) shifting lifting gas between ballonets in a single airship, so as to provide a variation in lift distribution; or g) mounting some or all of the power generation and fuel storage subsystems (or other heavy subsystems) on internal rails so that they can be moved fore and aft in order to adjust the weight distribution of the airship. Of course, some or all of these techniques can be used jointly.

With regard to option d) noted above, the exchange of low-pressure lifting gas between the two airships, it is anticipated that flow rates would be relatively low under average conditions since each kg of fuel consumed in the LA would require less than 0.14 kg of hydrogen to be exchanged in order to maintain equibuoyancy between the two airships (the 0.14 kg of "excess lifting gas" can be shared between the airships in proportion to their current GVW). Valves can be lightweight because the pressures are low. Instead of traditional pumps, some or all of the ballonets in one or both airships could be equipped with variable surface tension systems (for example cables surrounding a ballonet that can be tightened to increase internal pressure and thereby drive gas out of the ballonet, or loosened to accept the gas). Furthermore, the exchange of lifting gas from an LA to a PA would counter slow leakage of lifting gas from the PA. This would minimize or eliminate the need for "stored lifting gas" on the PA, and possibly allow the PA hull and ballonets to be designed with lighter-weight materials. However, the exchange of gas via the mating fixture adds additional complexity, weight, and need for fail-safe and backup systems. Also, under peak wind conditions, LA1 at least consumes fuel at a significant rate (on the order of 30 kg/hr for the illustrative airship designs of Table 3), and this might increase the weight of subsystems intended to provide for exchange of lifting gas. Hence, one embodiment provides for both an exchange of lifting gas between the LA and PA, and also consumption of lifting gas on the LA as an auxiliary source of fuel.

Figure 7:
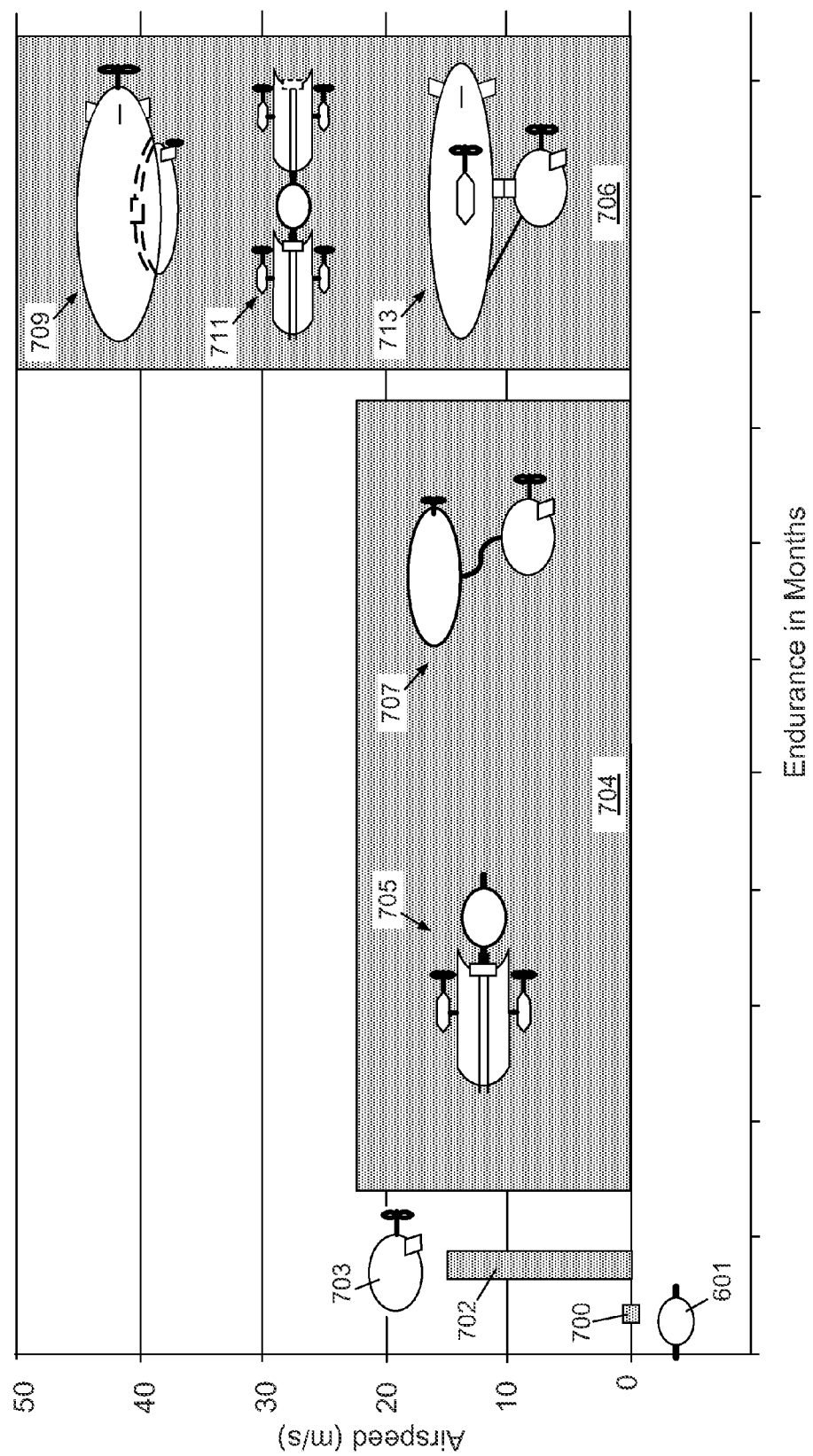
FIG. 7 is a graph showing capabilities of various airships and airship systems, according to one example of principles described herein.

FIG. 7 is a graph that shows illustrative operational envelopes for various airship configurations. The operational envelopes are given only as examples that illustrate qualitative differences between the airship configurations that provide modularity, operational flexibility, and cost savings. The airspeed in meters per second is shown on the vertical axis of the graph. Airship endurance in months is shown along the horizontal axis of the graph. The operation envelopes are shown as shaded boxes that describe the maximum airspeed and endurance of a given airship configuration. Illustrations of the various airship configurations are shown in conjunction with the operational envelopes. In this figure, the illustrative operational envelopes describe the maximum airspeed attainable with a given airship configuration. For station keeping, the operational envelopes define maximum wind velocity at which the airship can maintain position. The illustrative airships may not be able to maintain the maximum airspeed for the entire endurance period.

A first payload airship 601 is shown with its operational envelope 700. As discussed above, this payload airship 601 does not have a propulsion system. Instead it is designed to support the weight of the payload and may or may not have the ability to supply electrical power to the payload for short periods of time. This payload airship 601 is always attached to a logistics airship that provides propulsion and attitude control. Consequently, its operational envelope 700 is shown schematically as a small box. The "make-before-break" mating procedure for this payload airship 601 is shown in FIGS. 6A-6C.

A second payload airship 703 has its own power generation and propulsion capability. Its operational envelope 702 shows that it has a maximum airspeed of about 15 meters per second and an endurance of about 7 to 10 days. This payload airship 703 can maintain its heading and station keeping unassisted for short periods of time when wind speeds are below its maximum airspeed. This capability can facilitate undocking and docking procedures for logistic airships that support the payload ship.

A long endurance operation envelope 704 provides for approximately 7 months of station keeping at wind speeds of less than about 23 meters per second. This maximum airspeed represents a predetermined threshold below which the combined airships can maintain stationkeeping. At wind speeds higher than the predetermined threshold, the combined airships 705, 707 will not be able to generate enough thrust to maintain stationkeeping. The operational envelope 704 is only an example. Various combined airship designs may have different operational envelopes. For example, some combined airship designs may have endurances of 13 months or longer.

Two combined airships 705, 707 are shown as illustrative examples of airships that may have long endurance at moderate wind levels. In some embodiments, the combined airships may have at least an order of magnitude greater endurance than the payload airship alone. A first combined airship 705 includes a logistics airship with a payload airship connected to the rear of the logistics airship. The logistics airship provides electrical power, propulsion and control for the combined airship. As discussed above, this allows the payload airship to be relatively small, simple, and inexpensive. The logistics airship can be replaced or augmented by an additional logistics airship when meteorological conditions or fuel reserves dictate.

A second combined airship 707 also includes a payload airship with a mated logistics airship. In this configuration, the payload airship may have the propulsion capability to meet the maximum airspeed, but lack the fuel capacity and/or power generation capabilities for sustained stationkeeping. The logistics airship supplies electrical power or fuel to the payload airship through the mated umbilical cord. This allows the tandem combination to maintain stationkeeping over the endurance period. This configuration is illustrated and described with respect to FIG. 3.

A third operational envelope 706 provides shorter endurance, but at higher peak airspeeds. As discussed above, for many long duration missions the wind velocities are relatively benign for long periods. However, for shorter periods, the wind speeds may increase substantially. Typically, these periods with higher wind speeds can be accurately forecasted and the airship configuration modified to maintain station keeping. In the operational envelope 706 has a maximum airspeed of 50 meters per second and duration of several months.

Three illustrative combined airship configurations 709, 711, 713 are shown within the third operation envelope 706. The upper combined airship 709 includes a logistics airship with a nadir cavity and a hard dock which receives the payload airship. As discussed above, this is a configuration with reduced aerodynamic drag as compared to a tandem airship that relies on external carriage, or a flexible umbilical. The larger logistics airship may provide electrical power, fuel and thrust to the payload airship. This allows the combined airship 709 to maintain stationkeeping during the periods of higher wind speeds.

The middle combined airship 711 is similar to the example shown in FIG. 6C. The two logistics airships are attached to the payload airship and the combined propulsion of the two logistics airships provides the required stationkeeping propulsion during periods of higher wind speeds. As discussed above, the airship configurations can be altered to meet the needs of the mission and the environmental conditions. During periods of moderate wind, the combined airship 705 may be used. When higher wind speeds are forecast, an additional logistics airship can be attached to the payload to form a combined airship 711 with higher propulsion power. After the period of high wind speed is over, one of the logistics airships can be detached and return to a base station for refueling. The other configurations can be similarly modified to meet changing conditions.

The bottom combined airship 713 has a soft dock between the payload airship and a large logistics airship. A cable system provides a structural linkage between the payload airship and the logistics airship, and strain relief for the mating fixture. This allows the logistics airship to use its propulsion system to provide thrust for the tandem combination.

The combined airships 709, 711, 713 in the third operational envelope 706 are configured for stationkeeping at a predetermined station in meteorological conditions with wind speeds above the predetermined threshold associated with the operational envelope 704. According to one illustrative embodiment, the long endurance combined airships 705, 707 may have at least twice the endurance of the higher speed airships 709, 711, 713, by virtue of trading power generation and propulsion system mass for fuel and tankage mass. However, the higher speed airships 709, 711, 713 are configured to generate at least two times the thrust of the long endurance combined airships 705, 707.

Figure 8:
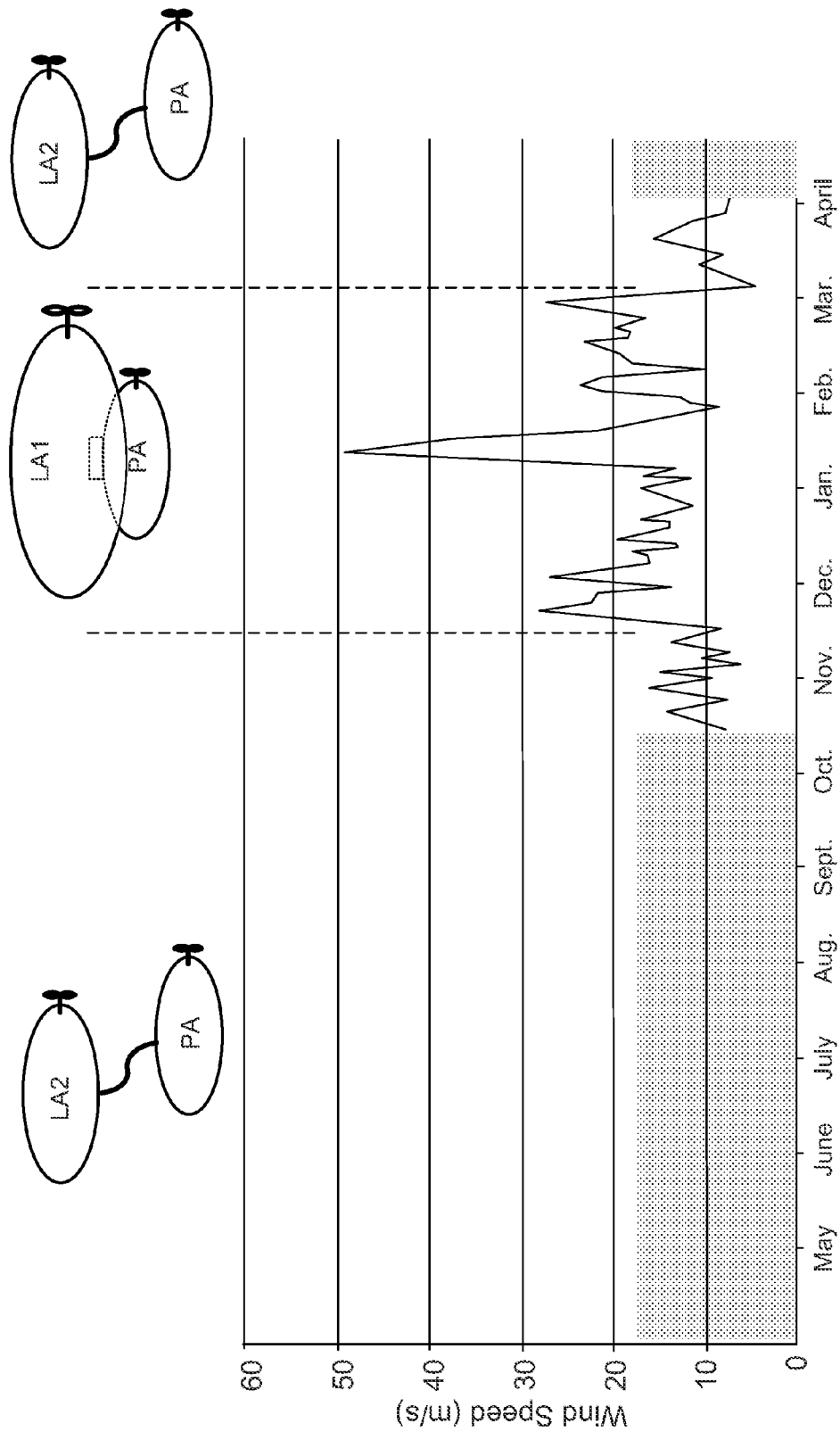
FIG. 8 is a graph of wind speeds and illustrative airship configurations over a one year long endurance mission, according to one example of principles described herein.

FIG. 8 is a graph that shows illustrative airship configurations during a one year period in a long endurance mission. The vertical axis of the graph shows wind speed and the horizontal axis of the graph shows months during the mission. The wind speed data shown in the graph is actual wind speed data taken at the operational altitude in the lower stratosphere at a predetermined station [Modica, 2007]. From May through October, the wind speeds were generally benign and did not exceed 20 meters per second. This benign period is represented by the left shaded box. However, from mid-November through the first week in March, the wind speeds increased significantly. These higher wind speeds are shown by the solid line on the graph. The solid line represents the maximum wind speed during a given time period and represents the upper bound of the wind speed. The average wind speed during this period may be significantly lower than shown by the solid line. The shaded box to the right of the solid line represents a following period of relatively benign winds.

In this example, the payload aircraft (PA) has a propulsion system and carries a relatively small amount of fuel. The small logistic airship (LA2) carries sufficient fuel and provides enough thrust for the combined airship to maintain stationkeeping from May to October. As shown by the graph, the maximum wind speed from May to October for this particular mission was less than 20 meters per second. Consequently, to maintain the combined airship (LA2, PA) on station, the combined airship needs only to have a maximum airspeed capability of 20 meters per second.

To successfully maintain stationkeeping during the higher wind speed period, the combined airship has been reconfigured to replace the small logistics airship LA2 with the larger logistics airship LA1. As shown in the graph, the maximum wind speed from November to March was generally less than 30 m/s, but exhibited a peak of nearly 50 meters per second in January. The peak lasted for about a week. To meet this requirement, the larger logistics airship LA1 has a higher thrust capacity than the smaller logistics airship LA2. Further, to reduce aerodynamic drag the payload airship is anchored in a cavity in the bottom of the larger logistics airship. This allows the combined airship to move more efficiently. Additionally, the mating between the airships secures the payload airship to the larger logistics airship so that thrust and other forces can be transferred from the logistics airship to the payload airship.

After the high wind period is over, the larger logistics airship LA1 is undocked from the payload airship PA and the smaller logistics airship LA2 again docks with the payload airship PA.

Figure 9A:
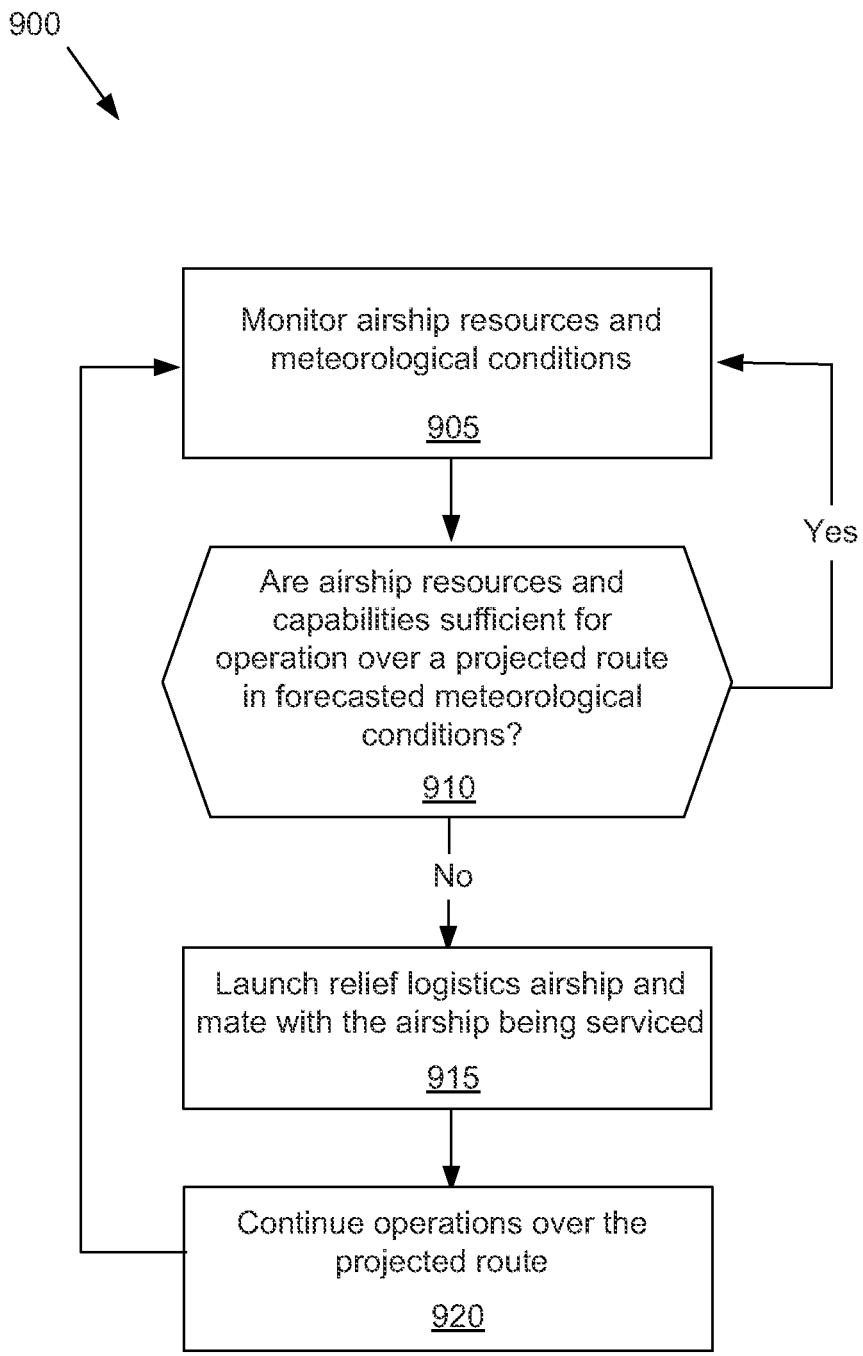
FIGS. 9A and 9B are flowcharts of illustrative methods for maintaining long endurance airship operations, according to one example of principles described herein.

FIG. 9A is a flow chart of an illustrative method 900 for maintaining long endurance airship operations. After the airship, which may be a combined airship, is aloft and operating (possibly on-station at a desired altitude and location), the airship resources, capabilities, and meteorological conditions are monitored (block 905). Resources comprise available reserves of at least one of fuel, lifting gas, or stored energy capacity of the airship. Capabilities of the airship comprise the known or estimated values of achievable thrust, achievable lift, and achievable drag, in various meteorological conditions. In general, the capabilities and resources of the airship will be known within uncertainty limits. For example, the propulsion capabilities of an electric motor driving a rotor can be tested in advance under specific conditions and the performance of the motor/rotor can be mathematically extrapolated to different conditions. The uncertainty limits recognize the limitations of mathematical extrapolation, degradation of capacity with use, uncertainties about the precise environmental conditions, and other factors.

Meteorological conditions comprise current and projected wind speed, and may also include current and projected pressure and density as well as other parameters. These data may be narrowly-defined along the projected route or at a desired station, or span a range of lateral and vertical offsets from a projected route or desired station. Based on this monitored information, the situation is evaluated on an ongoing basis to determine if the airship resources and capabilities are sufficient for operation over a projected route (which may involve station keeping) in the forecasted meteorological conditions over a planning period (block 910). The projected route may include a route between waypoints, stationkeeping at a particular waypoint/station, stationkeeping with a range around a waypoint/station, and stationkeeping at a station by traveling a route around a fixed waypoint/station. The planning period is at least the length of time required to reach the airship with a relief logistics airship, which may variously be aloft but loitering, traveling en route, or located on the ground. However, the planning period could also be longer. The planning period could be a fixed length of time (e.g., longer than the worst-case time required to reach the airship under all reasonably-projected operating conditions), or a variable length of time (e.g., responsive to the current availability and disposition of relief logistics airships). If the on-station airship resources and capabilities are sufficient for operation in the projected meteorological conditions over the planning period, no relief logistics airship is launched and monitored information continues to be evaluated. However, if the on-station airship resources or capabilities are not sufficient for operation in the predicted meteorological conditions over the planning period, a relief logistics airship can be launched, or simply commanded if it is already aloft, and mated with the airship being serviced (block 915). For example, if the airship is a combined airship that includes a payload airship and a logistics airship, the fuel supply or propulsion capability of the logistics airship may not be sufficient to meet the anticipated meteorological conditions. A relief logistics airship can be launched carrying the desired fuel and having the desired propulsion capabilities. The relief logistics airship docks to either the payload airship or the logistics airship. For example, as shown in FIG. 6C, two logistics airships simultaneously support the payload airship. In other examples, the payload airship may be transferred from the current logistics airship to the relief logistics airship as described with respect to FIG. 3. The operation continues to be maintained using the reconfigured airship (block 920).

Figure 9B:
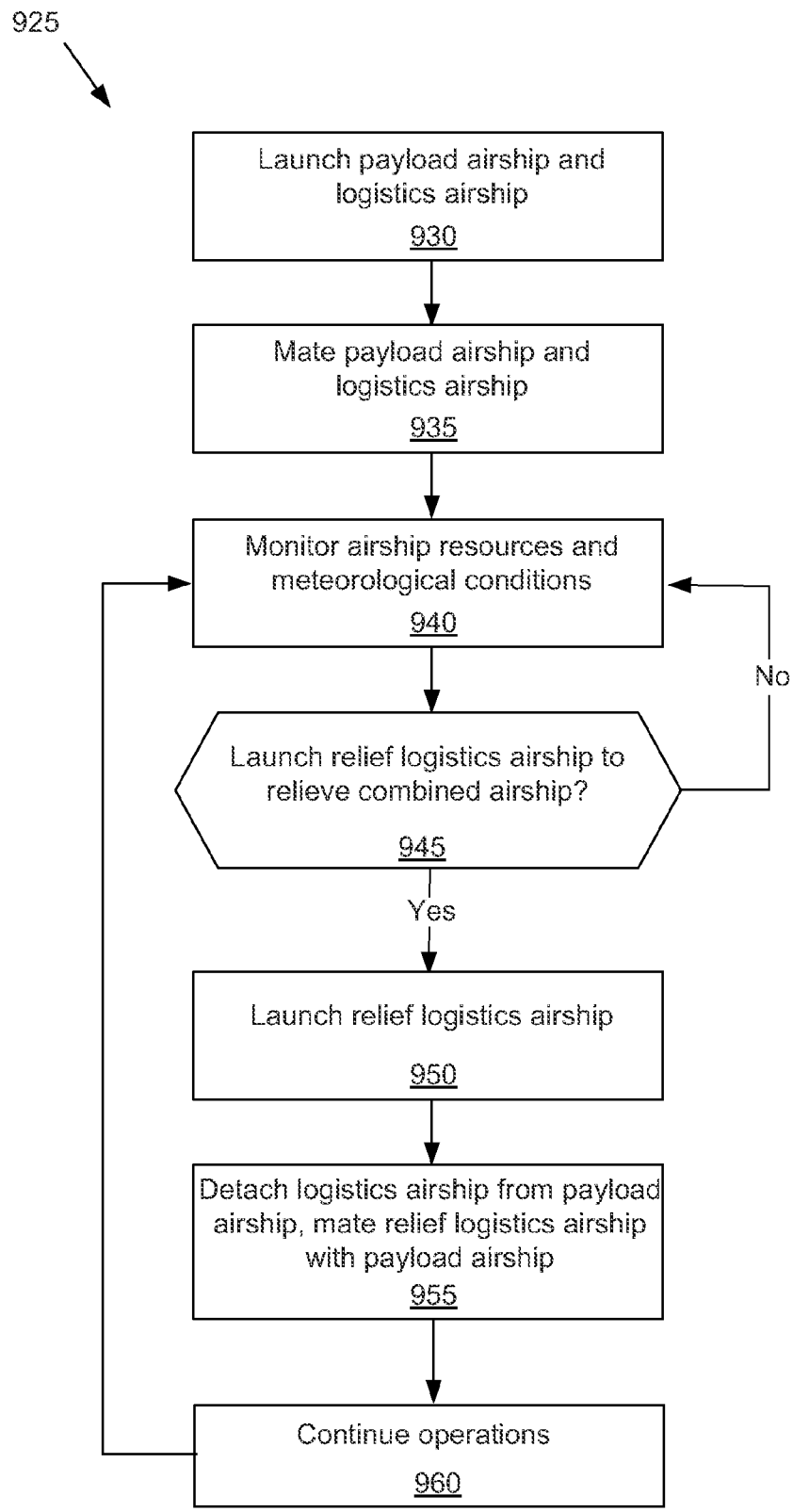

FIG. 9B is a flowchart 925 that describes an illustrative long endurance airship mission by a break-before-mate airship system. The payload airship and logistics airship are launched (block 930). The payload airship and logistics airship will typically be launched separately but can be launched in a mated configuration. The payload airship has sufficient fuel and propulsion capability to at least maintain its heading and for maneuvering. The logistics airship has the fuel and propulsion capabilities to maintain operations (which may involve stationkeeping) of the combined airship for an extended period of time. The logistics airship and payload airship may be mated prior to launch, after launch, after the launch but before reaching a desired station, or after both airships have reached a desired station (block 935). The meteorological conditions and the resources and capabilities of the combined airship are monitored (block 940). If the resources and capabilities of the combined airship are anticipated to be sufficient to meet the forecasted meteorological conditions over a planning period, the relief airship is not launched and the monitoring continues (block 945). If the resources and capabilities of the combined airship are not anticipated to be sufficient to meet the forecasted meteorological conditions over a planning period, the relief airship is launched (block 950) and will subsequently rendezvous with the combined airship. For example, if the combined airship is located at a particular station and the on-station wind speeds are forecast to exceed the propulsion capability of the combined airship, a relief logistics airship with greater propulsion capabilities may be launched (as noted above, the relief logistics airship may already be aloft, loitering, or en route). The logistics airship is detached from the payload airship and the relief logistics airship is mated with the payload airship (block 955). Operations continue (block 960) and the monitoring of the airship and meteorological conditions is maintained.

It should be noted that, in an operational system where multiple payload airships are served by a pool of logistics airships (thereby minimizing sparing), there may be an economic benefit to early replenishment/replacement of a logistics airship in order to minimize the total number of logistics airships required by the system as a whole.

The reconfigurable combined airship provides cost and operational advantages during long endurance missions. The payload airship is relatively small and low-cost and is supported by logistic airships as needed to maintain operations over the duration of the mission. This can also reduce risks to the payload because the payload airship stays aloft indefinitely and avoids the relatively risky activities of low-altitude operation, launch and recovery. The logistics airships do not carry a payload (in the baseline concept) and can be designed for optimum mission duration and cost-effectiveness. In some embodiments, the reconfigurable combined airship may be configured as a system and method for long-duration stratospheric operations without refueling, and with relatively small (i.e., low total weight) systems compared to currently-known techniques. By substantially reducing overall system weight, as well as the weight of subsystems such as propulsion and energy generation and storage, total cost is reduced. Furthermore, by providing for indefinite operations in the stratosphere without returning large and fragile airships to the ground for refueling and refurbishment, overall risk to the system is reduced. Additionally, in comparison to a system of multiple airships each with a payload that are cycled through a mission area in order to maintain continuous operations, the present principles achieve continuous operations with a single tethered airship system, thereby avoiding the cost of multiple airships and multiple payloads. The principles discussed above can be applied to a wide variety of combined airship systems and operations, including the tethered examples discussed below.

Tethered Airships

As discussed above, a stationkeeping requirement (and its associated power and energy requirements) can be a dominant (or the dominant) factor in overall airship design, gross vehicle weight, and cost. As a consequence, it would be beneficial if power requirements for stationkeeping could be reduced. For a single airship or tandem airships operating at a given altitude, the size and weight of the power generation and propulsion systems tend to be driven by the peak wind condition, since that determines drag and required power for stationkeeping. If a way could be found to minimize power generation and propulsion requirements during nominal and peak wind conditions, airships could be made smaller and would generally involve lower cost.

An interesting observation is that the wind direction in the lower stratosphere is commonly opposite to that of the wind at higher levels. For example, the wind in the lower stratosphere (around 60,000 to 70,000 feet) might be generally easterly for many months, white the wind at 120,000 to 140,000 feet is generally westerly during the same period of time. Meteorological data over the last 50 years indicate that the wind tends to "switch direction" roughly every 14 months, when winds are generally calm, with the switch in direction generally proceeding from high altitude to lower altitude (i.e., so there are short periods of time when this countervailing wind does not occur, but these periods occur when wind speed is generally low). After a switch in direction, the wind tends to remain moderate for many months, then it tends to experience a period of stronger winds for just a few months, followed by a decline to more moderate wind speeds for many months, and eventually another switch in direction. The behavior then repeats.

As discussed above, the power generation and propulsion requirements of airships for station keeping in atmospheric winds are significant drivers that affect the size and cost of airships. According to one implementation of principles described herein, a flexible tether as generally illustrated in FIG. 2 or FIG. 3 is extended to great length. In this implementation, a lower airship and an upper airship are connected by a long tether, allowing the lower airship to operate in the lower stratosphere and the upper airship to operate at a higher altitude such that the winds affecting the two airships tend to blow in opposite directions. The drag forces on the two airships operate in generally opposite directions, thereby tending to minimize the power used to maintain station close to a desired latitude and longitude.

Figure 10:
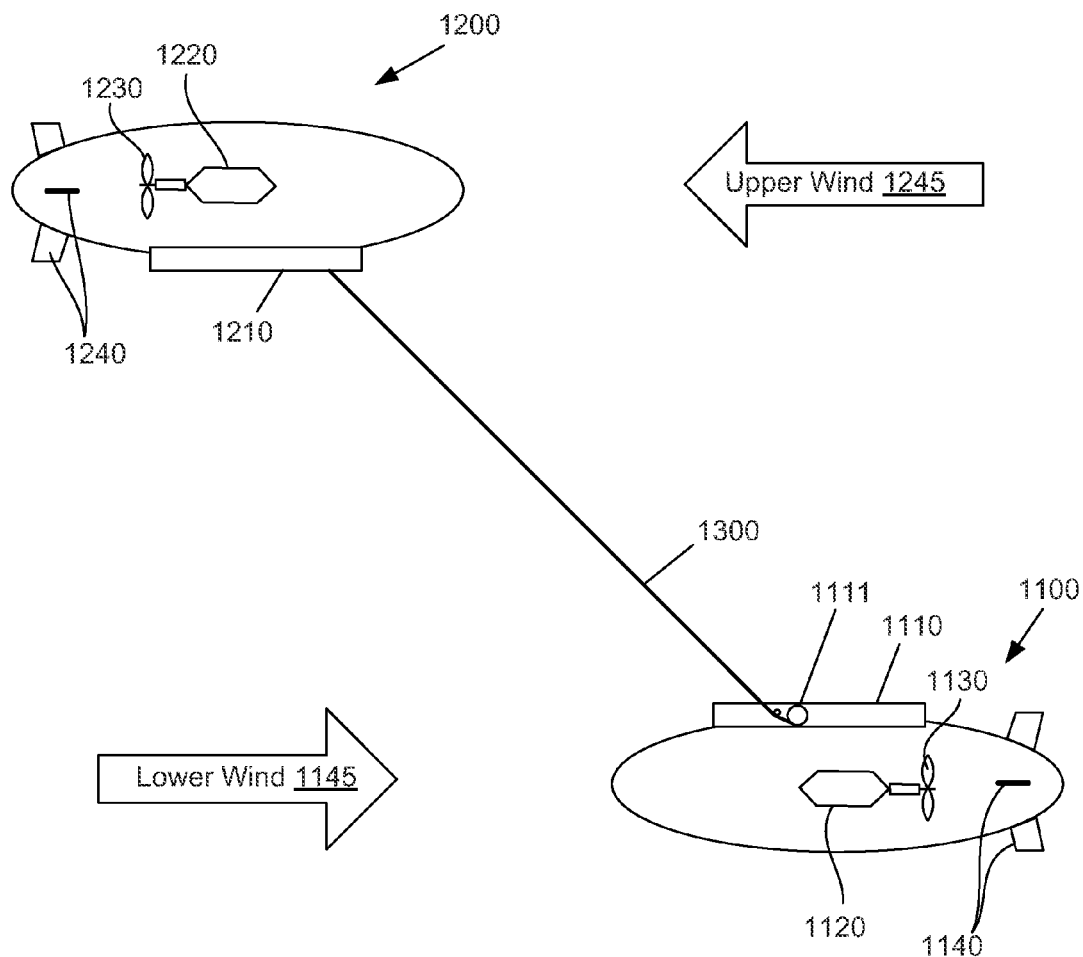
FIG. 10 is a schematic diagram identifying several of the subsystems of a tethered airship system, according to one example of principles described herein.

FIG. 10 illustrates a lower airship 1100, an upper airship 1200 and a tether 1300 connecting the airship 1100 and the airship 1200. The tether 1300 is attached to the airships 1100, 1200 via a tether attachment/deployment subsystem 1110 on the lower airship 1100, and a tether attachment/deployment subsystem 1210 on the upper airship 1200. The upper airship 1200 is designed to operate at a higher altitude than the lower airship 1100, while carrying the full weight of the tether 1300. In some embodiments, one or both of the tether attachment/deployment subsystems 1110 and 1210 comprises a deployment and retraction mechanism that can both deploy and retract the tether. In the example shown in FIG. 10, the tether attachment/deployment subsystem 1110 on the lower airship 1100 includes a reel 1111. The reel 1111 may include a variety of components, including a motor, drum, rollers, heaters, inspection equipment, and other components.

In this embodiment, one of the airships may carry a payload and be designated as the payload airship and the other airship may be a logistics airship that supports the payload airship. For example, the upper airship 1200 may be the logistics airship and the lower airship 1100 may be the payload airship. The upper airship 1200 supports the lower payload airship 1100 by providing stationkeeping forces through the tether. This reduces the amount of fuel that the lower payload airship uses for stationkeeping.

Both airships are illustrated with propulsion systems (not necessarily the same) identified generically by engines 1120 and 1220 and propellers 1130 and 1230. Inherently, these propulsion systems would be associated with a source of power. In some embodiments, only one of the airships is equipped with a propulsion system. Also, both airships are illustrated with horizontal and vertical stabilizers 1140, 1240. In some embodiments, these could be augmented with aerodynamic control surfaces (elevators and rudders) that would provide a degree of control over the airship's angle of attack, and the heading. In some embodiments, only one of the airships is equipped with horizontal and vertical stabilizers, elevators, and rudders.

The upper airship 1200 is sufficiently buoyant to carry its own weight and the weight of the tether 1300. In some embodiments, the tether 1300 is very long—possibly in excess of 20 km. It is designed to carry its own weight without snapping, as well as sustain the tensile loads placed on the tether 1300 by the two airships 1100, 1200 and the drag forces induced by the winds 1145, 1245. These tensile loads are discussed further below.

The tether 1300 is deployed to an adjustable length by action of one or both of the tether deployment and retraction mechanisms 1110 and 1210, which serve as attachment points for the tether and deploy and retract the tether. The tether deployment and retraction mechanisms are shown externally-mounted on the two airships but could also be internally mounted in other embodiments. These mechanisms 1110 and 1210 could be similar function and capability, or dissimilar. For example, in order to minimize weight of the upper airship, length adjustment elements such as a spool or reel, motor, brake/latching subsystems, and tether spooling/management subsystems (and the like) might be mounted on the lower tether deployment and retraction mechanism 1110 only, while the upper tether attachment/deployment subsystem 1210 comprises only an attachment subsystem. Alternatively, both tether deployment and retraction mechanisms 1110 and 1210 could comprise a reel, motor, brake/latching subsystem, heaters, tether spooling/management subsystem and attachment subsystem.

Figure 11:
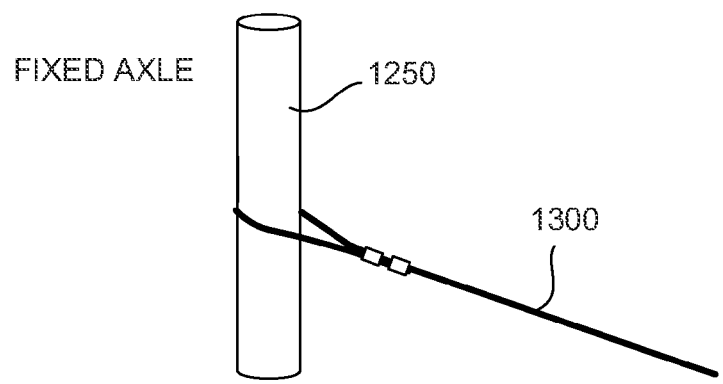
FIGS. 11 and 12 illustrate a fixed axle and a movable axle, respectively, for attaching a tether between two airships, according to one example of principles described herein.
Figure 12:
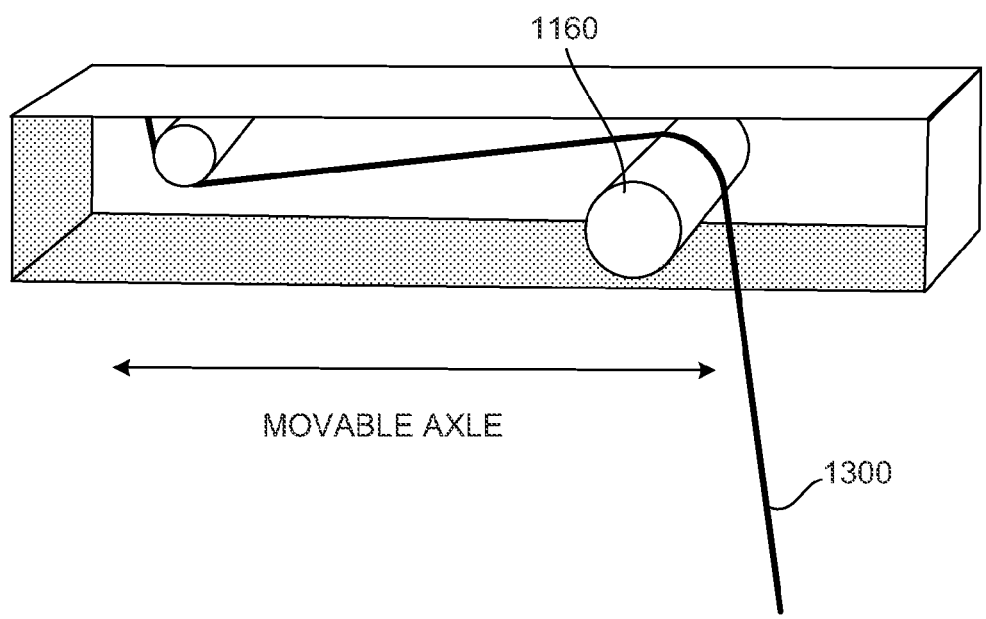

The tether deployment and retraction mechanisms 1110, 1210 may have a variety of configurations. For example, an attachment subsystem may have a fixed axle 1250 at which the tensile force of the tether is applied to the tether deployment and retraction mechanisms 1110, 1210, as shown in FIG. 11. The tether 1300 may be tied or fastened around the fixed axle 1250. Additionally or alternatively, one or more of the tether deployment and retraction mechanisms 1110, 1120 may include a variable position attachment point where the tensile force of the tether is applied to the tether deployment and retraction mechanisms 1110, 1210, as shown in FIG. 12. This could be achieved, for example, by anchoring the tether 1300 to a movable mount, or by passing the tether 1300 over a roller 1160 whose position within the tether deployment and retraction mechanism can be controllably adjusted. Such a system can be advantageously used to adjust the application of three to the airship, including the torques applied, which affect the dynamic stability of the system and the other forces that need to be applied (e.g., via horizontal control surfaces) in order to achieve a desired angle of attack.

Figure 13:
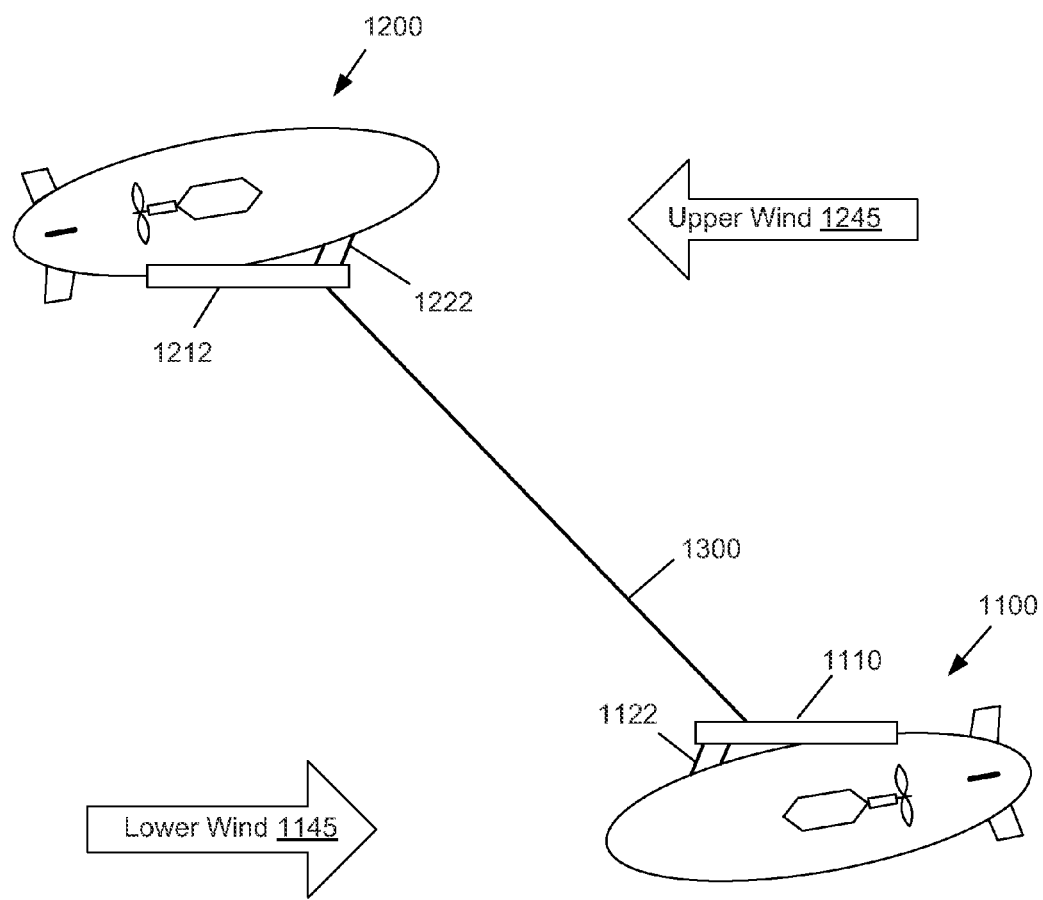
FIG. 13 illustrates in schematic form an upper and lower airship attached by a tether, where the tether attachment/deployment subsystems are attached to the two airships with a variable attachment angle, according to one example of principles described herein.

FIG. 13 shows one illustrative embodiment wherein the tether deployment and retraction mechanisms 1110 and 1210 have additional functionality to allow an adjustable angular separation, between the airship and attachment/deployment subsystem. This can allow the attitude of the airships and their associated drag characteristics to be controlled. In this implementation, this capability is achieved in part by a single or plurality of adjustable-length shroud lines 1222 and 1122, and associated shroud management subsystems (not shown), that allow for the angular separation between the airship and the attachment/deployment subsystem to be controllably adjusted.

In one implementation, the tether 1300 is in tension at every point along its deployed length, even in the absence of wind. Thus, the lower airship 1100 will float at an altitude above its own equilibrium because it is being pulled upward, and the upper airship 1200 will float at an altitude that is below its own equilibrium (even accounting for the weight of the tether) because it is being pulled downward. In the absence of wind and in the absence of propulsive force on both airships, the two airships would tend to float one above the other with the tether in tension between the two.

Returning to FIG. 10, also shown are lower winds W_Lower 1145 and upper winds W_Upper 1245, generally blowing in opposite directions. In response to the opposing forces associated with these winds, the upper airship 1200 and lower airship 1100 are laterally displaced with respect to one another and the tether 1300 adopts a generalized catenary shape under the influence of airship lateral and vertical forces acting at the tether ends, the weight of the tether itself due to gravity (a force acting downward at each point along the tether), and the varying forces along its length due to wind. However, if the tether had zero thickness and zero weight (only achievable with infinitely strong materials), it would be close to a straight line and its angle from the vertical would depend on the drag forces on the two airships and the difference in buoyancy between the two airships.

Figure 14:
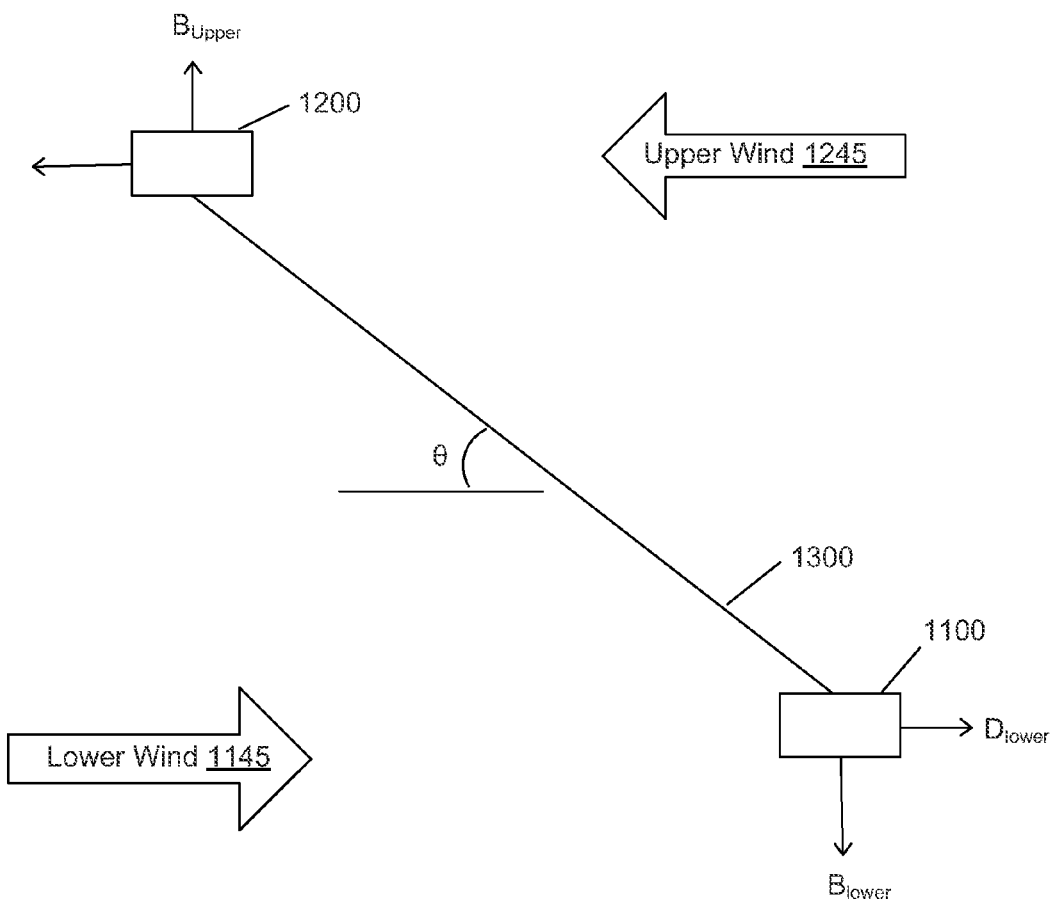
FIG. 14 is a force diagram showing the primary buoyancy and drag forces associated with two airships connected by a tether in countervailing wind conditions, according to one example of principles described herein.

FIG. 14 is a force diagram showing the dominant forces for the system illustrated in FIG. 10. Shown in FIG. 14 are drag forces D_Lower and D_Upper, operating in opposite directions, and buoyancy forces B_Lower and B_Upper, also operating in opposite directions since the lower airship 1200 is floating above its equilibrium altitude (it is negatively buoyant) and the upper airship 1200 is floating below its equilibrium altitude (it is positively buoyant). At equilibrium (no net forces acting on the system, and no net acceleration, although there may be a nonzero velocity), and ignoring the effects of tether weight and drag, the drag forces experienced by the airships are equal in magnitude and the buoyancy forces experienced by the airships are also equal in magnitude. The present principles allow this equilibrium condition to exist, or approximately exist, at zero ground speed even when winds aloft are strong. Similarly, even when considering a physical tether with weight and thickness (therefore a coefficient of drag that is greater than zero), the present principles allow for overall dynamic equilibrium of the system (no acceleration), or approximate equilibrium, at zero ground speed even when winds aloft are strong. A full accounting of the relevant forces includes the weight of the tether and the variable winds along its length. However, in operation it will be frequently possible to "fly the system" (make adjustments in operating parameters in real time) so as to achieve the desired flight objective based on navigation and meteorological data gathered only at the airships themselves. For example, and as discussed further below, if a net lateral drift is observed using standard navigational gear such as a GPS receiver, drag forces on one or both of the airships could be adjusted to halt the drift and/or return the airships to a more desired location.

For a tether of zero thickness and weight, under equilibrium conditions, the tension on the tether will have a magnitude equal to the square root of the sum of the squares of D_Lower and B_Lower, and it will have an angle with respect to the horizontal that is $\theta = \arctan(\|B_{Lower}\|/\|D_{Lower}\|)$. If $\theta$ is expressed in degrees, the angle with respect to the vertical be $90-\theta$.

Figure 15:
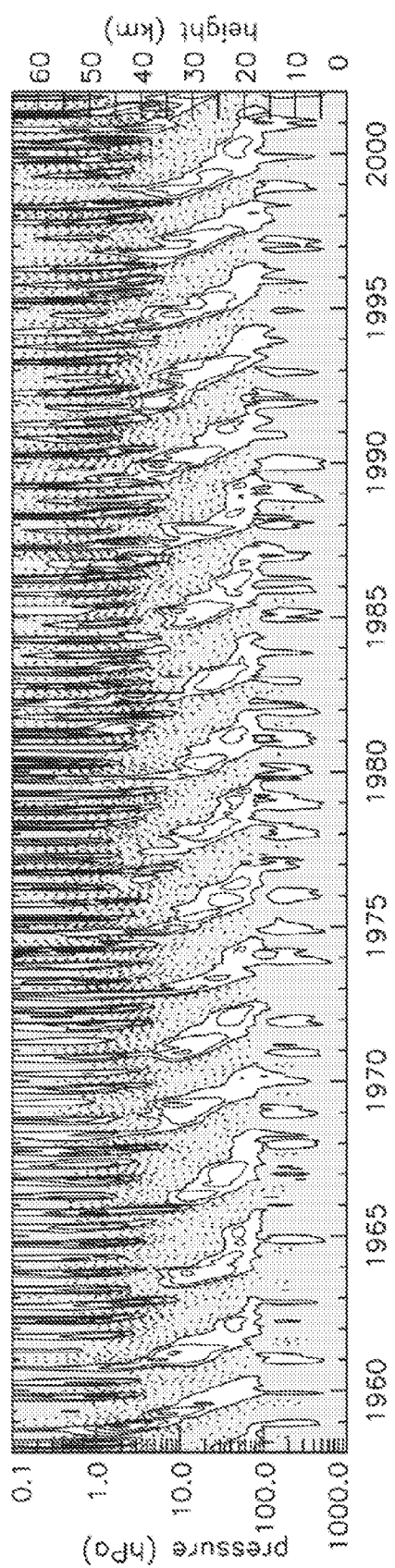
FIG. 15 is a graph of wind data, illustrating wind speed and direction as a function of altitude over a multi-year period.

As discussed above, a relatively large altitude separation ΔAlt between the two airships 1100, 1200 can increase the likelihood of the tethered airship system experiencing winds in opposite directions. FIG. 15 is a reproduction of winds-aloft data taken from Pascoe et al. (2005), "The quasi-biennial oscillation: Analysis using ERA-40 data", *J. Geophys. Res.*, 110. Easterly winds are shown as shaded areas and westerly winds are shown as unshaded areas. Contour intervals are shown at intervals of 10 meters per second. As may be seen in the graph, easterlies tend to be stronger than westerlies and periods of strong easterlies in the lower stratosphere (near 20 km altitude) tend to be associated with periods of strong westerlies in the upper stratosphere (near 40 km altitude), and vice versa. Opposing wind directions also manifest, to a degree, between winds near 20 km altitude and winds in the altitude range of 10-15 km.

If two airships connected by a tether were positioned at altitudes experiencing opposing winds, and if these two airships were constructed and/or operated to achieve roughly equal but opposite drag forces at zero ground speed, net propulsive forces for stationkeeping would be minimized. Furthermore, since each airship would experience high airspeed when winds are strong, airfoils and other large aerodynamic surfaces could be used to generate dynamic lift (either positive for the upper airship or negative for the lower airship) to increase the angle of the tether to the horizontal, or possibly "fly" the tandem combination to mutually higher or lower altitudes.

In order to achieve large altitude separation with minimum tether length, the buoyancy forces tending to separate the airships vertically should be large compared to drag forces tending to separate the airships horizontally. This condition can be achieved in the absence of wind by simply ensuring positive buoyancy on the part of the upper airship, at its maximum altitude and considering the full weight of the tether, since in this case drag is zero and any positive value of buoyancy for the upper airship (considering the weight of the tether) guarantees that the airships are flying one above the other with the tether in tension between the two. When winds are non-zero (presumably operating in opposite directions on the two airships), buoyancy forces can include contributions from dynamic positive lift on the part of the upper airship and dynamic negative lift on the part of the lower airship. Under equilibrium conditions and with altitude separation $\Delta$Alt, the length of a zero-thickness and zero-weight tether would be TetherLength=$\Delta$Alt/sin($\theta$). For practical tethers that have thickness and weight, the tether will follow a generalized catenary shape under the varying influences of drag and weight along its length, and so will be a curve instead of a line segment. The total length of tether for a given altitude separation $\Delta$Alt will therefore be greater than $\Delta$Alt/sin($\theta$).

As discussed in greater detail below, a tethered airship system for high altitude long endurance missions may include a first airship, a second airship and a tether. The first airship is configured to be equiliberally buoyant in a first altitude range while carrying the tether. The second airship is configured to be equiliberally buoyant in a second altitude range with the first altitude range being higher than the second altitude range. The tether connects the first airship to the second airship such that the first airship is at least one kilometer above the second airship. The tethered airship system may have a variety of configurations and illustrative examples are given below.

Aerodynamic Control

A variety of aerodynamic surfaces and techniques can be used in conjunction with the tethered airship system for operations including stationkeeping. These controllable aerodynamic surfaces can be used to compensate for different wind conditions and minimize the overall need for propulsion. For example, strong westerly winds may be experienced by the upper airship while the lower airship experiences more benign easterly winds resulting in lower drag at zero ground speed. To keep the tethered airships from drifting away from their desired station during stationkeeping operations, the lower airship could deploy aerodynamic elements, such as a parachute, that increase its drag. Additionally, aerodynamic surfaces could be used to alter the altitude of the airships and/or tension in the tether. These aerodynamic surfaces and techniques can also be used to controllably maneuver the tethered airship system laterally in an east-west or north-south direction, as well as providing for some altitude adjustment.

Figure 16A:
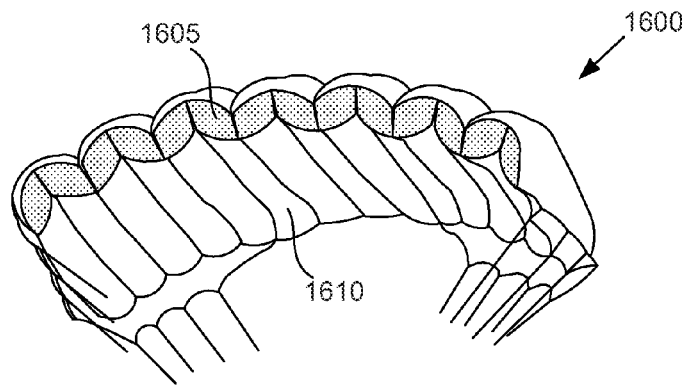
FIGS. 16A-16C illustrate a variety of parafoils that may be used in conjunction with an airship, according to one example of principles described herein.
Figure 16B:
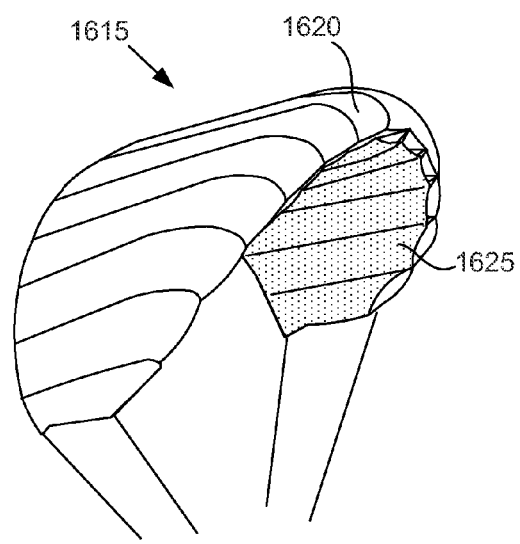
Figure 16C:
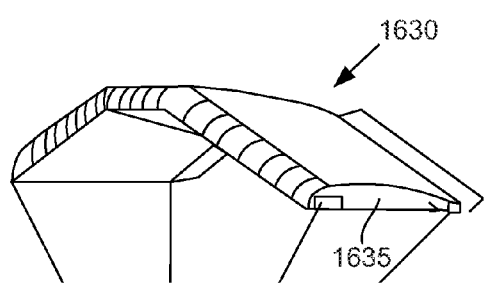

FIGS. 16A-16C are illustrative examples of parafoils that can be controllably deployed from an airship to alter its lift and drag characteristics. These parafoils can rely on inflation solely from the ambient wind, or contain air-tight "bladders" providing a degree of structure even in the absence of wind. FIG. 16A is a diagram of a ram filled parafoil 1600. Openings 1605 in the front of the parafoil 1600 gather air that is trapped inside cavities 1610 in the parafoil. This trapped air inflates the cavities 1610 and provides rigidity and aerodynamic shape to the parafoil 1600. For illustrative examples of ram filled parafoils, see U.S. Pat. No. 3,285,546, entitled "Multi-Cell Wing Type Aerial Device" to D. C. Jalbert.

FIG. 16B is an illustrative parafoil 1615 that combines sealed inflated bladders 1620 with air ram techniques. The sealed inflated bladders 1620 provide a basic shape to the parafoil even at zero wind speed. This allows the air ram openings 1625 to remain open and ready to accept air when the wind conditions are right. The sealed inflated bladders 1620 may contain a variety of gases including lighter than air gas, heavier than air gas, dry nitrogen, or atmospheric air.

FIG. 16C is another parafoil 1630 that has a more rigid construction and maintains an efficient lifting geometry. As can be seen in the figure, the parafoil has a cross section 1635 that resembles an airplane wing and can produce significant lift as winds pass over it.

Figure 17:
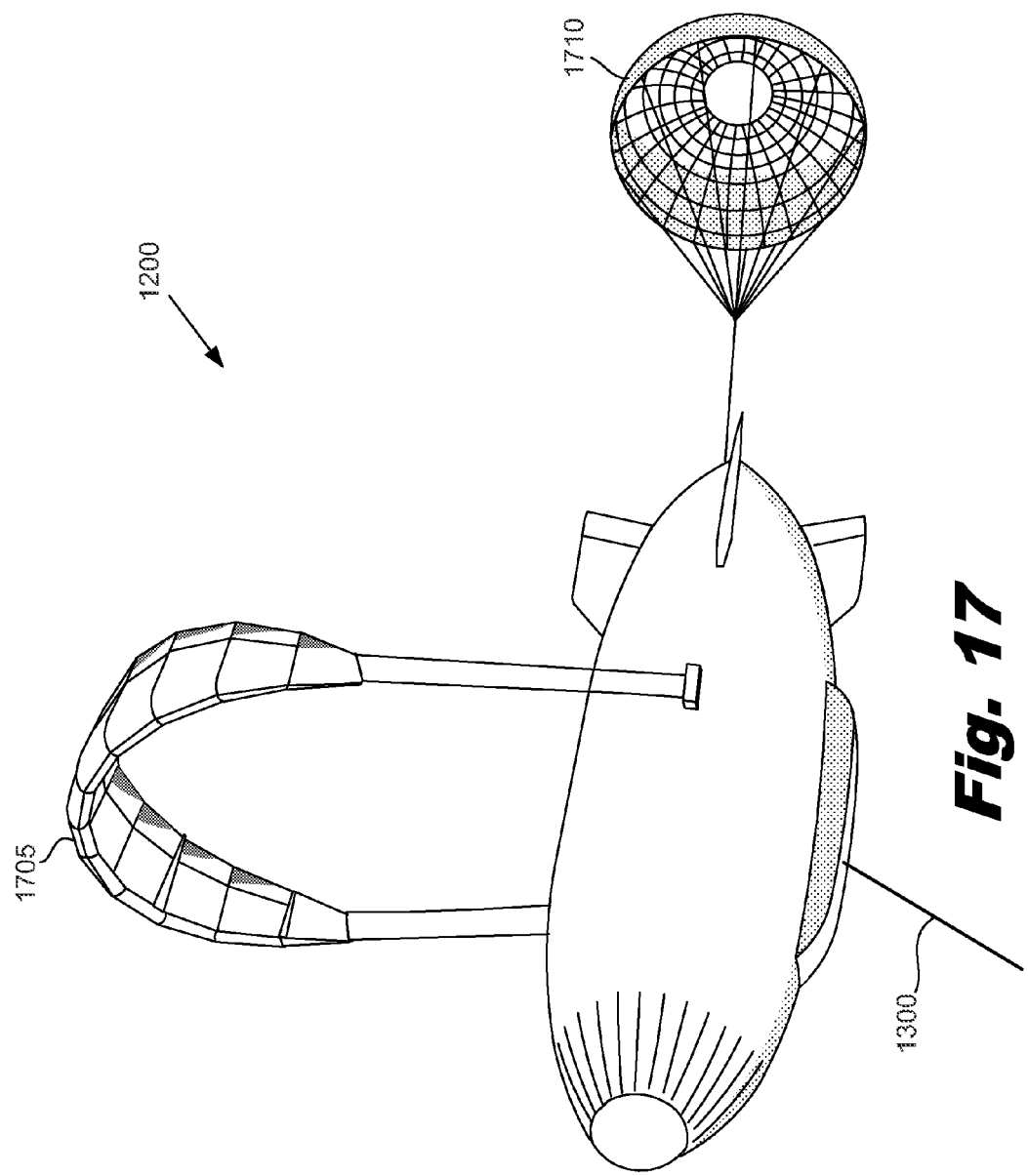
FIG. 17 is perspective view of an airship equipped with a parafoil and a parachute, according to one example of principles described herein.

FIG. 17 is a perspective view of an upper logistics airship 1200 that has deployed both a parafoil 1705 and a parachute 1710 to more effectively utilize the differences in wind speeds for station keeping. For example, the parachute 1710 may be used to increase the drag of the upper airship 1200 to compensate for stronger winds experienced by the lower airship. The parafoil 1705 may be used to produce lift to increase tension in the tether 1300 and/or lift the upper airship 1200 to a higher altitude. Each of the aerodynamic elements 1705, 1710 can be controlled to produce the desired dynamic lift and/or drag within the constraints of the system. While this illustration shows the upper airship as a dirigible shape with horizontal and vertical stabilizers and control surfaces, other designs are possible as discussed below. Dirigible shapes are frequently considered for operation in the troposphere and lower stratosphere, and could be used for both the upper and lower airship of a tethered pair designed to operate in the altitude range of 10-20 km altitude. However, at higher operational altitudes, such as 30-40 km, other designs, such as those illustrated in FIGS. 18 and 19, will tend to be preferred because of their reduced weight, and this benefit must be balanced against the effects of the increase in drag associated with the less aerodynamic shape.

In one embodiment contemplated herein, the parafoil 1705 contains bladders inflated with hydrogen to ensure that it flies at a higher altitude than the upper airship 1200 itself, even when there is no wind, and to also ensure that the parafoil inflates correctly in high wind conditions. In another embodiment, the parafoil 1705 contains bladders inflated with hydrogen or another gas to ensure proper inflation in low wind, but has insufficient buoyancy to lift itself off the upper airship 1200 in the absence of an ambient wind. The parafoil angle of attack and heading can be controlled via shrouds and control lines connecting the parafoil to the upper airship via suitable control line actuators to control line length and tension, allowing for controllable variation in lift and drag as well as allowing for some cross-wind propulsion. Furthermore, in some embodiments, the control lines can be reversibly "reeled in" to stow the parafoil against the surface of the airship and thereby minimize both lift and drag.

The lower airship can also be equipped with a parafoil. If it is desired to equip the lower airship with a parafoil designed for negative dynamic lift, the parafoil would fly below the lower airship but would still be controlled via shrouds and control lines connecting the parafoil to the lower airship via suitable control line actuators to control line length and tension. In one embodiment herein, a parafoil intended to provide negative dynamic lift contains bladders filled with carbon dioxide or an alternative heavier-than-air gas to ensure that it flies at a lower altitude than the lower airship itself, and that it inflates correctly in high wind conditions.

A parafoil provides both dynamic lift (positive or negative) and also increased drag. If increased drag is required, with or without a parafoil, a parachute or equivalent drag enhancement device can be used. For a particular wind speed (airspeed) and at full deployment, a given parachute will have a characteristic maximum drag. However, a variety of methods can be used to reduce the drag provided by a given parachute in a given wind condition, thereby modulating the drag to match requirements. For example, the size of the aperture can be reduced by constricting a control line running around the circumference of the aperture. Additional control lines can be spaced at parallel planes throughout the parachute to control the amount of fluttering material in the non-fully-inflated parachute. Alternatively, selected panels of the parachute can be opened to allow free (or more free) passage of air.

If drag forces experienced by the upper and lower airship are equal in magnitude but opposite in direction, at (or near) zero ground speed, stationkeeping propulsion requirements will be minimized. For airships of similar geometry, material composition, and heading with respect to the wind, drag forces are proportional to air density and airship surface area, and are also proportional to the square of airspeed. The drag force may be calculated as $$F_d = \frac{1}{2}\rho v^2 A C_d$$

where $\rho$ is air density, v is airspeed, A is the reference area and $C_d$ is the coefficient of drag. Air density varies by roughly an order of magnitude between the lower stratosphere (near 20 km altitude) and the upper stratosphere (near 40 km altitude), being lower at higher altitudes, and wind speed can as well. Wind speed tends to be lower in the lower stratosphere than the upper stratosphere. The tendency of wind speeds in the upper stratosphere to be higher than wind speeds in the lower stratosphere compensates to some degree for the reduced air density at higher altitudes; however, wind speed experienced by each airship, and the resulting drag forces, can vary from hour to hour. As a consequence, a variety of techniques may be used to equalize (or approximately equalize) drag forces between a lower airship and an upper airship. It should be noted that perfect equalization is not required since even partial equalization will reduce stationkeeping propulsion requirements; however, full equalization is a desired goal.

The following methods, among others, cat be employed to adjust drag forces on the upper and lower airships:
  Minor adjustments in drag can be achieved through the use of airbrakes and turning maneuvers (e.g., oscillating back and forth across the oncoming wind) on the part of the airship experiencing lower drag;
  The airship experiencing lower drag force can deploy a parachute if it has not already done so, or increase the drag coefficient of a deployed parachute if it is not already maximized (multiple parachutes can also be employed);
  The airship experiencing higher drag force can reduce the drag coefficient of a deployed parachute, or stow the parachute completely;
  The angle of attack of deployed parafoils can be adjusted to vary the amount of lift and drag. Also, if so equipped, the airfoil can be enlarged or reduced in size by alternately inflating or deflating selected lifting cells;
  The angle of attack of the airships themselves can be adjusted by use of horizontal control surfaces, or by changing the angle of the tether attachment/deployment subsystem relative to the airship as shown in FIG. 13;
  The length of the tether can be adjusted, in concert with other controllable factors affecting lift and drag, so as to fly the airships at altitudes where the drag forces can be equalized. Adjustments in positive and negative dynamic lift can be used to fly the two airships to higher or lower altitudes, and the length of tether can be used to adjust their attitude separation.

Tethers

The tether that connects the upper and lower airships is a significant element in the system. Ideally, the tether would be lightweight yet strong enough to avoid failure under the force exerted by its own weight as well as the drag and buoyancy forces (positive and negative) tending to separate the airships. A "simple tether" may be characterized as having uniform cross-section along its length and being homogeneous in material. However, a variety of other approaches could be used that include more complex tethers with non-uniform cross-section and inhomogeneous materials. For purposes of explanation, the system will be described with respect to an embodiment employing a tether with uniform cross-section and homogeneous material.

The strength of a tether material may be described by die tensile load it can sustain per unit of cross-sectional area. This metric may be variously expressed as pounds per square inch (psi), Pascals (Pa), Newtons per square meter ($N/m^2$), or atmospheres (as well as other units). Spun Kevlar, for example, has a tensile strength of 3620 million Pascals (MPa) which is roughly equivalent to 525,000 psi. Spectra 2000, a commercially-available fiber from Honeywell, has a tensile strength of 3500 MPa. Quartz fibers can achieve 20,000 MPa which is roughly equivalent to $2.9 \times 10^6$ psi. Currently-available carbon fiber reinforced polymers (CFRP) have tensile strengths as high as 400 GPa; however, the inventor is not aware of long tethers constructed of this material, to date. Both spun Kevlar, and quartz fibers, can be used to construct tethers of great length. In the future, other materials such as Spectra 2000, CFRP or carbon nanotubes might be constructed into long high-strength tethers. The inventive concept incorporates these and other materials, keeping in mind that the objective is high strength and light weight. It is also recognized that a tether for an operational system such as described herein might have other (possibly non-load-bearing) components such as sheathing for environmental protection, and possibly electrical conductors or optical fibers adapted for communications and/or power transfer between the upper and lower airship. These components would add weight, but are not further addressed herein. It is also noted that some materials, such as carbon nanotubes developed in the future, might provide high strength along with electrical and/or optical conductivity.

As a strawman, consider a tether able to sustain a load of 50 kN. If constructed of spun Kevlar or Spectra 2000 with a tensile strength of approximately 3500 MPa, such a tether would have a cross-sectional area of 0.15 $cm^2$ (diameter ~0.4 cm). If constructed of drawn quartz with a tensile strength of 20 GPa, such a tether would have a cross-sectional area of 0.025 cm² (diameter ~0.2 cm). As a point of reference, the NASA Concept 12 airship described in Nickol, et, al., 2007 (NASA/TP-2007-214861), sustained peak drag forces in the lower stratosphere of 13 kN. This was a relatively large airship. If this airship were used as a strawman for the lower airship in the inventive concept, the upper airship would also have to experience a drag force of 13 kN, during peak winds, in order to allow the combined system to remain relatively stationary. Buoyancy forces would have to be larger than this value in order to keep the tether angle "theta" greater than 45 degrees (hence avoiding excessive tether length). With buoyancy forces equal to or slightly larger than the drag forces, total tension on the tether would be on the order of 20 kN. Thus, a 50 kN tether would offer a safety factor of 2.5:1. The drag forces, buoyancy forces, and safety factor used here are for illustration only.

The total weight of a tether can be calculated from knowledge of its density and its total volume which is equal to its cross-sectional area times its length. Spectra 2000 has a density of about 1 gram/cubic centimeter (1 g/cc); Kevlar has a density of approximately 1.44 g/cc and quartz has a density of approximately 2.65 g/cc. A 30 km tether able to sustain a load of 50 kN, constructed of Spectra 2000, would have a weight of roughly 460 kg. A 30 km tether able to sustain a load of 50 kN, constructed of spun Kevlar, would have a weight of roughly 600 kg. A 30 km tether able to sustain a load of 50 kN, constructed of drawn quartz, would have a weight of roughly 200 kg. Future materials might offer equivalent or higher load bearing capability with lower weight. For example, researchers interested in developing a space elevator have set a goal of roughly 30 MegaYuri (30 MYuri) as a desirable threshold for a tether material, where the metric "MYuri" refers to the tensile strength in GPa divided by the density in grains per cubic centimeter. In terms of this metric, Spectra 2000 demonstrates about 3 MYuri (i.e., specified values for the raw material are in the range of 3.5 MYuri, and a 2 m test length has already demonstrated a performance of 2.8 MYuri). Space elevator researchers have noted rapid progress in tether materials with specific focus on carbon nanotubes. However, even the currently-available materials can be used to construct useful tethers that can be held aloft by a suitably-constructed upper airship. Considering that the force exerted by a kilogram mass is 9.8 Newtons, even the spun Kevlar tether represents a load of only 6000 N that may be accommodated within the 50 kN strawman tether design (although design margin is reduced). Of course, it is also possible to adjust the design of the tether slightly to increase its cross-sectional area and overall strength.

Balloon Designs

Figure 18A:
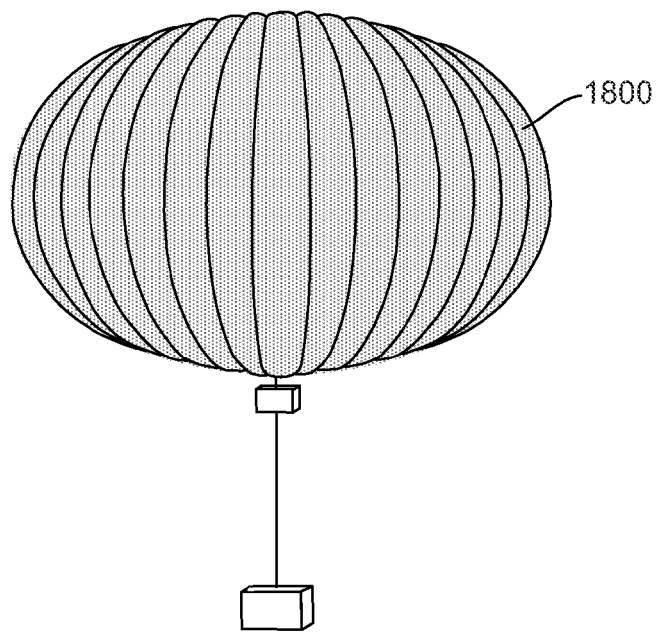
FIGS. 18A-18D illustrate various high altitude airship configurations that incorporate a pumpkin-lobed balloon design, according to one example of principles described herein.
Figure 18B:
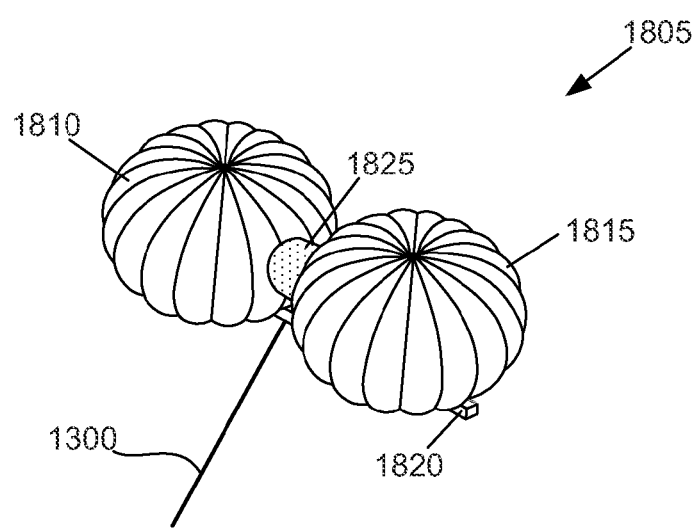

A wide variety of designs could be used for the airship that operates in the lower stratosphere. The upper logistics airship is more challenging since the upper stratosphere has lower density, yet the upper airship must carry the weight of the tether (potentially 600 kg or more using currently-available materials). The Japanese space agency, JAXA, has supported high-altitude balloon experiments for several years, and has recently (2003) flown a super-pressure high-altitude balloon to an attitude of 53 km. The balloon featured a thin-film "pumpkin-lobed" design with a lifting volume in excess of 60,000 m³. A generic "pumpkin-lobed" high altitude balloon 800 is illustrated in FIG. 8A. JAXA has also proposed a very large balloon of 500,000 m³ that could carry its own weight plus 1700 kg to a height of 38 km. While JAXA has not, to the inventor's knowledge, conceived of a tethered system such as described herein (e.g., with a tether, parafoil, parachute, dual-airship concept, or drag cancellation technique), this generic high-altitude lift capability would be adequate for certain embodiments of the upper airship as described below. Another possible design, able to carry aloft a 600 kg tether along with other required hardware, is illustrated in FIG. 18B. This figure shows a double balloon 1805 in a dumbbell configuration, based on a 300,000 m³ JAXA balloon concept. The double balloon 1805 includes a first lobe 1810 and second lobe 1815 that are connected by a tube 1825. In this illustrated embodiment, each lobe of the dumbbell-shaped balloon is envisioned to have a volume on the order of 300,000 m³ in order to support a useful lifting capacity (i.e., beyond the weight of the balloons themselves) on the order of 900 kg. The tube 1825 may perform a number of functions, including mechanical support and/or gas transport between the first and second balloon in order to e.g. support changes in angle of attack. A double balloon with a controllable seal between the two would also provide a measure of additional safety since a puncture of one balloon or the other would not result in total loss of buoyancy (although the resulting system would certainly descend to a lower altitude). An equipment gondola 1820 is suspended below the double balloon 1805. The equipment gondola (not drawn to scale) supports housekeeping functions and a tether attachment system with either a fixed or movable attachment point for a tether 1300. One possible alternative to the dumbbell shaped balloon of FIG. 18B would be two separate balloons each attached to the equipment gondola.

Figure 18C:
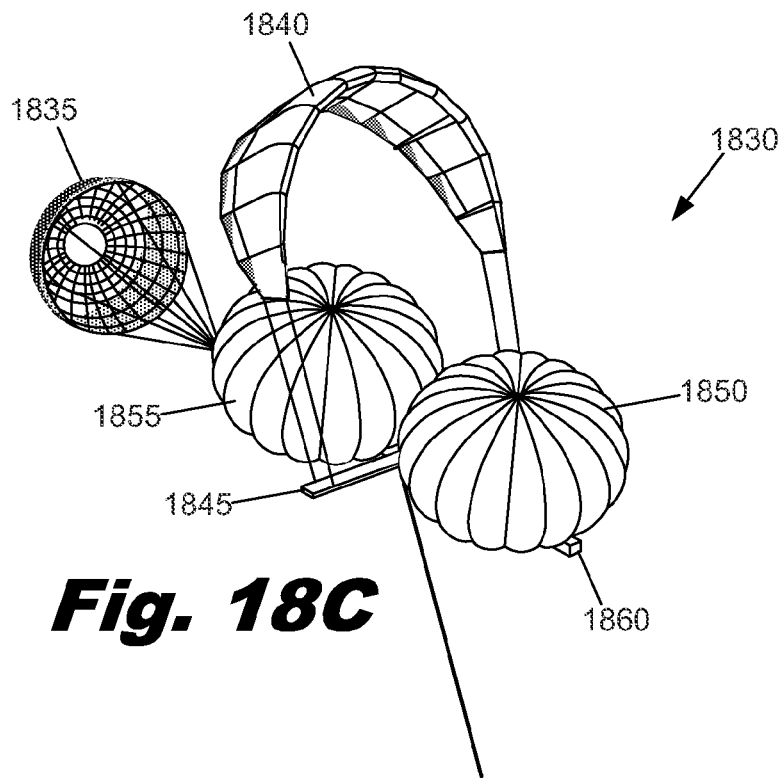

FIG. 18C is a not-to-scale perspective view of a double balloon system 1830 that includes two lobes 1850, 1855, an equipment gondola 1860, a parachute 1835, and parafoil 1840. The equipment gondola 1860 is suspended from the two lobes 1850, 1855. The illustrated concept also shows a parachute 1835 attached to the equipment gondola 1860 and parafoil 1840 attached to a transverse beam 1845 that has a direct mechanical attachment to the equipment gondola 1860. Parachute and parafoil control hardware is not shown but is assumed to be present in the equipment gondola and transverse boom, respectively.

Figure 18D:
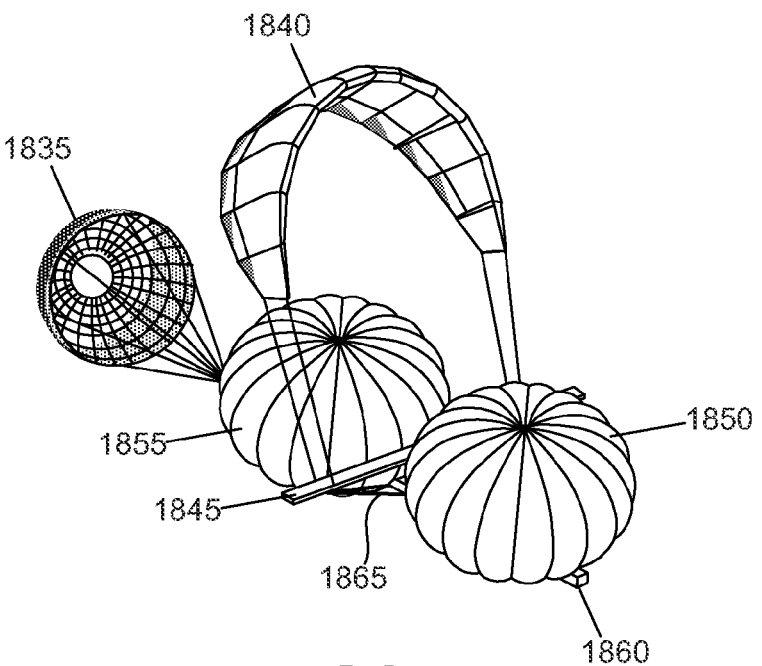

A variety of other arrangements based on this concept could also be used. For example, the transverse beam 1845 may be attached to the equipment gondola 1860 via suitable lines or cables 1865—possibly constructed of the same material as the tether as shown in FIG. 18D. In this example, the parafoil 1840 contains a buoyant gas such as hydrogen so that it floats above the balloon lobes 1850, 1855 and partially or completely supports the transverse beam 1845 in zero-wind conditions. In an ambient wind, the parafoil 1840 fills with air and provides dynamic lift. The lift and drag characteristics are controllable via action of control lines. The parachute 1835 provides adjustable drag, and in combination with the tether, ensures proper orientation of the system in the wind.

Figure 19:
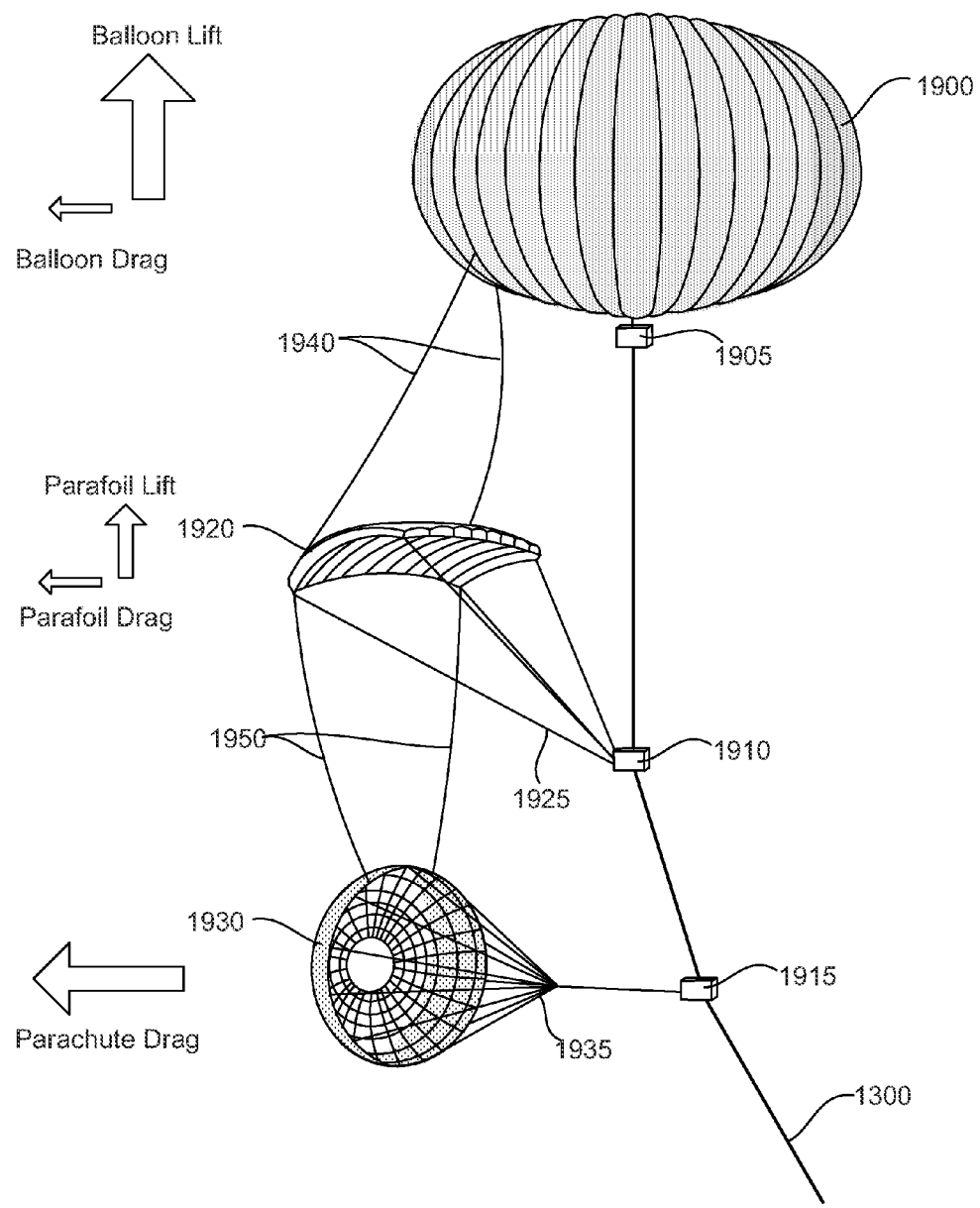
FIG. 19 illustrates a high altitude balloon with controllable aerodynamic elements, according to one example of principles described herein.

Another possible alternative is to use a single larger balloon as illustrated in FIG. 19. Here, the upper logistics airship 1900 is a pumpkin-lobed balloon with a tether attachment subsystem 1905 that also serves as an equipment and electronics gondola. Solar cells, batteries, power management and distribution equipment, radios, navigation receivers, computers, and the like, are collectively not shown but are present and provide for the power needs of the upper airship and the command and control of its associated systems. In addition to the primary tether attachment subsystem 1905, there are two additional equipment packages 1910 and 1915 illustrated as being spaced apart from one another along the tether 1300. Equipment package 1910 serves as the anchor for the parafoil 1920 and also comprises the control electronics and actuators for the parafoil shroud/control lines 1925. The parafoil 1920 can thereby be controlled with respect to its angle of attack, L/D ratio, and orientation to allow for lateral lift forces. Equipment package 1915 serves as the anchor for the parachute 1930. Shroud lines and control lines 1935 are not differentiated in this figure, but allow the control electronics and actuators to adjust parachute aperture size, and therefore drag, even while the parachute is operating but firmly anchored to the equipment package 1915. Alternatives to this approach include control electronics in the parachute itself, and controllable vents in the parachute to reduce drag (i.e., as an alternative to adjusting aperture size). While FIG. 19 illustrates a pumpkin-lobed balloon-shaped airship in recognition of the relatively low weight of the hull associated with this design (i.e., to encompass the necessary lifting volume), other shapes are feasible. For example, a more dirigible-shaped airship would require a heavier hull to encompass a given lifting volume (and must therefore be even larger, encompassing a larger lifting volume, in order to carry the increased mass to altitude), but can reduce the drag forces experienced in operation. This, in turn, can potentially reduce the size and weight of other elements of the system (such as the parafoil and parachute(s) associated with the lower airship).

If the tether 1300 is made up of multiple sections connecting packages 1905, 1910, and 1915 to the lower airship system (not shown), then the equipment packages 1910 and 1915 are designed to sustain the maximum load anticipated for the system as a whole. This load would be upper bounded by the bursting strength of the tether. Conversely, if the tether is continuous and equipment packages 1910, 1915 are merely mounted on, or attached to, the tether, the equipment packages could be less robust. However, in this case they are designed to sustain the lift and drag forces associated with the parafoil and parachute.

FIG. 19 also shows suspension lines 1940 running from the balloon 1900 to the parafoil 1920, and additional suspension lines 1950 running from the parafoil 1920 to the parachute 1930. These illustrated lines 1940 and 1950 should be interpreted as being indicative of a suspension function; additional suspension lines could exist, and the placement of the suspension lines can be adapted to specific designs. However, the purpose of the suspension lines 1940, 1950 is made evident when considering the zero-wind condition and the need to avoid entanglement between the various elements of the system. Thus, in a zero-wind condition, the parafoil will be suspended from the balloon and will be spaced away from its equipment package 1910. Furthermore, it will be in a configuration favoring proper inflation in the wind. No additional bladders of lifting gas are required in the parafoil (although they are not precluded). Similarly, the suspension lines 1950 provide support for the parachute, which in a no-wind situation will be spaced-away from its equipment package 1915 and be in a configuration favoring proper inflation. In one example, the lengths of the suspension lines are selected so that, when the parafoil and parachute are inflated, the suspension lines 1940 and 1950 are substantially slack and do not interfere with the operation of the parafoil and parachute.

In general, the parachute and parafoil may be connected to the airship, the tether, or both the airship and the tether. These connections may be load bearing connections or suspension connections. For example, in FIG. 17, the parafoil and parachute are connected directly to the airship. In FIG. 19, the parafoil and parachute have load bearing connections to the tether with suspension connections to the airship. In some examples, the parafoil and parachute may be connected only to the tether.

The block arrows on the left-hand side of FIG. 19 indicate qualitatively the relative magnitudes of the lift and drag forces generated by the balloon, parafoil and parachute under peak wind loading conditions. The balloon provides the dominant lifting force, since it carries the entire system even in the absence of wind. Surprisingly, for its large size, the drag forces at an altitude of 40 km are generally small even in wind equal to the maximum wind speed encountered by the lower airship. Hence, for the balloon, the lift force is shown as a strong upward arrow and the drag force is shown as a weak (thin) horizontal arrow. The ratio of magnitudes can be 10:1 or 20:1, or even greater. Hence the upper part of the tether, between 1905 and 1910, will be almost vertical under most operational conditions.

During high winds, the parafoil provides the additional lifting force to ensure that the majority of the tether (the portion extending down to the lower airship) remains relatively vertical. A parafoil can generally achieve a ratio of lift to drag of between 1 and 5, so the parafoil is shown with a drag force that is somewhat weaker than the lift force. In this implementation, the parachute contributes only drag (i.e., in order to help balance the drag experienced by the lower airship).

System-Level Considerations Relating to Atmospheric Density and Lifting Capacity Because of the change in atmospheric density with altitude, and the consequent reduction in lifting capacity with altitude, there is a general incentive to install hardware on the lower airship instead of the upper airship, wherever such a choice is feasible, assuming no overall weight penalty is incurred. Where an overall weight penalty is incurred, more detailed design tradeoffs need to be performed.

One area where a detailed tradeoff can be of benefit is power generation. Both airships require electrical power in order to maintain housekeeping functions, control the various controllable structures (such as tether attachment systems, parafoils and parachutes), report their status by e.g. radio, and receive commands. Payload systems are also supplied with power (generally on the lower airship, although this is not a limitation of the inventive concept). If one limits discussion, for pedagogical reasons, to electrical power generation subsystems which derive from renewable sources, possible technologies include solar power and wind power (see below). These could be installed on the lower airship, the upper airship, or both airships. The upper airship is generally disfavored as a host platform for satisfying all power generation needs of the system (although not strictly eliminated from consideration) because it is generally more difficult to carry a power generation system of a given weight on the upper airship, as compared to the lower airship. Furthermore, if the majority of the electrical load is associated with the lower airship, a significant penalty may exist in transferring the power to the point where it is needed.

Because of the considerations noted above, one illustrative system relies on either a dual power generation subsystem with power generation on both platforms tailored to the needs of each platform individually, or a single power generation subsystem hosted on the lower airship, with a portion of the power transferred to the upper airship.

In a dual power generation concept, both airships would generate their own power, sufficient to satisfy their needs with margin, using e.g. wind or solar generators, or both. Energy storage subsystems, such as batteries or their equivalent (along with power management subsystem to handle charging/discharging and battery maintenance) would also be hosted on both platforms, in order to satisfy real-time electrical load requirements during periods of no wind, or darkness. Power requirements on the upper airship are expected to be relatively modest for many operationally useful systems, and could therefore be accommodated with relatively small wind and/or solar power generation subsystems. Power requirements on the lower airship are expected to be larger; providing a separate power generation subsystem on the lower airship, designed to accommodate the needs of the lower airship, removes this weight burden from the upper airship.

In order to further reduce the required lifting capacity of the upper airship, all the power generation needs can be satisfied by the power generation subsystem on the lower airship with some of the power (or energy) being transferred to the upper airship. The energy transfer mechanism will have a weight penalty of its own that is taken into account in the overall design of the system. Means of power transfer include, inter alia: a) AC or DC electrical power transfer via conductive lines embedded in the tether or attached to the tether (or perhaps provided by separate strands of the tether itself (if the tether material can be engineered with either high or low conductivity according to need); b) free-space electromagnetic power transfer (e.g., microwave or laser with an emitter on the lower platform and a receiver on the upper platform); and c) physical transfer of an energy storage device, such as a battery or fuel supply, using a shuttle subsystem running up and down the tether in the same or a similar manner as currently envisioned for a space elevator. Each of these alternatives has a potential weight penalty that needs to be considered. The AC or DC power transfer approach may increase the weight of the tether, which is carried by the upper airship, and there may be a significant loss of power along the length of the tether which would increase the size of the power generation subsystem on the lower airship, to the point where power transfer between the airships may not be an optimum approach. The free space power transfer approach avoids direct impact to the tether, but involves a weight penalty on the upper airship (for the receiver and power conversion subsystem) as well as the lower airship, and also involves an efficiency penalty that increases the overall size of the electrical power generation subsystem on the lower airship. The physical transfer approach nominally offers high transfer efficiency, but such systems still involve a weight penalty on both platforms (as well as the weight represented by the transfer battery or fuel and the shuttle itself), may potentially require an energy expenditure to move the shuttle up and down the tether, and are relatively unproven in practice.

As a consequence of these diverse considerations, a detailed system design and tradeoff study can be used to determine whether power should be generated on both platforms, or only one platform with a portion of the power subsequently transferred to the other platform. The results will depend on the specific design of the airship system, the electrical power needs of the two platforms and the available state of the art in terms of stratospheric wind power generation, solar power generation, and the various power transfer methods noted above.

Wind Power

With two airships tethered together at different altitudes, balancing wind-induced drag forces so that they are effectively stationary (or approximately stationary) with respect to the Earth, each airship will experience an effective ambient wind (although the wind may not be the same for the two airships). It is possible to take advantage of this wind on one or both of the airships, when the wind is present, to generate electric power. A dedicated wind turbine could be used; alternatively, electric motor(s) and propeller(s), used for propulsion, could be designed to also provide wind-generated electric power when they are not being used for propulsion. This could be used to recharge batteries or perform other useful tasks. The extra drag induced by the wind on the wind generator must be accounted in the overall design of the tethered airship system.

The amount of power in wind is derived from the kinetic energy of the air mass. Kinetic energy is $$KE = \left(\frac{1}{2}\right)mv^2,$$

measured in joules, where m is mass and v is its velocity. For example, a cubic meter of air at approximately 18 kilometer altitude, moving a 1 m/s, has amass of about 0.2 kg and represents kinetic energy of about 0.1 joule. As wind speed increases, total power goes up for two reasons: a) the kinetic energy of each "unit volume" of air is increased; and b) more "unit volumes" of air become available at a wind generator per unit of time. Hence, total wind power is actually proportional to the cube of wind speed, and is given by $$P_{wind} = \left(\frac{2}{2}\right)A\rho v^3,$$

where A is the area of an aperture (such as a wind-electric generator), $\rho$ is the density of the air, and v is the speed. The maximum amount of power that can be extracted from wind is 59% of the total (the Betz limit); current state-of-the-art systems can come within 70%-80% of this theoretical limit. For a stratospheric system, it is assumed for illustrative purposes that the system can come within roughly 50% of the theoretical limit, or 30% of the total amount of energy contained in the wind. Hence, at an altitude of 18 kilometers, it might be possible to extract 0.03 W with a small wind turbine having an effective aperture of 1 $m^2$, in ambient wind of 1 m/s. This is not very much. However, the available power will scale linearly with aperture size and as the cube of wind speed. So, for example, a 30 $m^2$ aperture (diameter ~6 m) can potentially generate about 1 W of power in wind of 1 m/s, and 1000 W of power in wind of 10 m/s. Larger turbines (or equivalent) can generate more power, Thus, an airship with a moderate-sized wind-electric generator, and designed to be frugal in its use of electric power, might be self-sustaining for an indefinite period in the projected wind conditions.

Both the lower and upper airships can support wind-electric generators, although the designs might vary to match the anticipated ambient conditions. The ambient atmospheric density at the upper airship is low compared to the lower airship; however the wind tends to exhibit a higher velocity. Thus, it is still possible to generate useful power from wind at the upper airship. Alternatively, in order to minimize the weight carried by the upper airship, the lower airship might support a wind-electric generator and provide a portion of the electric power to the upper airship via any of the transfer mechanisms discussed above.

A traditional prior-art HALE airship in the lower stratosphere consumes a significant amount of fuel (or battery charge) in order to perform station keeping in high winds; conversely, its power requirements during calm conditions are relatively modest. If the power requirement for station keeping in high wind is substantially eliminated due to drag balancing with a tethered airship operating at a higher altitude, a relatively modest wind power generation capability might provide for effectively indefinite operation without refueling or replenishment, and without reliance on solar power.

If separate wind power and airship propulsion systems are provided (e.g., a wind power generation subsystem and a separate electric motor and e.g. propeller-driven propulsion system), excess wind-generated electric power could be used in real time or stored in a battery for later use) to drive the electric motor and e.g. propeller-driven propulsion system. This would provide another mechanism to maintain station-keeping in the case of unbalanced drag forces, or provide for commandable movement of the airships from one location to another.

Solar Power

Photovoltaic power systems and other solar power subsystems appropriate for use an airship system exist and are continuing to mature rapidly. Currently-available technology allows for relatively light-weight power generation subsystems that would be suitable for both a lower stratospheric airship and an upper stratospheric airship, particularly with drag forces essentially neutralized. Solar flux is highly predictable, and many solar power systems, such as photovoltaic systems, have no moving parts. This can significantly improve the reliability of a stratospheric system during long duration missions.

A hybrid system, combining a relatively small complement of solar cells, and a relatively modest regenerative wind power system, might provide a reliable dual-source energy supply that can take advantage of the dissimilar benefits of wind and solar power. A hybrid system for the lower airship might also rely on solar cells and battery storage for nominal power needs during the majority of conditions, including all daytime conditions, augmented with a combination of stored hydrogen and fuel cells for extreme peak power requirements during night-time conditions. In such an embodiment, hydrogen can be resupplied as needed from the ground using a logistics airship adapted to this function.

Power Generation Via Ambient Electric Field

A vertical voltage gradient exists in the atmosphere. Typical values of the gradient, near the Earth's surface, are on the order of 100 V/m. This vertical voltage gradient has been used, for example, to power a small electric motor or toy from a kite flying a few hundred feet above the surface. In this prior-art system, the kite supports a foil collector and a thin conductor running along the kite string (or taking the place of the kite string) allows an electric current to flow to ground. The electric motor, toy, or other small device is interposed between the kite's conductor and Earth ground, and so perceives a voltage difference across its terminals and also a small electric current. White the voltage difference is large, the current is small because it is limited by the rate of electrostatic charge buildup on the kite. Hence total available power is generally small.

Electrostatic charge buildup can occur when two dissimilar materials are rubbed together, or brought into close contact and separated (as with air across the surface of certain materials, or silk rubbed on a glass rod). This phenomenon is referred to as triboelectric charging. Air has a tendency to give up electrons (thereby becoming positively charged), while other materials such as polyurethane, kapton, and Teflon have a tendency to accept electrons (thereby becoming negatively charged).

In the present system, the airships have large surface area and the vertical separation between the airships is on the order of tens of km. One method of generating power is, therefore, to encourage and promote a flow of electric current from one airship to another, driven by the ambient electric field, with one airship acting as a net source of electrons and the other acting as a net sink (i.e., bleeding electrons back into the atmosphere). However, it should be recognized that the typical potential difference between the lower and upper stratosphere is much smaller than one might calculate based on near-Earth measurements. The voltage gradient decreases exponentially with height, and one measurement of the vertical electric field performed at a height of 31 km (in a polar region) indicated a voltage gradient of only 0.2V/m. If this value is used as a rough average for the environment of the tethered airships, total expected voltage difference under typical operating conditions would be on the order of 4000V for an altitude separation of 20 km.

The available power can be no larger than the product of the voltage difference times the current flowing between the airships, and could be much lower than this value if transmission losses are significant. The amount of current that can be generated via tribolectric charging is generally predicted to be small. One estimate of maximum charging rate, provided by the United States Air Force, is:

$$I_t = I_c \times SA \times V / 600$$

where $I_t$ is the static charging rate (the maximum steady-state current flow that could be sustained by the system), $I_c$ is the charging rate per square meter of frontal surface area (a function of the aircraft surface material and the operational environment), SA is the frontal surface area of the aircraft or airship, and V is the velocity in knots. For examples and additional information see "Test Operations Procedure (TOP) 1-2-511 Electromagnetic Environmental Effects System Testing." For a metallic aircraft flying through precipitation in the troposphere, a suggested value for $I_c$ is 400 uA/m². In the absence of precipitation, but other factors held constant, the charging rate in the troposphere is much lower. Based on this expression, even a large frontal area for an airship (such as 1200 m²) and a high wind speed (such as 50 meters per second) would result in a current no higher than 80 mA in precipitation (and substantially less in the absence of precipitation, or at lower wind speed). Multiplying by 4000V, the total power available via the ambient electric field, for two airships vertically separated in the stratosphere by 20 km, is predicted to be substantially less than 300 W—perhaps on the order of only a few watts in the absence of precipitation, and at lower wind speeds. Therefore, it seems unlikely that a triboelectric power generation system could generate significant amounts of power, or that the weight penalty of such a system could be justified when compared to solar or wind-based alternatives.

Nevertheless, if the physics of triboelectric charging in the stratosphere allows for significant charging rates under typical operating conditions (higher charging rates than suggested by the data provided above), a power system based on the ambient voltage gradient and achievable current flow could potentially be built and used by the tethered airships. In order to explore this question, triboelectric charging rates in the stratosphere would have to be assessed for various candidate materials and structures. The assessment could proceed through testing of small patches of candidate materials and structures, connected to a measurement system of an airship operating in the lower stratosphere, with excess charge eventually bled-off through standard discharge structures. Initial materials for consideration include polyurethane, KAPTON and TEFLON (among others), which all tend to accept electrons from the air. One or several of these materials could be coated on a conductive film that would then act as the electrode of an electric circuit spanning the test measurement system and the discharge structure. Care should be taken to engineer the structure to promote electron transfer from the outer coating (i.e., the material such as polyurethane, KAPTON or TEFLON selected because of its tendency to accept electrons from the ambient atmosphere) to the conductive film.

If a suitable material and electrode structure can be found, which promotes charge transfer from the atmosphere and to a conductive element, one could then examine the predicted power generation capability for a tethered airship system as well as the projected weight penalty, to assess the benefits of such a system in comparison to the competing systems based on wind and solar power. The flow of electric current would allow useful work to be performed on both the lower and upper airship. Furthermore, the flow of electric current along the tether (in support of this or alternative power transfer strategies discussed previously) provides for powering other devices and sensors that may be spaced along the length of the tether.

One possible electrode structure was recently reported by researchers at MIT, in relation to an enhanced photovoltaic solar cell. (Dang et al., (April 2005), Virus-Templated Self Assembled Single-Walled Carbon Nanotubes for Highly Efficient Electron Collection in Photovoltaic Devices, *Nature Nanotechnology*). The researchers used viruses to control the growth of carbon nanotubes within the cell, where the carbon nanotubes provided a conductive medium for charge transport. A similar structure, integrated at the microscopic level within a material that promotes triboelectric charging, could provide a convenient structure to promote charge transfer to a larger conductor.

Deployment Methods

A variety of deployment methods can be used to launch and position the tethered airship system. Listed below are five illustrative deployment methods with differing levels of pre-launch level of airship integration:
1) The two airships, one of which contains (or carries) the tether, might be inflated and launched separately, followed by in-flight mating and attachment of the tether to the other airship; or
2) The two airships and the tether might be assembled and inflated on the ground, with the tether connecting the two airships (partially spooled in at least one of the attachment/deployment subsystems), and the two airships launched together (or close together) in time;
3) The two airships could be assembled, inflated, and mated together on the ground, with the tether substantially spooled in a tether attachment/deployment subsystem, followed by demating and separation (and tether unspooling between the two airships) after launch;
4) The two airships could be assembled, one of them inflated, and the two mated together on the ground with the deflated airship carried as external cargo on the inflated airship and the tether substantially spooled in a tether attachment/deployment subsystem. Following launch, the deflated airship is inflated, demoted and separated, and the tether is unspooled as the airships separate; or
5) One airship and the tether could be stowed within the other airship for launch and low-altitude flight, and subsequently deployed. For example, after reaching the lower stratosphere, the inflated airship might enter a period of drifting flight in order to minimize aerodynamic forces. At this point, the deflated airship could be deployed and inflated.

Maneuvering

In one example, at least one of the two airships is equipped with a traditional propulsion and guidance system such as a system of one or more propellers driven by electric motors with electric power from a real-time power source (e.g., solar cells) or storage batteries. The propellers may be "vectored" to provide vectored thrust (vertically as well as laterally, in different directions), or fixed with respect to the airship with guidance and maneuvering provided by aerodynamic control surfaces (rudder, elevator, and the like). In addition, parafoils associated with the system are controllable to adjust lift and drag forces in conditions where the airship is experiencing an ambient wind. Parafoils can also be used to provide lateral thrust (i.e., perpendicular to the ambient wind vector).

The electric propulsion and guidance system, installed on one or both airships, can be used to maneuver in very low wind or zero wind conditions simultaneously experienced by both airships. It can also be used to provide a partial or complete "stationkeeping force" when there is no wind at one airship, but the other airship experiences a wind within the limits of the propulsion system to counteract. For example, if the lower airship is equipped with a propulsion and guidance system, it can counteract low winds in the lower stratosphere when there are zero or low winds in the upper stratosphere. Similarly, this same airship could counteract low winds in the upper stratosphere when there are zero or low winds in the lower stratosphere. If the propulsion system can provide vectored thrust in the vertical direction, it can also be used to adjust the altitude at which the airship is operating.

The combination of parafoils and parachutes can be used to maneuver in nominal, moderate, and high wind conditions. Specifically, with countervailing winds in the lower and upper stratosphere, and the airships mutually "trimmed" to provide stationkeeping near a commanded latitude and longitude, the combination of parachutes and parafoils can be used to introduce a net thrust in any direction. Parachutes can be marginally opened or closed to create a net thrust in the east/west direction, and the parafoils can be controlled/trimmed to provide a net north/south thrust as well as net vertical lift to increase altitude, or reduction of lift in order to reduce altitude. Hence, the inventive concept provides 3D maneuvering for stationkeeping and repositioning with minimal expenditure of energy.

Illustrative Tethered Airship Example

In one embodiment, both airships are connected by a tether and contain a compliment of housekeeping and communications and control equipment (not necessarily identical between the two airships) associated with effective human control. The tether may be a continuous cable or ribbon that extends between the upper and lower airships. Alternatively, the tether could comprise several lengths connected end-to-end, possibly with passive or active subsystems interspersed with, and providing a tension member between, the several lengths. An example of a segmented tether with interspersed subsystems is illustrated in FIG. 19. The communications and control equipment may include navigation and position determining systems, aerodynamic control systems, telemetry and command communications systems, computational resources and the like.

The upper airship additionally comprises:
a) parafoil and parafoil control subsystem adapted to adjust dynamic lift and drag. The dynamic lift and drag can be adjusted through control of the parafoil's angle of attack and bank angle relative to the horizontal. In some embodiments, lift and drag can also be adjusted through selective opening or collapsing of individual "lifting cells" to change the effective area of the parafoil, or changing the overall geometry from a relatively flat airfoil shape such as illustrated in FIG. 16A, to a more curved shape such as illustrated in FIG. 16B (which would provide lower lift at the same angle of attack);
b) a parachute and parachute control subsystem adapted to adjust drag;
c) a tether attachment subsystem; and d) a solar power generator, such as a photovoltaic system adapted to generate electric power during periods of daylight, storage batteries, and associated power management and distribution systems.

The tether attachment subsystem may be adapted to control the point at which tension forces are applied, and to also control the angle of attack of the airship, as illustrated in FIG. 13; alternatively, the tether attachment system may comprise a single fixed point of attachment as suited to a spherical balloon, or a distributed system that also comprises the parachute and parafoil anchor points (equipment assemblies) as illustrated in FIG. 19 (i.e., in an embodiment where the parachute and parafoil equipment assemblies serve as connecting members between separate lengths of the tether).

The lower airship additionally comprises:

e) a parafoil and parafoil control subsystem adapted to adjust dynamic lift and drag. The parafoil may be partially filled with a heavier-than air gas, such as carbon dioxide, to keep the parafoil below the airship in zero-wind conditions and also to facilitate inflation;
f) a parachute and parachute control subsystem adapted to adjust drag;
g) a tether attachment/deployment subsystem adapted to control the length of the tether, the point at which tension forces are applied to the lower airship, and the angle of attack of the airship relative to the ambient wind;
h) a solar power generator, such as a photovoltaic system adapted to generate electric power during periods of daylight, storage batteries, and associated power management and distribution systems;
i) a wind generator adapted to generate electric power during periods of relative wind; and
j) a propulsion and guidance system, such as a system of electric motors and propellers, optionally including aerodynamic control surfaces (or vectoring of thrust direction), adapted to provide propulsion (thrust) to the lower airship. The propulsion system can optionally be integrated with the wind generator.

The lower airship can also comprise a power generation system based solely on solar or wind, as opposed to a combination of the two, it is expected that the lower airship, at least, will additionally contain a payload; however, this is not a required element of the inventive concept. Possible payloads include radar, electronic warfare, and communications relay packages, atmospheric sensing packages (e.g., aerosols, temperature, pressure, humidity), remote sensing and earth sciences packages (IR, visible, ultraviolet sensors), astrophysical and astronomical sensors, and "beamed power" subsystems (if significant amounts of excess power can be generated on the airships). The tether itself, and a possible physical shuttle running on the tether, might represent a useful prototype or testbed for a future space elevator.

Sizing and Analysis of an Illustrative Tethered Airship Example

This section provides additional technical and operational details for an embodiment structured along the lines discussed above, where the lower airship is designed to have a nominal operational altitude (neutral buoyancy) of 18 km, and the upper airship is designed to have a nominal operational altitude of 37 km while accounting for the weight of a fully-deployed tether. Both airships are "solar regenerative" designs (i.e., no wind generators) and incorporate parafoils and parachutes. The tether is 30 km long, comprised of Kevlar, and assumed to weigh 600 kg. Furthermore, the length of the deployed tether is adjustable based on the action of a reel assembly associated with the lower airship, and the system is designed to operate with a vertical separation as large as 19 km (with the lower airship operating at 18 km and the upper airship operating at 37 km), or as small as 8 km (e.g., with the lower airship operating at 19 km, and the upper airship operating at 27 km).

In many of the design elements discussed below, conservative sizing estimates have been used. It is expected that more detailed assessments of winds-aloft, consideration of new materials, and refinement of operating strategies, will lead to reductions in weight for one or both of the airships, as well as the tether.

While the inventive concept uses different airship designs than prior art systems, with new combinations of elements (such as parachutes and parafoils), a long tether, and significantly different subsystem sizes and characteristics tailored to the tethered operations concept, some of the design coefficients used for the illustrative sizing exercise described below are adapted from the NASA Concept 14 stratospheric airship identified in NASA/TP-2007-214861, specifically the communications relay variant designed to operate at an altitude of 18 km. For example, the same drag coefficient is used so that drag is assumed to scale with surface area, and the same ratio of propulsion subsystem power to weight is used. The NASA Concept 14 stratospheric airship is a solar regenerative design intended for a six month mission (although simulations apparently indicated that a full six month mission might not always be achievable, depending on weather conditions and time of year which affects solar flux). The NASA airship is approximately 200 meters long and has a lifting volume of approximately 350,000 $m^3$. The lifting gas is helium (although NASA later concluded that hydrogen would be better). Gross vehicle weight (GVW) is approximately 36,700 kg, of which over 24,000 kg is batteries. The large complement of batteries is needed to sustain the airship through long periods of high wind, when propulsion needs exceed the electrical power that can be made available directly from the solar cells. In the present implementation, most of these batteries are removed.

For the illustrative sizing example provided here, sizing estimates have been provided to at most three significant figures. The illustrative sizing example is based on a wind speed of 56 m/s at both altitudes (the peak wind identified in the NASA study). A refined design would consider the characteristics of new materials and technologies, and would also be based on operational simulations and known weather patterns in the intended region(s) of operation, including the expected variability of wind speed based on historical data spanning a representative period of time.

For purposes of illustration, hydrogen is used as a lifting gas instead of helium. Hydrogen is slightly more efficient as a lifting gas then helium, and its diatomic molecular structure tends to minimize leakage concerns as compared to helium. While hydrogen is explosive in some situations, this risk can be managed for an unmanned airship intended to operate in the stratosphere where the amount of oxygen is limited (i.e., the primary risk is at low altitude, and during launch and recovery).

NASA Concept 14 has a hull envelope area of 29,500 $m^2$. The mass of the hull, including fabric, suspension, reinforcing, access/maintenance provisions, ballonets, tail structure, and other features was estimated at about 8700 kg. In a refinement phase of their analysis, NASA separately identified a fabric material, Vectran HS, which was deemed suitable for a refined design, NASA assessed an areal weight of 170 $g/m^2$ for this material including coatings and bondings, and also assumed an additional 15% for seams, 10% for structural interfaces, and 40% for ballonets. Thus, a rough estimate of total hull mass could be generated by assuming an areal weight penalty of 280 g/m². The hull and ballonets were designed for a maximum pressure differential, between inside and outside (ambient) pressure, of about 1 kPa.

In the absence of wind, the lower airship will operate at 18 km and the upper airship will operate at 37 km. The tether will be partially spooled on the lower airship, but this extra weight penalty balanced by the "excess lifting force" available from the upper airship (which was designed to operate at 37 km while sustaining the full weight of the tether). Hence, the two airships remain at their nominal altitudes although the tension on the tether, measured at the lower airship, represents the spooled weight of 220 kg, or roughly 2200 Newtons.

In the present example, the vertical separation between the airships is adjustable to enable the selection of suitable wind patterns (and ambient densities) that can be used to equalize the drag forces. When the vertical separation is reduced below the 19 km associated with their neutral buoyancy designs, and ignoring propulsive and dynamic lift effects, the lower airship will be above its neutral buoyancy altitude and the upper airship will be below its neutral buoyancy altitude. This raises two design issues: a) the lower airship will experience greater pressure differential between its internal pressure and the external pressure (i.e., due to the lower ambient pressure at altitudes above 18 km), requiring a stronger hull; and b) the upper airship will experience an increase in ambient pressure, meaning that it will lose rigidity and tend to collapse into a looser and more elongated shape, with a "bubble" of hydrogen at the top. Most of the change in altitude is experienced by the upper airship, but both airships are affected. In order to accommodate this effect for the lower airship (upper airship design is discussed later, below), without relying on dynamic lift or propulsive forces that consume power, it has been assumed that the lower airship operates in a predefined altitude band with an additional 1 kPa of pressure variation allowed, relative to the NASA baseline of 1 kPa. This allows operation of the lower airship to an altitude of 19 km instead of 18 km, even though its nominal buoyancy is insufficient to achieve this altitude. In order to accommodate a total pressure differential of 2 kPa, the hull weight allocation (a sizing coefficient) has been increased to 560 g/m², instead of the 280 g/m² adopted by NASA. Of course, newer materials could potentially provide the necessary strength at a lower weight penalty. A system of internal ballonets could also be used to manage pressure differentials without substantially increasing the areal density of the hull.

Drag at a particular airspeed, for the basic airship without considering the contribution of parafoil and parachute, is scaled from the NASA Concept 14 design based on the ratio of hull surface areas. For the illustrative design described here, which results in a hull surface area of roughly 9,000 m², the drag on the lower airship at 18 km and 56 m/s is somewhat less than 7 kN. By way of comparison, the NASA concept experienced peak drag of slightly higher than 22 kN in the same conditions.

In terms of the propulsion system, NASA Concept 14 was sized to maintain station-keeping at 18 km altitude in ambient winds of 56 m/s. This required mechanical systems weighing 3200 kg. In the sizing example here, the lower airship is smaller than the NASA baseline and is only designed to sustain an airspeed of 20 m/s ignoring the drag contribution of the tether and upper airship (the majority of the station-keeping capability is achieved by drag equalization). The size of the propulsion system depends on the desired peak airspeed relative to the airmass, and the size of the entire airship and its overall drag, but for the final illustrative design discussed here, the propulsion system would weigh approximately 125 kg in order to sustain an unencumbered airspeed of 20 m/s. It is noted that this is a relatively low weight penalty, and there may be a benefit in designing for a greater airspeed since this would enable the lower airship, in calm conditions, to completely counteract a strong wind experienced by the upper airship. A statistical analysis of expected wind conditions could be employed to determine the benefits of such a redesign. However, for this illustrative example, the design point of 20 m/s is used. This airspeed requires an expenditure of roughly 50 kW of electrical power.

The NASA Concept 14 required a large complement of solar cells and batteries in order to maintain station-keeping in peak wind conditions (56 m/s). The present example reties primarily on equalization of drag instead of propulsive power, so most of this weight penalty can be removed. Nevertheless, there is still a need for electrical power to operate onboard systems, including the parachutes and parafoils, and provide for propulsion using a traditional electric-driven propulsion system (including either vectored thrust or aerodynamic control surfaces) to compensate for partially unbalanced drag forces, provide an extra upward or downward force, allow for launch/recovery and propulsion to/from the mission area (or change of mission area), and the like. The complement of solar cells and batteries will depend on the results of full mission simulations in a target environment or range of environments; for this illustrative sizing exercise, the lower airship is assumed to carry 60 kg of solar cells and 1100 kg of batteries. Hence, the overall energy system is assumed to weight approximately 1200 kg. NASA has provided a discussion of alternative solar regenerative concepts, including water electrolysis and fuel cells.

As noted above, the illustrative design here results in peak drag of about 7 kN. In order to maintain a relatively vertical tether (less than 45 degrees with respect to the vertical), this same force must be applied as a "negative buoyancy" on the lower airship and a "positive buoyancy" on the upper airship. In order to size the parafoil for the lower airship, and develop an estimate of the weight penalty, the published results for the "Fastwing" ram-air-filled parafoil [Benolol, Zapirain and Ramassar] are used with an areal weight penalty of 100 g/m² for the parafoil fabric. This is slightly more than half the areal weight penalty of the NASA Concept 14 hull material, which was able to sustain a pressure differential of 1 kPa. The Fastwing airfoil can achieve a coefficient of lift ($C_L$) of 0.8, but for the lower airship a mid-range value of 0.5 has been assumed to allow $C_L$ (and angle of attack) to be varied in flight, in real time, in order to provide an additional degree of freedom.

The parafoil also contributes to drag, and this additional contribution to drag can be considered in the overall design. At a $C_L$ of 0.5, the Fastwing provides a ratio of lift to drag of about 3:1. If the total negative lift generated by the parafoil is matches total drag for the combination of the lower airship and the parafoil together, this can be achieved when parafoil drag is one-half of airship drag and the negative lift has a magnitude of roughly 10.5 kN. This results in a parafoil lifting area of about 110 m². The areal weight penalty is tripled to account for upper and lower airfoil surfaces and cell membranes. This results in a weight penalty of about 33 kg. An additional 2 kg is allocated for shroud lines to connect the parafoil to its control and anchor points, resulting in a total weight for the parafoil system (exclusive of its control electronics and actuators) of 35 kg. The shroud lines are assumed to be constructed of the same material as the tether, although with a smaller diameter consistent with the shroud loading requirements. Many alternative parafoil designs are possible, but it is clear that the necessary dynamic lift forces can be achieved with a relatively small weight penalty compared to the total weight of the airship.

A parachute on the lower airship is not required, but can be used to minimize energy consumed by the propulsion system, minimize control activity on the upper airship and also facilitate 3D maneuvering. In the illustrative concept, a small parachute is included with a weight (including shroud lines) of 10 kg.

The lower airship is also assumed to carry a payload of 212 kg and a tether attachment/deployment system weighing 50 kg. Actuators, control electronics, etc., for the parafoil and parachute systems are assumed to weigh 50 kg total.

With the above design considerations and assumptions, the lower airship is 111 m long, comprises a lifting volume of 60,000 m$^3$, and has a GVW of 6,700 kg. The hull comprises 5,100 kg of this total and has a surface area of 9,000 m$^2$. Many design adjustments and refinements will be apparent to those skilled in the relevant arts.

The upper airship is based on the configuration of FIG. 19, but with a dirigible-shaped airship constructed to satisfy an areal density (i.e., for its entire lifting hull) of 60 g/m$^2$ which accounts for e.g. the raw material of the hull to allow for airship survivability given the drag forces experienced by the present examples, the lobing associated with the pumpkin-lobed design, strings, and adhesives.

The energy needs of the upper airship are relatively modest since it has no propellers or equivalent propulsion system relying on internal power. However, it still needs electrical power for housekeeping functions, computers, control communications, and to control the parafoil and parachute. As a consequence, for illustration, solar cell mass of 2 kg and battery mass of 25 kg is assumed.

The tether is assumed to weigh 600 kg (considering all tether elements between the airship 1900 illustrated in FIG. 19 and the lower airship). An additional 100 kg is allocated for structure (1905, 1910 and 1915) including the control electronics and actuators associated with the parafoil and parachute.

The parafoil itself is sized based on the need to achieve a lifting force of roughly 11 kN at an altitude of 37 km, in wind of 56 m/s. Because of the low air density at that altitude, the parafoil in this example is relatively large. Using the same Fastwing design assumed earlier, but adopting the maximum reported $C_L$ of 0.8, the wing area must be 1370 m$^2$. With a 4:1 aspect ratio, the wing would be roughly 74 m×20 m. It is assumed to be constructed of material that results in an areal mass density of 26 g/m$^2$. As with the parafoil for the lower airship, the areal weight penalty for the raw material is tripled to account for upper and lower airfoil surfaces and cell membranes. This results in a parafoil weight of 107 kg. With shroud lines added (7 kg total to allow for lengths of 150 m), the total is roughly 114 kg. This is a significant mass for the upper airship. A more detailed design study, considering the actual stresses on the parafoil, may conclude that a lighter weight can satisfy the design requirements with currently-available materials. Conversely, future materials may offer lower weight for the same performance.

When operated at $C_L$ of 0.8, the Fastwing can achieve L/D of 4:1. This implies that the parafoil will contribute an additional 2.6 kN of drag to the upper airship, which itself experiences roughly 17 kN of drag at 37 km altitude and wind speed of 56 m/s assuming a drag coefficient similar to that adopted in the NASA study, and a total airship size as noted below. Thus, the parachute of the upper airship must generate roughly 6.2 kN of drag. This yields a total drag force of 10.5 kN (at 37 km and 56 m/s), which matches the total drag force experienced by the lower airship. For this example, the parachute has a surface area of roughly 900 m$^2$ and represents a weight penalty of 28 kg including the parachute and shrouds.

A total of 100 kg is allocated for the combination of structures 1905, 1910 and 1915 illustrated in FIG. 19, comprising the tether attachment, parafoil anchor and control, and parachute anchor and control.

With these design considerations, the upper airship is roughly 650,000 m$^3$ in volume and 250 m in length. It has a GVW of roughly 3560 kg. Of this total, the hull weighs roughly 2670 kg, the tether weighs 600 kg, the parafoil subsystem weighs roughly 114 kg, and all other subsystems combined weigh roughly 175 kg. In the peak design condition of 56 m/s, each airship experiences total drag forces on the order of 11 kN and the tether design (50 kN) is adequate. Potentially, subject to verification through simulation or analysis, a lower-strength tether could be used in order to save weight which could then be allocated to other subsystems or payloads, or used to reduce the size of the upper airship.

In order to minimize electrical load on the upper airship, and therefore its solar cell and battery complement, the overall system can be operated with the objective of leaving the upper airship in a relatively fixed configuration for long periods of time (to the extent this can be achieved), with lift and drag forces modulated by the lower airship. Hence, this is one reason to equip the lower airship with a parachute that can be controlled for variable drag.

It should be recognized that the design of the upper airship is driven in large measure by its high nominal altitude of 37 km. If mission simulations indicate that drag forces can be equalized reliably at lower operational altitudes, the design of the upper airship can be eased. Mission simulations, using historical data of actual wind speeds in an area of interest (instead of the simplified peak wind speed analysis used in this illustrative sizing example), are also necessary to validate a particular design of the airships, their associated parafoils and parachutes, and their other associated subsystems.

Operational Considerations

Figure 20:
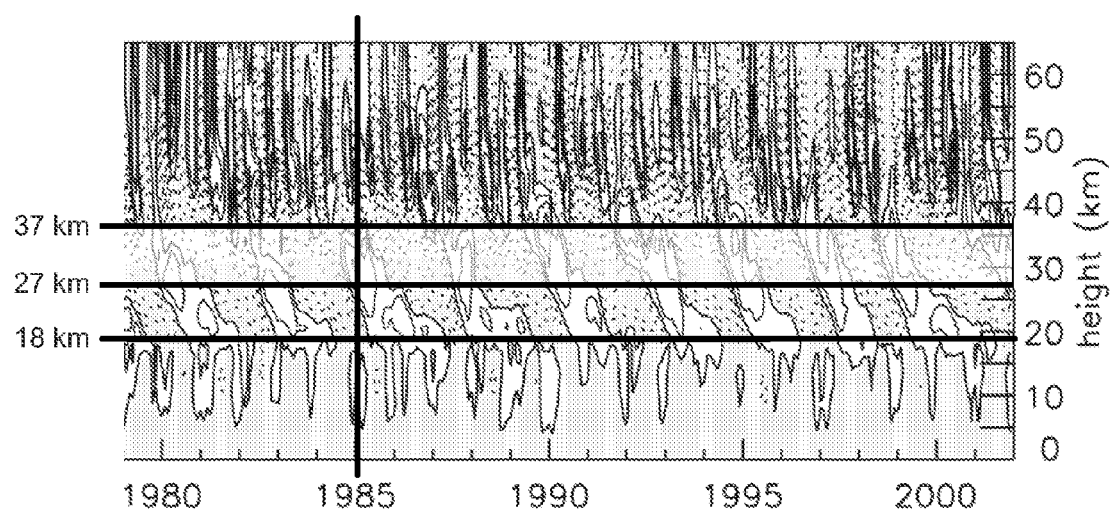
FIG. 20 is a detail taken from FIG. 15.

Generally speaking, winds in the upper stratosphere are stronger than those in the lower stratosphere and move in the opposite direction (e.g., east-to-west at one level versus west-to-east at another). This was illustrated in FIG. 15, a detail of which is provided in FIG. 20. This figure is annotated to show a nominal altitude of 18 km, associated with the lower airship in the sizing example discussed above, and an altitude band of 27-37 km, associated with the upper airship in the sizing example discussed above (the lower airship operates in a band from 18 to 19 km, but only the lower altitude is indicated). Also, in FIG. 20, a vertical line indicates a particular instant of time at the beginning of 1985. As may be seen, the lower stratosphere was experiencing easterly winds during this period of time with an average speed of about 10 m/s, and the upper stratosphere was experiencing westerlies with average speeds in excess of 10 m/s at altitudes in the range of 30 km. A system of tethered airships deployed according to principles described herein could equalize drag forces in this environment. The reader may introduce additional vertical lines to verify that, in general (although not always), the conditions for drag equalization exist.

While drag equalization is generally feasible, there are times when the winds blow in the same direction (although this usually occurs when wind speeds are low), and there are times when the upper-stratosphere wind, at a given altitude, is slower than the wind in the lower stratosphere (e.g., at an altitude of 18 km). In order to accommodate these conditions, the principles and examples described allow the altitude separation between the airships to be adjusted. Generally, this involves the lower airship "reeling in" the upper airship. This takes work since the upper airship becomes increasingly buoyant once it is below its nominal operating altitude. The energy subsystem of the lower airship (e.g., solar cells, batteries, and energy management subsystems) can be designed with this potential operating load in mind, although this capability will not be exercised continuously. Some of the energy expended to "reel in" the upper airship can be recovered when the upper airship is subsequently allowed to go to a higher altitude.

Nominal values of atmospheric density and pressure are tabulated below for altitudes of 18, 19, 27 and 37 km.

TABLE 4

Nominal values of atmospheric density and pressure

| Altitude (km) | Density (g/m³) | Pressure (Pa) |
|---|---|---|
| 18 | 120 | 7505 |
| 19 | 103 | 6410 |
| 27 | 29 | 1847 |
| 37 | 6 | 420 |

When the upper airship is "reeled-in" by the lower airship, the net effect is an increase in buoyancy which tends to take the lower airship to a higher altitude. In some embodiments, an uncompensated increase in buoyancy may result in exceeding a design constraint of the lower airship, such as hull bursting strength. In such cases, the excess lifting force can be compensated with propulsion and dynamic lift when winds are above a necessary lower threshold. When winds are strong, the parafoils and parachutes can be used to trim the excess forces experienced by the system. The design of the lower airship can also be adjusted to provide for a larger parafoil, and/or larger propulsion system, that has the capability to counter the excess lifting force even in zero wind (using, e.g., the larger parafoil to provide a compensating negative lift while the propulsion system drives the lower airship in a figure eight pattern near the desired station-keeping point). Other design accommodations include an ability to reduce the lifting volume of the lower airship (thereby increasing its "negative buoyancy" to more closely match the excess positive buoyancy of the upper airship); or adjusting the design of the upper airship to reduce its nominal lifting volume at maximum altitude (for example, by shifting to a more spherical shape which would reduce its surface area and associated hull weight at the expense of increased drag). In one embodiment, the lower airship maintains a rigid hull using pressurized ambient air and is constructed with a plurality of ballonets for lifting gas which are not fully inflated at 19 km. This allows the ballonets to expand when the airship operates at higher altitudes, while still allowing the airship to maintain a rigid hull without danger of rupture by adjusting the amount of ambient air contained in the airship and surrounding the ballonets. In embodiments where operation of the tethered airship system with small vertical separation can put the integrity of the lower airship at risk, an operational test can be employed to ensure that such conditions are not encountered or are quickly mitigated. For example, if the lower airship is relying on dynamic negative lift from a high ambient wind in order to maintain its altitude below a safe maximum altitude, and the wind dies down, the airship could be programmed to reel out the tether in order to allow the upper airship to quickly ascend to a higher altitude and thereby reduce the differential buoyancy between the two airships to a manageable level.

It is also noted that, at smaller vertical separation, the positive and negative buoyancy forces are larger and the tether can be kept relatively "vertical" with smaller contributions from dynamic lift. As for the drag on the upper airship, it will depend on the prevailing wind speed as well as its coefficient of drag. The parachute and parafoil can be used to increase drag as needed to match the drag on the lower airship, with fine adjustments using both the upper and lower parafoils and the upper and lower parachutes to bring the system into equilibrium.

Under very low wind speed conditions in the upper stratosphere, the parafoil will not fully inflate. For example, in the sizing exercise presented above, the parafoil and its shrouds weigh roughly 114 kg. If the upper airship is being operated near the top of its operating range (37 km), then even at max $C_L$, the parafoil can only overcome this weight burden at an airspeed of roughly 18 m/s. At lower altitudes, where the density of the atmosphere is greater, the parafoil inflates and becomes effective at lower airspeeds. It should be noted that the stall speed of the airfoil (which has not been calculated) also represents a lower bound on airspeed for effective use of the parafoil.

In general, the parachute will inflate at lower airspeeds than the parafoil, allowing drag management to occur at lower airspeeds than buoyancy management.

Figure 21:
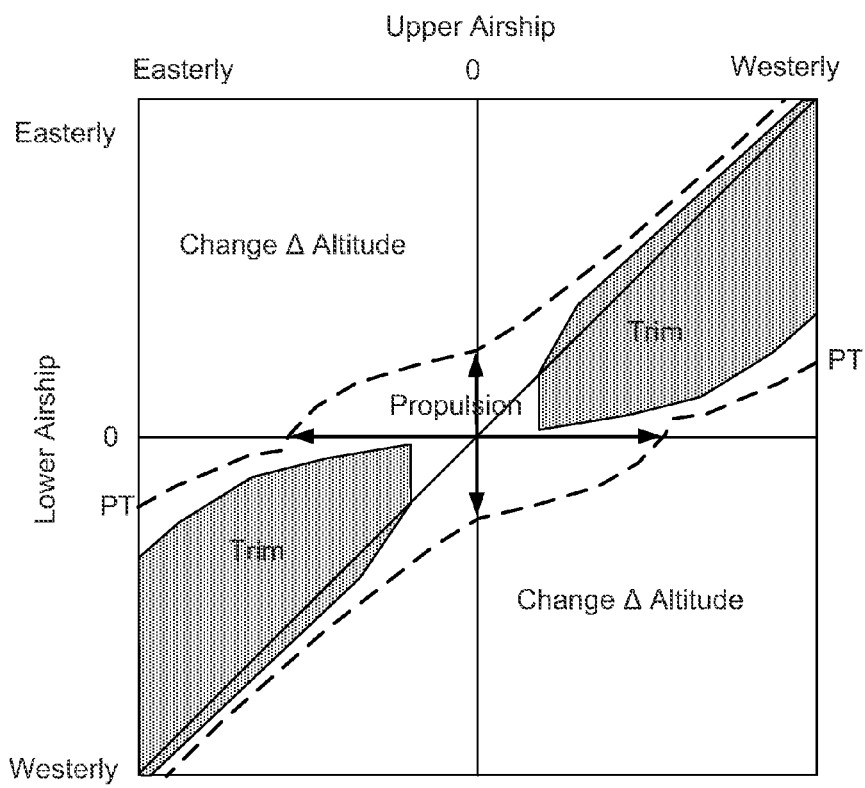
FIG. 21 shows operational states of the airship system as a function of scaled dynamic pressure, according to one example of principles described herein.

Different operating conditions imply different operating strategies for the tethered airships. FIG. 21 illustrates several strategies plotted against a backdrop of dynamic pressure (density times airspeed squared) for the lower and upper airship, illustrating potential operating strategies for various combinations of easterly and westerly winds at the lower and upper airship. The plotted values are scaled so that equal airspeeds at the nominal operating altitudes of 18 and 37 km exist on the main diagonal running from lower left to upper right. The diagram should be interpreted qualitatively rather than quantitatively; however, certain features will now be explained:

a. With reference to the sizing example given above, the lower airship is designed to achieve a propulsive airspeed of 20 m/s. This is indicated qualitatively by the bold double-headed vertical arrow in the center. When there is no wind at the upper airship, the lower airship can perform station-keeping with winds up to 20 m/s in either direction. Under these conditions, one would attempt to minimize drag effects by stowing or furling the parafoil and parachute associated with the lower airship (the diagram assumes that these drag effects can be made effectively zero, although this may not be achievable in practice), and rely on propulsive thrust only.

b. Similarly, when there is no wind at the lower airship, but there are winds at the upper airship, the lower airship can compensate with its propulsion system. This is indicated by the bold double-headed horizontal arrow. Under these conditions, one would attempt to minimize drag effects by stowing or furling the parafoil and parachute associated with the upper airship (the diagram assumes that these drag effects can be made effectively zero, although this truly not be achievable in practice).

c. The shaded regions indicated as "Trim" are the regions where drag forces can be equalized using the parafoils and parachutes described. Generally, such equalization requires the winds to be in opposite directions, with upper winds stronger (faster) than lower winds, and both strong enough to properly inflate the parafoils and parachutes (or at least the parachutes, at low speed). However, in many operational situations, and depending on the detailed design of the system, drag forces may be equalized even if the upper winds are slightly slower than the lower winds. This is indicated qualitatively by the trim region extending slightly across the main diagonal of the figure. For example, in the sizing exercise described above, the parafoil of the lower airship was sized to provide negative lift sufficient to equal the total drag on the lower airship and parafoil combined, in peak wind conditions, at a $C_L$ of 0.5 and L/D of 3:1. However, as was noted earlier, if some of the tether is already spooled on the lower airship, the tether is already under tension. This means that the lower airfoil does not need to work as hard, and can be operated to generate less lift and drag. This means that the total drag forces could actually be equalized even if the wind speed at the lower airship slightly exceeded the wind speed at the upper airship. The effect becomes more pronounced when the altitude separation of the airships is reduced, since this implies greater operating tension on the tether. Of course, the upper airship could have also been designed with larger parafoils and parachutes to allow for an even greater imbalance (although this implies a penalty in weight and cost).

d. The dotted lines labeled "PT", running generally diagonally from lower left to upper right, indicate qualitatively the outer boundaries of the operational conditions that can be satisfied with a combination of propulsive capability, parafoils, and parachutes (trim). If one overlays a joint probability distribution of dynamic pressure on this diagram, with the dynamic pressure measured at e.g. 18 km and 37 km, for a particular latitude and longitude, one will typically find that some of the probability mass lies within the dotted region—but not all.

e. The regions outside the dotted domain are labeled "Change Δ Altitude", and refer to the pairwise conditions of dynamic pressure (at the lower and upper airship) where stationkeeping, cannot be maintained using the forces available from propulsion, parafoil and parachute. In these regions, the system must change its altitude separation in order to find conditions suitable for stationkeeping. As noted earlier with reference to FIG. 20, it is generally possible to find a suitable altitude separation if the wind profile as a function of altitude is known (or can be explored).

f. While the regions outside the dotted lines represent regions where stationkeeping cannot be performed without a change in altitude separation (and, in very rare instances, not even then), an operational system could choose to adjust the altitude separation between the airships when the system is within the dotted lines, or even within the shaded regions labeled "Trim". This or other operations, such as disposing of ballast, venting gas, etc, can all be performed as desired within a particular mission.

Figure 22A:
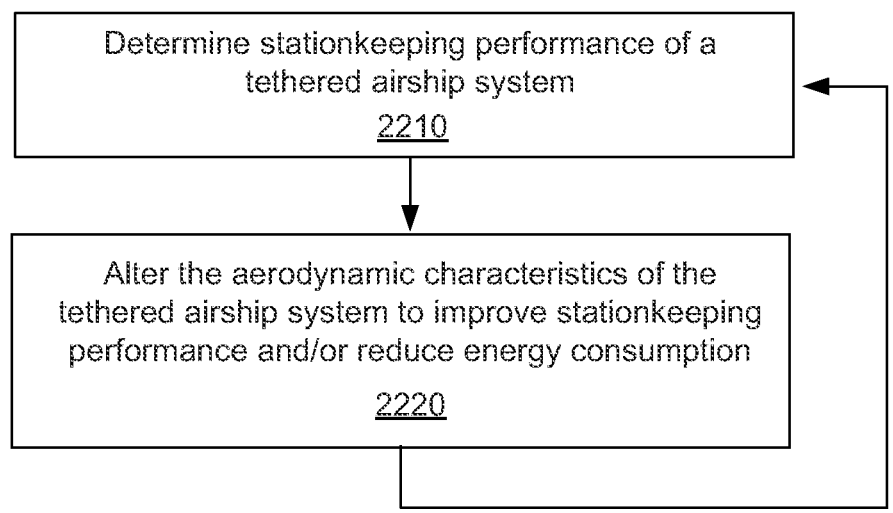
FIGS. 22A and 22B illustrate methods for maintaining stationkeeping with a tethered airship system, according to one example of the principles described herein.

Now consider a tethered airship system operating in conditions that allow complete drag cancellation without propulsive force i.e., relying solely on parafoils and parachutes). When the pairwise dynamic pressure at the lower and upper airships is plotted on a diagram such as FIG. 21 (but tailored to the specific design and flight altitudes), it will be in one of the regions labeled "Trim". Within these trim regions, the illustrative method 2200 shown in FIG. 22A can be used to control stationkeeping. The stationkeeping performance of the tethered airship system is evaluated on a continuous or periodic basis (step 2210). As discussed above, the aerodynamic characteristics of the tethered airship system can be altered to improve the stationkeeping performance (step 2220). This process is repeated for as long as it is deemed effective and efficient. As used in the specification and appended claims, the phrase "improve stationkeeping performance" refers to a reduction in the amount of energy required to maintain the geospatial position of the airship system within a predetermined range. In some cases the improvement in stationkeeping performance may be such that no propulsion energy output is required to maintain the geospatial position.

However as the winds change, the position of the system, as represented within this diagram (FIG. 21), will change as well. At some point the system may find itself outside the "Trim" regions and perhaps even outside the dotted domain—hence unable to perform stationkeeping. At this point, the system determines if a change in altitude separation can be performed such that stationkeeping capability can be restored. If the system or its controlling elements (e.g., on the ground) have complete knowledge of all weather conditions in the altitude ranges that can be reached or explored by the airships, a desired new altitude separation can be found, and the lower airship can be commanded to adjust the length of the tether so that this new altitude separation is achieved. In rare instances, it may be necessary (or desirable, even if not strictly necessary) to allow the airships to drift off-station for a period of time, until wind conditions change.

In general, some knowledge of weather conditions is assumed to exist. This may be precise real-time knowledge of the winds over the entire altitude range that can be reached by the airships, or probabilistic estimates based on historical data, or a combination of the two (e.g, if the tether is instrumented with sensors, the current weather conditions below the upper airship might be known precisely, while the current weather conditions above the upper airship might be known only probabilistically). Some predictive estimates into the future may also be available. Also in general, a choice is always available between seeking to resolve the stationkeeping problem immediately, or doing nothing. Doing nothing might be warranted, for example, if the drift rate is very low and small position offsets are not operationally significant (especially if resolution of the stationkeeping problem is expected to require a very large energy expenditure), or if weather conditions are expected to change for the better in the near future.

If perfect knowledge is available, and the airships are separated by a vertical separation $\Delta Alt_{current}$ where $\Delta Alt_{current}$ is between $\Delta Alt_{min}$ and $\Delta Alt_{max}$ inclusive, there will zero, one or more separations $\Delta Alt > \Delta Alt_{current}$ where stationkeeping can be achieved; similarly, there will be zero, one or more separations $\Delta Alt < \Delta Alt_{current}$ where stationkeeping can be achieved. If there are no solutions $\Delta Alt < \Delta Alt_{current}$, and one or more solutions $\Delta Alt > \Delta Alt_{current}$, the only "pro-active solution" is to go up (i.e., increase the altitude separation) to the first suitable separation. Conversely, if the situation is reversed, the only "pro-active solution" is to go down (i.e., decrease the altitude separation) to the first suitable separation. There is both a time cost and an energy cost to any pro-active solution—it takes time to make any change in $\Delta Alt$, and it takes an energy expenditure to decrease $\Delta Alt$ (note: there is no significant energy cost to increase $\Delta Alt$, and in some embodiments the immediate "cost" may be negative since energy can be recovered and stored in the batteries. However, there is at least an opportunity cost because any subsequent decrease in $\Delta Alt$, of the same magnitude, involves a greater expenditure of energy than can be recovered by the initial increase). A cost function involving one or more of the parameters of time expenditure, immediate energy cost, and future energy cost (i.e., an opportunity cost assessed against increases in $\Delta Alt$) can be assessed against the available solutions (if any) at both increased and decreased $\Delta Alt$. The cost function calculates a metric in arbitrary units of utility that allow a comparison of, and selection between, alternative solutions. The cost function can optionally be sensitive to the expected probability of success (e.g., assessing a variable opportunity cost of future energy expenditures based on the probability that the candidate solution fails to satisfy requirements), and can also optionally be sensitive to expected future conditions (e.g. catering to the fact that energy reserves can be restored if the solution is expected to be useful for a long period of time). Similarly, a cost of doing nothing can also be assessed, considering one or more of the parameters of current position offset, drift rate, and expected penalty of additional delay (which may be related to drift rate as well as other parameters). With these utility metrics available for each candidate solution (including the solution of doing nothing), a choice can be made.

For example, if any non-zero drift rate is assigned very high cost (i.e., failure of stationkeeping is considered highly undesirable), then the best choice will be to proceed immediately to the new $\Delta$Alt that can be reached with the smallest loss of utility, and that allows stationkeeping to be achieved. Alternatively, if small position offsets and drift rates are assigned relatively low cost, the decision process might lead to a delay in action (less of a hair trigger). The cost functions will have an effect on mission performance as well as system design (i.e., since energy storage systems on the lower airship depend on how effective the system is at managing drag, and also the energy cost of that management, and the tether and tether deployment mechanism might suffer more wear and tear if the system is on a hair trigger). Therefore, the cost functions should be optimized through simulation as part of the overall system design process.

If perfect knowledge is not available (i.e., some weather information is only probabilistic), the decision-making process is more complex because some potential solutions might be "false" and lead to a need for further change. Consider the case where a known solution exists with absolute confidence at $\Delta$Alt<$\Delta$Alt$_{current}$, requiring significant expenditure of time and energy to achieve, and a suspected solution exists at $\Delta$Alt>$\Delta$Alt$_{current}$, requiring limited time and no energy expenditure to achieve. However, if the suspected solution is pursued, and turns out to be false, even greater time and energy will be needed to achieve the known solution. In this situation, a risk-averse strategy would select the known solution. Conversely, a Bayesian strategy would select one or the other depending on the expected probability success for the suspected solution, in order to minimize the expected cost. The Bayesian strategy leads to lowest average cost; however, it will lead to increased costs in individual cases. The Bayesian approach can be extended to multiple possible solutions, and can handle the case where all solutions are uncertain. Both discretized formulations of the general cost minimization problem (e.g., for example, assigning possible solutions for each 500 in value of $\Delta$Alt), and continuous formulations can be used to solve the problem.

Figure 22B:
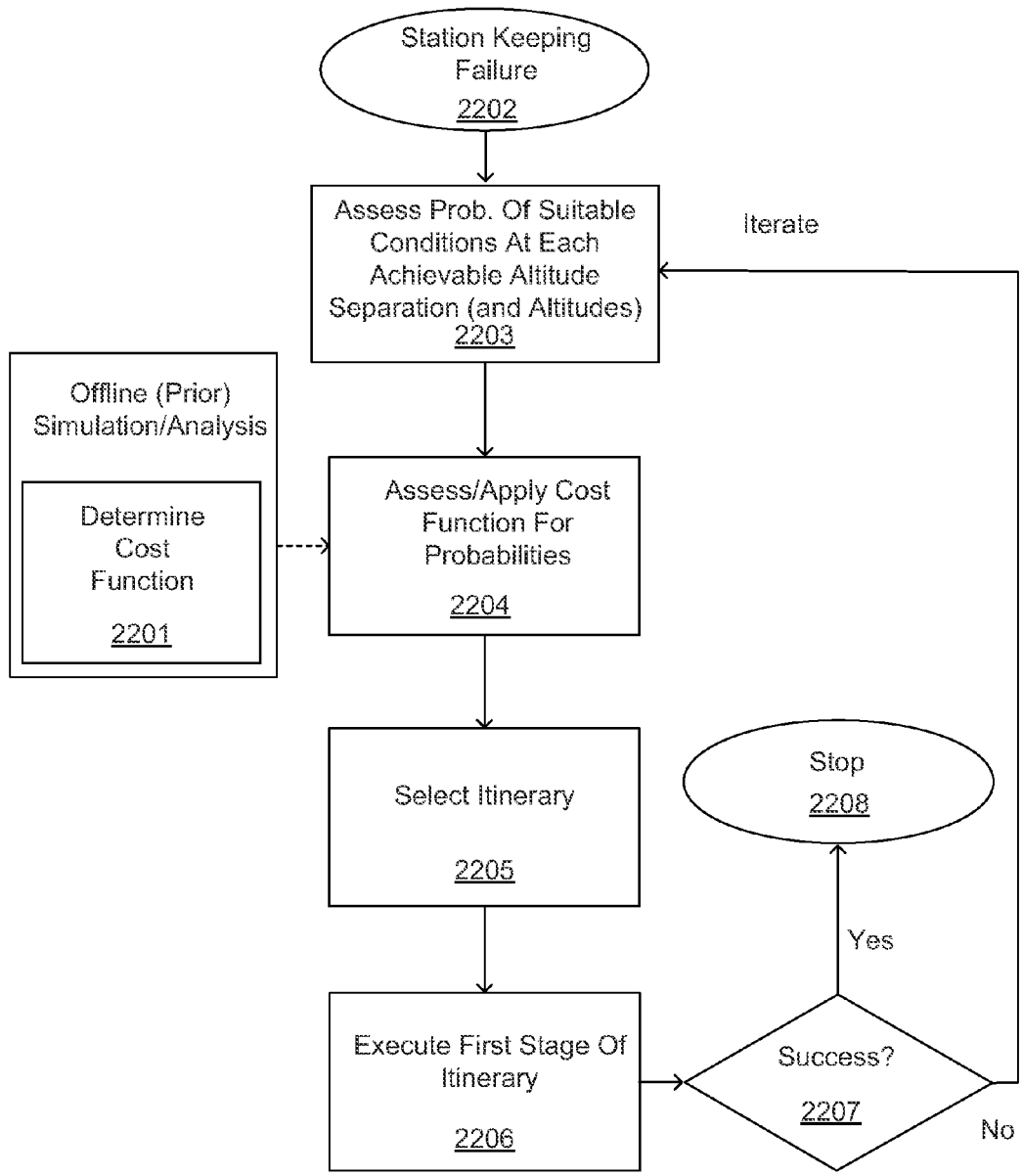

FIG. 22B illustrates one illustrative decision process that can be used for stationkeeping of a tethered airship system that includes at least one logistics airship and a payload airship. In step 2201, as part of the design process, different decision strategies and cost functions are assessed in the projected environment, in conjunction with proposed designs. The decision strategies, cost functions and overall system design are finalized jointly to ensure reliable operation of the system over time. Subsequently, during the operation of the system, there will come a time (on multiple occasions) when stationkeeping is not achievable at the then-current $\Delta$Alt. This is indicated by step 2202. It is noted that the "failure" could be a transition out of the "Trim" region of FIG. 21, or the transition out of the "PT" region, or even a more general event (e.g., an anticipated failure, or a dangerous increase in wind speed that the system seeks to avoid). At this point, in step 2203, the probability of finding suitable conditions for stationkeeping is assessed at all achievable altitude separations using a discretized model at increments of $\Delta$Alt$_{inc}$ meters (e.g., 500 m). These probabilities may be certain (100% probability of success) or uncertain, and may include simple assessments of stationkeeping viability or additional considerations such as excessive wind speed limits. For example, the probability of favorable wind conditions can be assess at each of a plurality of deployed tether lengths between the first airship and the second airship or at altitudes attainable by the airship system.

At step 2204, the cost functions previously developed are applied to the candidate solutions. For example, if the system is currently operating at $\Delta$Alt=10 km and $\Delta$Alt$_{max}$=18 km, and if $\Delta$Alt$_{inc}$ is 500 m, there will be 16 candidate solutions above $\Delta$Alt (one every 500 m), and every one of these candidate solutions will have a probability of success (ranging from 0 to 1 inclusive), and an associated cost. Step 2204 also calculates the cost of doing nothing. For example, the cost function may assess the cost for achieving each deployed tether length, including the amount of energy that would be used to take up/let out the desired portion of the tether.

In step 2205, an itinerary is selected. For this example, the itinerary is simply to either go "up" (increase $\Delta$Alt) or to go "down" (decrease $\Delta$Alt), or do nothing. Several alternatives exist for the decision criterion:
a. Accumulated probability of success. In this alternative, cost metrics are ignored and the probability of success is evaluated for all candidates in the "up" direction versus the "down" direction. The "up" or "down" itinerary with the greatest probability of success is selected. Note that the "do nothing" itinerary is not available for this option since its probability of success is zero. Also, these metrics are formed with the assumption that, once selected, the system will execute an itinerary until it reaches an endpoint, and only then would it (possibly) reverse direction. However, this decision can be revisited later (see below).
b. Maximum utility. In this alternative, the utility (benefits and costs) of each itinerary are assessed. All three itineraries are possible candidates, and the complete "up" and "down" itineraries are assessed on probabilistic grounds considering the likelihood of success and failure at each increment of $\Delta$Alt. The itinerary with the greatest utility is selected.

In step 2206, the first stage of the selected itinerary is executed ($\Delta$Alt is changed by $\Delta$Alt$_{inc}$). In step 2207, the system determines if stationkeeping (or more general criteria such as e.g. limitation on excessive winds) is satisfied and/or improved. If so, the system stops changing $\Delta$Alt and proceeds to optimize its operation at the new $\Delta$Alt. Conversely, if success is not achieved, the system returns to step 2203 and iterates through the process. Note that this early iteration occurs after only the first (and each subsequent) incremental change in $\Delta$Alt. Therefore, in some scenarios the system may initiate an "upward" itinerary and then reverse to a "downward" itinerary, or initiate a "downward" itinerary and then reverse to an "upward" itinerary. It is also possible that the system would initiate an upward or downward itinerary, and then choose to "do nothing" after a first step, even if the stationkeeping failure (or more generalized criterion) was not formally satisfied.

In the event that the selected itinerary is to "do nothing", the test for success in step 2207 will immediately result in a "no." in this case, a suitable timer can be implemented to trigger the iterative procedure at a reasonable future time (e.g., 10 minutes, or one hour, in the future). If success is achieved, the method moves to step 2208 labeled stop until another stationkeeping failure or other triggering event occurs.

Other Embodiments

Other embodiments of the present systems and methods include, but are not limited to, the following features that may occur individually or in combination (along with their consequential impact on other elements of the system, such as the sizes of the airships, parafoils and parachutes):

a) The embodiment described above in the sizing exercise where the upper airship additionally includes a propulsion system;

b) The embodiment described above in the sizing exercise, where the upper airship additionally includes a solar power generation system and/or a wind power generation system;

c) The embodiment substantially as described above in the sizing exercise, with the addition of a power transfer system between the two airships allowing the upper airship to derive its power from the lower airship, instead of a solar (or wind) power system on the upper airship, allowing the solar for wind) power system on the upper airship to be deleted;

d) The embodiment substantially as described above in the sizing exercise, additionally comprising an electric power generation subsystem based on current flow between the upper and lower airship induced by the ambient voltage gradient, thereby allowing the solar (or wind) power subsystems on one or both of the airships to be reduced in size or eliminated;

e) The tether also adapted to serve as one or several antennas for radio communications (e.g., via conductive portions of the tether tailored to specific antenna designs), or as a support for one or several antennas for radio communications attached and/or strung along its length. A long antenna, operating in conjunction with a suitable transmitter on the lower or upper airship (or both), can be adapted to very low frequency (VLF) or even extremely low frequency (ELF) communications with sufficient radiation efficiency to enable successful communications for certain low data rate missions;

f) The tether adapted to include, spaced along its length, atmospheric sensors to enhance the real-time knowledge of ambient conditions (e.g., temperature, pressure, wind). These atmospheric sensors could be used to collect a variety of information including information that could be useful for weather prediction in general and also for control and stabilization of the tethered airships.

g) A tether attachment/deployment mechanism containing a heater to warm the tether prior to spooling onto a spool or reel, or stowing with an alternative take-up mechanism, and maintain a temperature higher than ambient (for the spool or reel, or alternative mechanism, as well as the tether thereon or therein), in order to maintain flexibility as the tether is deployed and stowed.

h) Round and dirigible-shaped airships (as well as other shapes not illustrated here) are, to a degree, interchangeable. Detailed designs of the various configurations will depend on the selected shapes of the airships. The selected shapes will depend on several factors including the available technology and the expected winds aloft in the intended operating areas and altitude ranges. A dirigible-shaped airship can have a relatively low drag coefficient in the range of 0.025 to 0.03 (although other values are possible). For example, the NASA study cited a drag coefficient of roughly 0.025. In contrast, a balloon-shaped airship will tend to have a drag coefficient that can be an order of magnitude larger in the range of 0.3 to 0.5, although other values are possible). Since a spherical shell offers the smallest surface area for a given enclosed volume, a balloon-shaped airship is most efficient in terms of minimizing hull mass for itself, and therefore cost to lift a given mass to altitude. However, in the context of a tethered airship system, the increased drag coefficient (as well as the larger reference area of a spherical airship as compared to a dirigible-shaped airship of similar volume but high fineness ratio) leads to increased drag compared to a dirigible-shaped airship, which tends to lead to a larger compensating parachute and parafoil on the lower airship. The shape of the lower airship could be adjusted to increase its nominal drag coefficient; however, this may in turn lead to a need for a larger parachute and parafoil on the upper airship. The lower airship may also require larger engines and batteries (or fuel supplies) to accommodate increased drag from the upper airship during periods when countervailing winds are light or effectively nonexistent at the lower airship's altitude, Mission simulations using candidate airship designs and historical wind patterns in an area of interest can be used by a system designer to gain insight into the impact of alternative airship shapes and drag coefficients on the sizes of the parachutes and parafoils needed to equalize the drag, as well as the energy reserves needed to handle periods of low or nonexistent countervailing winds. It is expected that many practical embodiments will be based on airships with relatively low drag (e.g., drag coefficients in the range of 0.025 to 0.03), despite the additional weight of hull material needed to build such airships, since this will tend to minimize the sizes of the parachutes and parafoils. However, in some cases it may prove advantageous to design and use an upper or lower airship with higher drag coefficient. This can be achieved by shifting to a "more spherical" shape.

A variety of other techniques could be used to increase the drag of the upper airship (2320). For example, in FIG. 23B, one or more inverted rear-mounted sails (2322) could be suspended below the upper airship (2320) in addition to, or instead of a parachute. The sail (2322) could be used for a variety of purposes including producing drag and directional thrust. In some embodiments, control over the sail or sails could be such that the sails can be used to selectively produce varying degrees of left/right thrust and drag. The combined drag of the sail and the airship can vary from a low value when the sails are parallel to the wind direction to a larger value when the sails are more perpendicular to the wind. Control of the orientation of the sail relative to the wind direction can be achieved by equipping the airship with a rudder; alternatively (or in addition), the orientation of the sail relative to the airship can be controlled by providing for a variable point of attachment, relative to the airship centerline, of the line(s) supporting the sail. In this embodiment, the sail effectively acts as a rudder, allowing an elongated airship to present a larger frontal area to the wind, thereby increasing drag. In order to avoid long-term integration of lateral forces that could adversely affect station-keeping, the airship can "tack back and forth" against the wind.

Figure 23A:
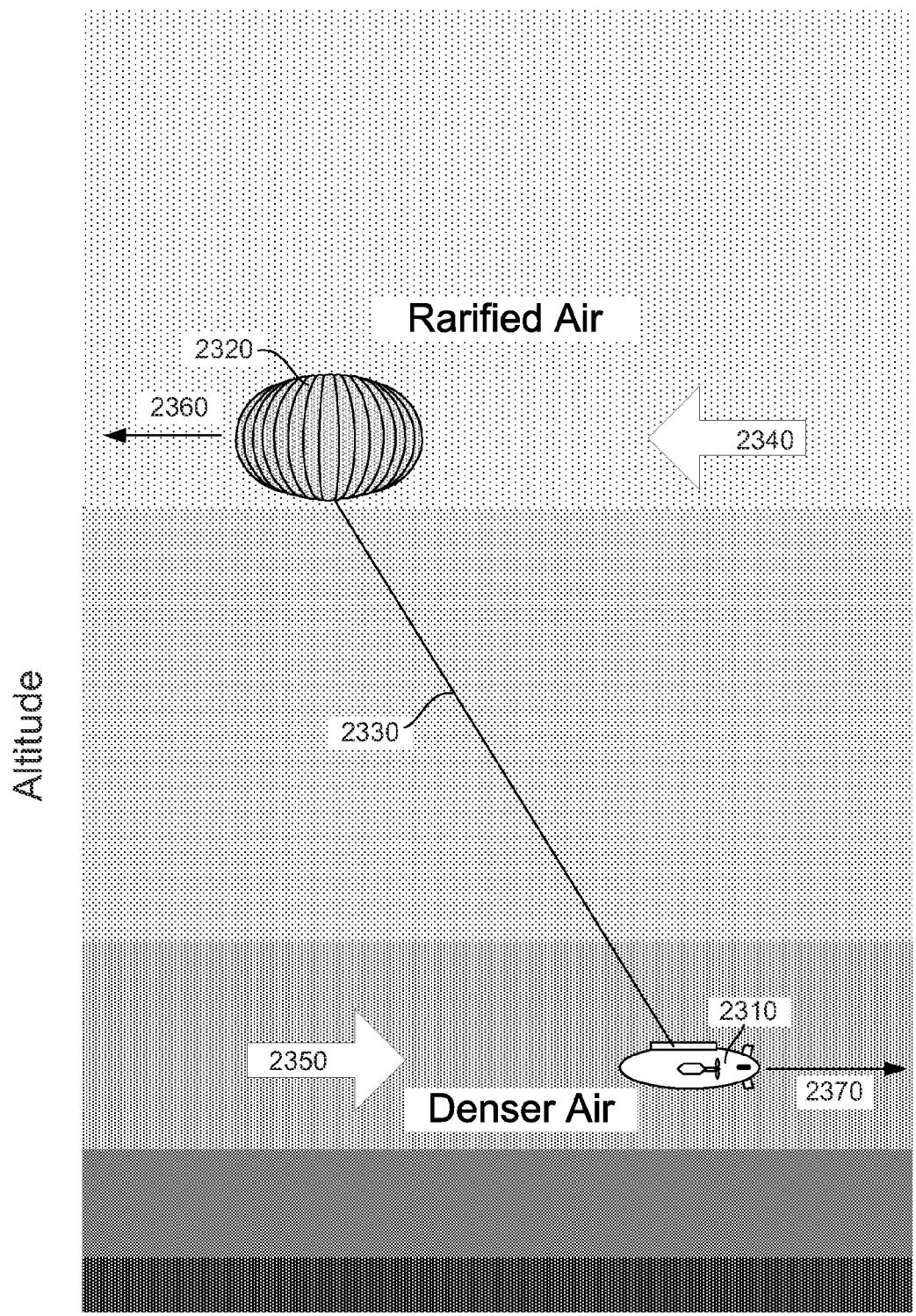
Figure 23B:
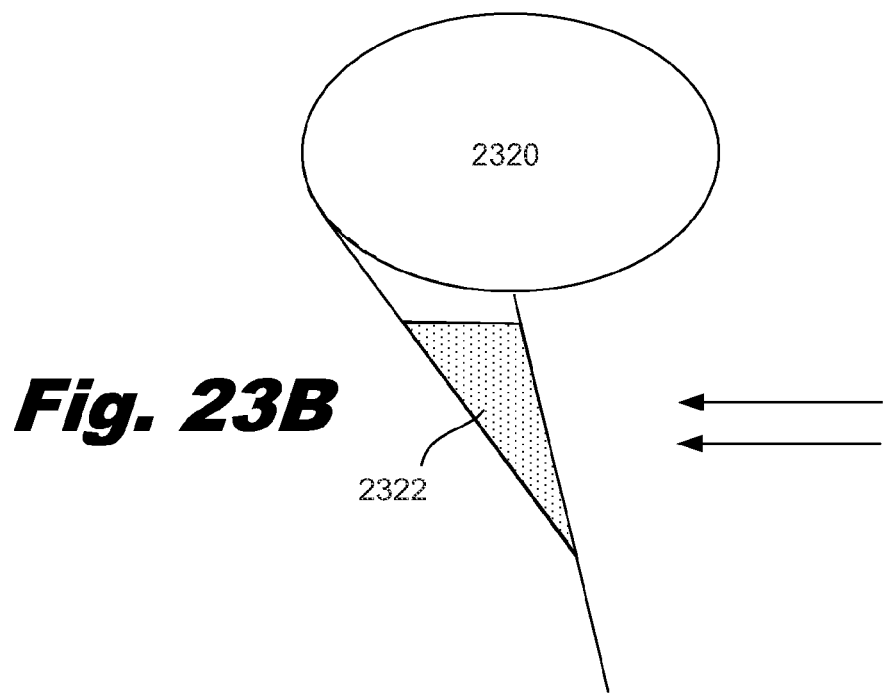
Figure 23C:
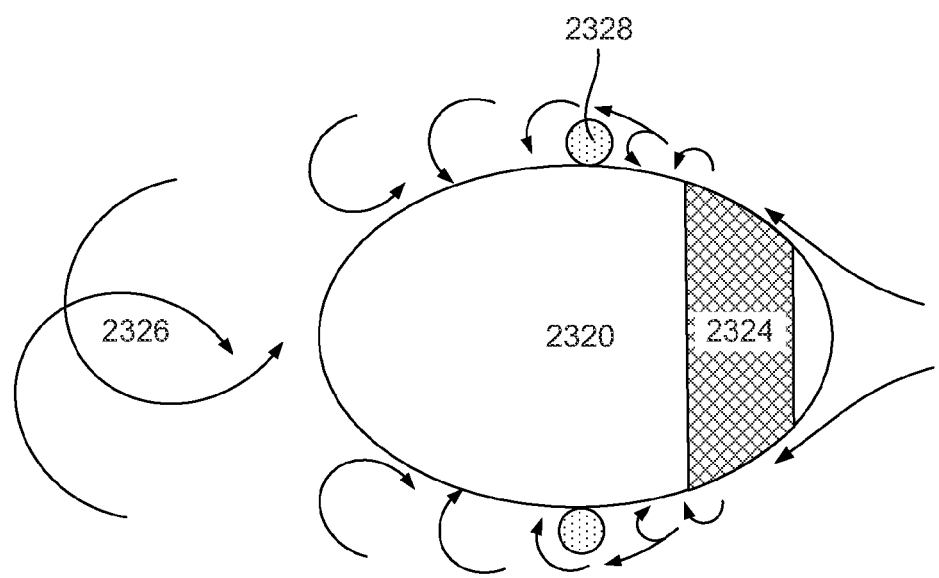

FIG. 23C shows that upper balloon (2320) that has several features that can be used to increase the drag force produced by the upper balloon. For example, the upper balloon may have an area (2324) with a roughened surface. In some Reynolds number regimes, this can introduce additional turbulence that increases the drag force produced by the air flow over the surface. This roughened surface (2324) can be produced in a number of ways, including texturing the surface of the gas envelope, allowing seams in the envelope material to extend outward from the surface, stretching a filament mesh over a portion of the balloon, or other techniques.

Additionally or alternatively, a macro-feature (2328) can be attached to the upper balloon (2320) to increase frontal area of the balloon 2320) and detach the boundary layer from the balloon surface. In this example, the macro-feature is an inflatable ring that passes around the circumference of the balloon at its widest vertical cross-section. This can produce a larger turbulent wake (2326) with a corresponding large low pressure area over the trailing portion of the balloon. A variety of other macro-features could also be used.

Figure 23D:
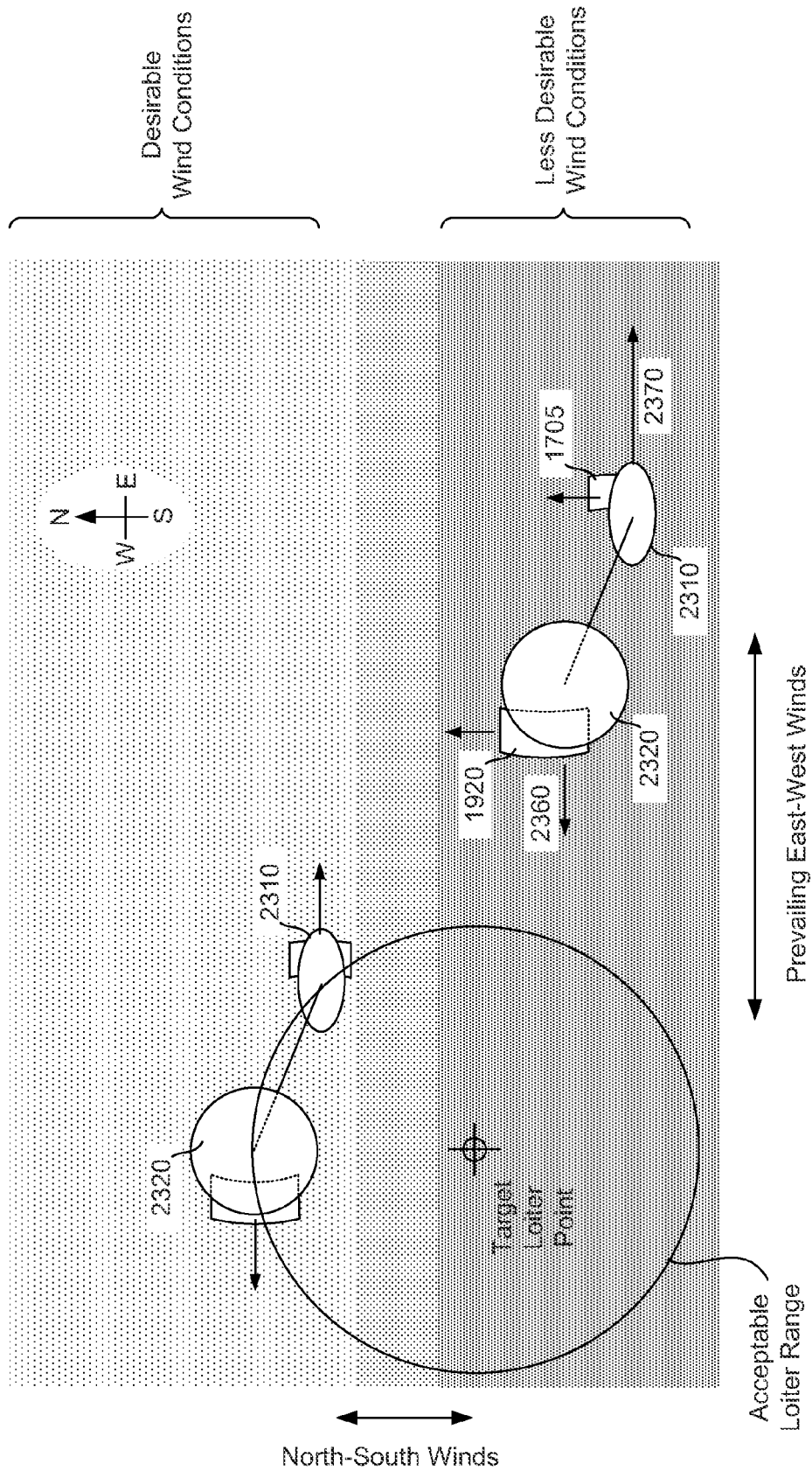

As discussed above, a number of parameters can be adjusted to optimize the airship system/s stationkeeping performance. For example, changing the altitude of the airships and changing the aerodynamic characteristics of the airship system can both be used to improve the system/s stationkeeping performance. FIG. 23D describes another technique to improve stationkeeping performance by transverse motion of the airship system to reach areas with more optimal wind conditions. In general, the amount of change of wind conditions achievable by moving upwind or downwind (e.g., by adjustment of the drag provided by the upper and lower parachutes) is minimal. However, by moving across (transverse) to the direction of the prevailing winds, changes in the wind conditions can be significant.

FIG. 23D is a bird's eye view of an operational area and long endurance airship system. In this example, the airship system includes lower airship (2310) with a lower parafoil (1705) and an upper airship (2320) with an upper parafoil (1920). The prevailing winds in the operational area are cast-west winds and there may also be a smaller-magnitude component of wind in the north-south directions. In this example, there are two different regions in the operational area: a region with less desirable wind conditions and an area with more desirable wind conditions. In this example, winds in the less desirable area create a relatively large drag force (2370) on the lower airship is shown as a horizontal arrow extending from the lower airship toward the east. The smatter drag force (2360) produced by the upper airship is shown as a horizontal arrow originating at the upper airship and extending toward the west. This imbalance in drag force has caused the airship to drift east of the target loiter point and acceptable loiter range.

As discussed above, the airship can return to the target loiter point using a variety of techniques. For example, the airship could use propulsion on the lower airship to counteract the higher drag of the lower airship. The upper airship may deploy a drag increasing device, such as a parachute, macro-feature, or other device. Additionally or alternatively, the airship system may adjust the altitude of the airships to reach more favorable wind conditions and/or air densities.

However, in the situation shown in FIG. 23D, the airship can move to the north to leave the less desirable wind conditions in favor of more desirable wind conditions. For example, the propulsion capability of the lower airship can be used to pull the airship system to the north. In other embodiments, lifting surfaces on the upper and/or lower airship can be used to produce asymmetric lift that pulls the airship system to the north. For example, the lines on the parafoils can be controlled so that the parafoils produce a lift vector that has a substantial component directed to the north. This moves the airship system toward the north and out of the less desirable wind conditions. In the area with more desirable wind conditions, the drag forces on the airship system are more balanced. This allows the airship system to return to stationkeeping within the acceptable loiter range using a minimum of energy.

The determination of desirable wind conditions and less desirable wind conditions can made in a number of ways, including meteorology forecasting, direct measurement using deployed sensors, visual observation, or other techniques.

FIG. 23E is a diagram that shows an airship system deployed with an upper lobed airship at a high altitude and in rarified air and a lower dirigible airship at a lower altitude and in denser air. When the upper airship is at its nominal maximum altitude, the pressure on the inside of the upper airship is greater than the exterior air pressure. This results in the upper airship maintaining a round profile with a taunt outer membrane. This is desirable for a variety of reasons, including minimizing flapping of the outer membrane and maintaining consistent aerodynamic performance.

As discussed above, it can be desirable at times for the airship system to change the operational altitudes of the airships. This is accomplished by shorting (or lengthening) the tether between the upper airship and the lower airship. Shortening the tether results in increased tension on the tether, lowers the altitude of the upper airship and increases the altitude of the lower airship. The amount of altitude change that can be accomplished is limited by a number of factors, including the strength of the gas envelope(s) in the lower airship and their ability to withstand greater differential pressures at higher altitudes. Another operational consideration is the reduction in volume of the upper airship as it is brought to lower altitudes and the outside pressure increases. This causes the upper airship to loose its full, round profile and become more teardrop shaped. Portions of the upper airship envelope become loose and folded. In ordinary free flying airship systems, loose portions of the envelope are ordinarily not a problem because the airship drifts with the wind. There is no substantial difference between the velocity of the balloon and the air surrounding the balloon. However, in the airship system shown in FIG. 23E, the airship system is nominally stationary and the upper airship is subject to the full velocity of wind at its operational altitude. The loose folds of envelope material can flap in the wind and eventually may become damaged due to fatigue and wear.

FIG. 23F shows one method for compensating for the reduction in the volume of the working gas when the altitude of the upper airship is reduced. The upper airship includes one or more ballonets that can be inflated with ambient air. These ballonets can be gradually inflated as the altitude of the upper airship decreases. In one example, the ballonets are in the lower portion of the balloon. The inflation of the ballonets with atmospheric gas compensates for the reduction in volume of the lifting gas, caused by the higher atmospheric pressures at lower altitudes, to maintain the envelope in a nominally tensile state. This prevents loose envelope material from flapping. The fabric or other material comprising the ballonets can be relatively thin compared to the hull material of the upper airship, and therefore relatively light in terms of its areal density, since the ballonets can be designed so that there is no significant pressure difference between the ambient air in the ballonets and the lifting gas in the main portion of the lifting volume of the airship over the intended altitude operating range of the upper airship.

FIGS. 23G-23J show a number of alternative techniques that could be used to maintain full or partial tension in the envelope of the upper airship. FIG. 23G shows an upper airship at its nominal operational altitude with an internal deflated ballonet extending vertically along the major axis. FIG. 23H shows the upper airship at a lower altitude. The banana has been inflated. The inflation of the ballonet maintains the tension in the gas envelope in two ways. First, the ballonet occupies some of the volume within the gas envelope. Second, the ballonet alters the shape of the gas envelope from a spheroid to a toroid. The toroid has a significantly smaller volume than the spheroid with the same surface area. As a result of these two factors, inflation of the ballonet can maintain the tension in the envelope of the upper airship over a range of altitudes. A nominally balloon-shaped airship can also be converted into a toroidal shape by drawing the upper and lower "poles" of the airship hull toward one another using an internal tension member such as a string or cable. This can reduce the enclosed volume by roughly a factor of 2:1. A shape-changing apparatus, such as a cable adapted to pull the upper and lower "poles" of the airship hull toward one another, can be combined with internal ballonets to maintain tension in the outer hull over a wider range of attitudes than can be achieved with a shape-changing apparatus alone.

One design consideration for ballonets is to minimize air teaks out of the ballonet and into the lifting gas of the airship. It is of less concern if the air leaks out of the ballonet and back into the atmospheric surroundings, or if a small portion of the lifting gas leaks into the ballonet (although this is not desirable either). Contamination of the lifting gas by leaks of ambient air out of the ballonet permanently reduces the lift of the airship. However, if a portion of the air leaks out of the ballonet into the atmosphere, more air can simply be pumped into the ballonet. As discussed below, if a small portion of the lifting gas leaks into the ballonet, it will eventually be expelled to the atmosphere when the airship is allowed to rise in attitude and the ballonet is deflated, but more lifting gas can be added to the upper airship envelope via onboard stores of lifting gas (e.g., liquefied or compressed storage) or resupply from an external source such as the lower airship. Thus, the ballonet material should be substantially impermeable to air to prevent air from contaminating the lifting gas. However, a small amount of permeability to lifting gas may be tolerable.

Figure 23I:
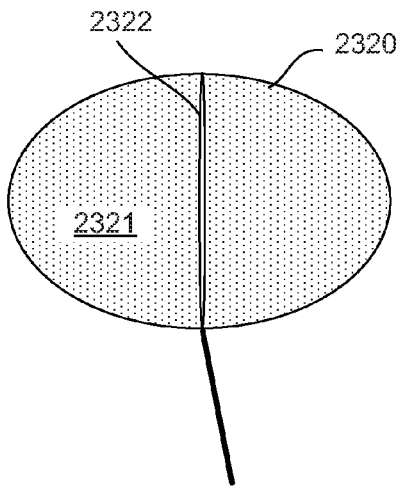
Figure 23I:
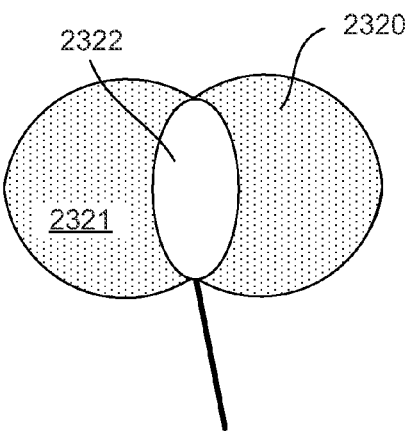
Figure 23I:
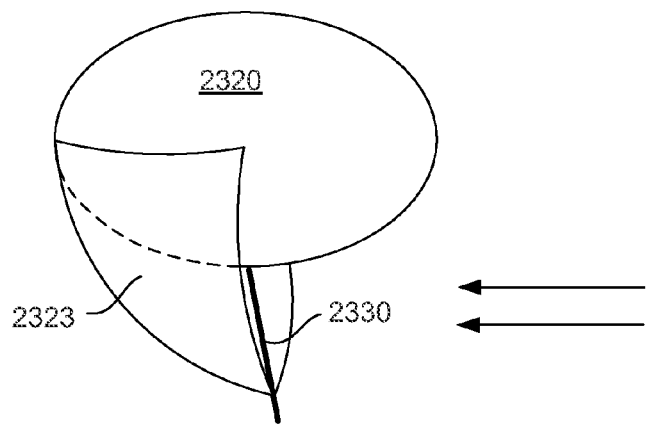
Figure 23J:
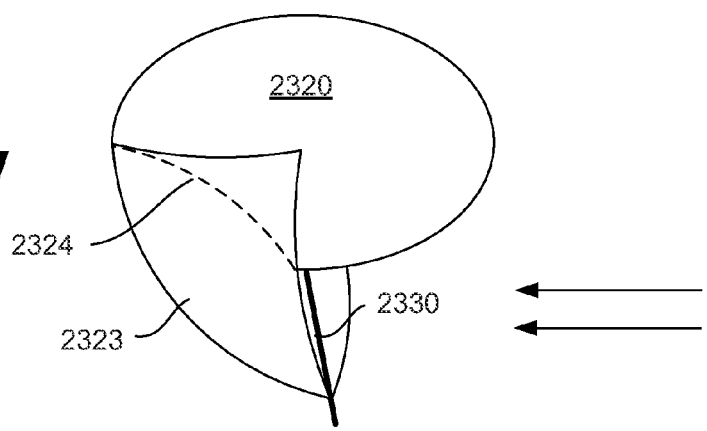

FIGS. 23I and 23J include a ram filled parachute that includes a sheet of material hanging from the outer perimeter the upper airship (shown here as a balloon-shaped airship although this is only one example). The parachute is also attached to the tether line. This configuration can naturally maintain the heading of the balloon into the wind and reduces its tendency to "hunt" during strong winds.

FIG. 23I shows the airship at its maximum operational altitude with air filling the parachute. A dashed line shows that the bottom of the airship maintaining its convex shape. At lower altitudes, when the wind fills the parachute, the bottom of the airship is compressed by the air rammed into the parachute. This increases the pressure in the gas envelope and maintains partial tension in the membrane. In this embodiment, the amount the gas envelope compresses is directly correlated to the strength of the wind. Thus, the stronger the wind blows, the tighter the gas envelope.

Lifting Gas Replenishment

For any airship designed for long-endurance operation, one factor affecting endurance is the leakage of lifting gas. To overcome this problem, the airship can be designed to minimize the leakage rate of lifting gas (e.g., by proper hull design), or it can drop ballast as the lifting gas is depleted, or it can carry a reservoir of lifting gas in compressed form. The reservoir can be used to replenish lifting gas until the reservoir is depleted. In tethered airship systems such as those described above, there is a strong motivation to keep the upper airship as lightweight as possible. Thus, it can be undesirable to store large amounts compressed lifting gas and/or ballast on the upper airship.

A stratospheric balloon or airship is generally designed with a light-weight hull so as to minimize overall vehicle size. For example, balloons intended for operation in the upper stratosphere may have hull thickness less than 50 µm, weighing less than 100 g/m² of effective hull surface area. The rate that a lifting gas, such as H2, leaks from such a surface will depend on its material and construction as well as operational factors such as the internal pressure of the balloon. Generally, efforts are made to limit the leakage rate through careful design. Such efforts are especially important for long-endurance missions. U.S. Pat. No. 5,279,873, awarded to Oike, describes a hull material that exhibits a leakage rate for H2 of 3 ml/m² over a 24 hour period under standard atmospheric pressure (101 kPa). If this is scaled to the case of a large stratospheric airship with a surface area of 40,000 m² operating with an internal pressure of 520 Pa, the leakage rate would be on the order of 1 kg of lifting gas every 100 days. This must be replenished for long-duration missions, in order to prevent a loss of lifting capacity. A reservoir of lifting gas can be used, but for very long-duration missions, this reservoir may also require replenishment. If a way can be found to replenish the lifting gas with a relatively small on-board reservoir (with its associated tanks or other equipment for providing the lifting gas), or no on-board reservoir at all, the size of the upper airship and the weight of its hull can be minimized.

Figure 23K:
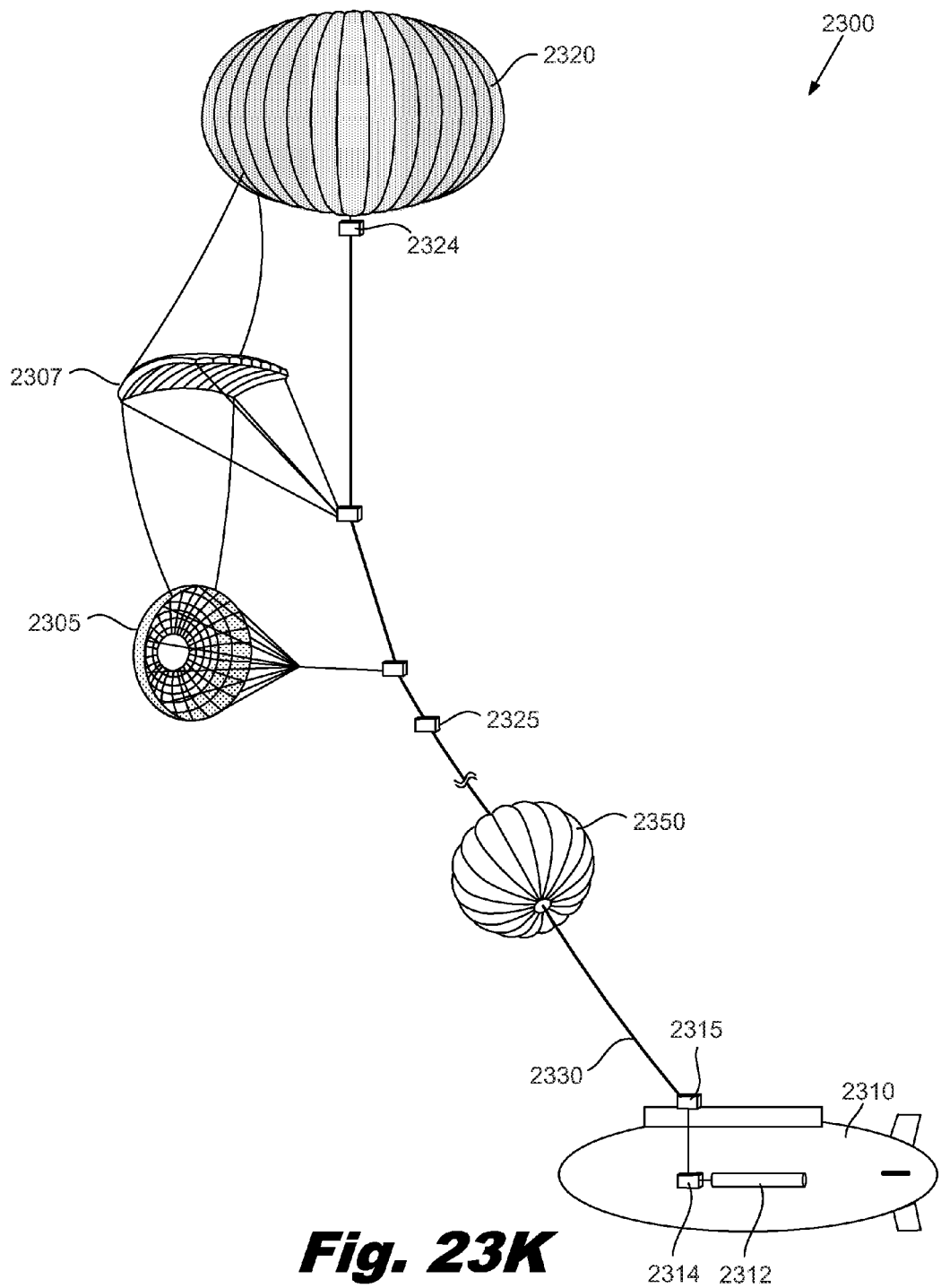

As illustrated FIG. 23K, the tethered airship system 2300 with gas replenishment comprises a "balloon shuttle" 2350 that can travel up and down on (or along) the tether 2330 connecting the upper logistics airship 2320 (along with its associated subsystems) and lower airship 2310. The lower airship 2310 may be a second logistics airship or a payload airship. In some embodiments, the lower airship 2310 is a second logistics airship to which a payload airship mated to the lower logistics airship.

Docking fixtures 2325 and 2315, associated with the upper and lower airships, respectively, provide a means to: a) releasably dock the balloon shuttle at the upper and lower airship; and b) transfer lifting gas. The docking fixtures contain or are associated with valves (not shown) to allow the effective transfer of lifting gas to and from the balloon shuttle. Similarly, the balloon shuttle contains valves to allow the transfer of lifting gas when such transfer is desired, and prevent the venting of gas when such venting is not desired (see FIG. 24).

A number of additional elements may also be attached to the tether. For example, a parachute 2305 and a parafoil 2307 may be used to adjust lift and drag forces of the airship system. These additional elements are not integral components of the system or methods for lifting gas replenishment and can be included or omitted from the airship system based on other design parameters.

Also shown in FIG. 23 is a reservoir of lifting gas 2312 on the lower airship 2310, shown as a bottle of compressed gas, and a pump/valve assembly 2314. The reservoir 2312 and pump/valve assembly 2314 are operably interconnected to each other and to the docking fixture 2315, via suitable hoses or equivalent, so as to allow the commandable transfer of lifting gas from the reservoir 2312 to the balloon shuttle 2350 (when it is property mated to the docking fixture 2315), and similarly from the balloon shuttle 2350 to the reservoir 2312. Command and control hardware and software are not shown, but assumed to be present. Of course, the reservoir of lifting gas could also be used to replenish the lower airship; however, the description herein is focused on the replenishment of the upper airship. It should also be noted that the reservoir 2312 could comprise multiple storage bottles (reservoirs) of possibly varying pressure and/or gas type.

Also shown in FIG. 23 is a pump/valve assembly 2324, operably interconnected via suitable hoses (not shown) to the docking fixture 2325 and the interior of the lifting volume of the upper airship 2320. The pump/valve assembly allows the commandable transfer of lifting gas from the balloon shuttle 2350 to the upper airship 2320. As described in more detail below, the pump/valve assembly 2324 may comprise both a pump and valve, or only a valve. The inclusion of a pump in the pump/valve assembly 2324 allows the upper airship 2320 to extract low-pressure gas from the balloon shuttle 2350 (at, or only slightly above, ambient atmospheric pressure), and pump it into the higher-pressure (in some embodiments and under some operational conditions) lifting volume of the upper airship itself.

Not shown in FIG. 23, but assumed to be present, are control and automation subsystems to allow the effective control of the illustrated systems by human operators on the ground, or alternatively by automated control systems.

Figure 24:
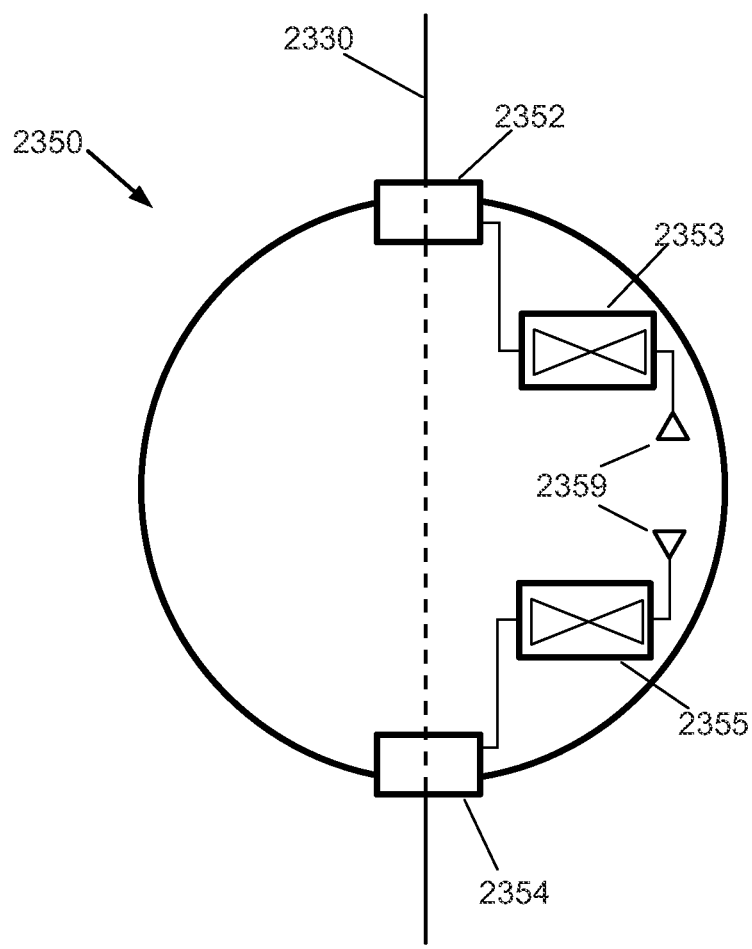
FIG. 24 illustrates certain subsystems of an illustrative balloon shuttle, according to one example of principles described herein.

FIG. 24 illustrates the balloon shuttle 2350 with valves 2353 and 2355, which, together with the mating fixtures 2352 and 2354, allow the commandable transfer of gas into and out of the shuttle 2350 through the apertures 2359 contained therein. The mating fixtures 2352 and 2354 also allow the balloon shuttle to reversibly mate with the upper and lower airship, respectively. In one embodiment, the balloon shuttle has no onboard power source or active electronics, and the valves 2353 and 2355 are commanded and/or controlled by the upper and lower airship when the balloon shuttle is docked to one airship or the other. Specifically, the lower airship 2310 can control the valve 2355 when the balloon shuttle is mated to the lower airship's docking fixture 2315 by its own mating fixture 2354, and the upper airship 2320 can control the valve 2353 when the balloon shuttle is mated to upper airship's docking fixture 2325 through its own mating fixture 2352. A wide variety of electrical, magnetic, and mechanical mechanisms to achieve this control of the valves can be used and will not be discussed. Of course, the valve 2353 and mating fixture 2352 could be integrated into a single structure, and similarly the valve 2355 and mating fixture 2354 could be integrated into a single structure.

In another embodiment, the balloon shuttle 2350 comprises an onboard equipment controller, command and telemetry system, and power source (such as a battery), and controls the valves 2353 and 2355 itself subject to commands received from the ground and/or the airships themselves (possibly in response to commands the airships have themselves received from the ground).

In normal operation, the balloon shuttle 2350 may be assumed to be docked at the lower airship 2310 when not in use (although this is not an inherent operating requirement or constraint of the inventive concepts). It may be partially filled with lifting gas. When it is determined that lifting gas replenishment of the upper airship is desirable, the pump/valve assembly 2314 and valve 2355 is operated to transfer lifting gas from the reservoir 2312 to the balloon shuttle 2350. This makes the balloon shuttle more buoyant. If the balloon shuttle is passive, it can be made positively buoyant with sufficient buoyancy to reach the upper airship at the upper airship's current operating altitude. When a suitable increment of lifting gas has been transferred (see example below), the pump/valve assembly 2314 and valve 2355 are shut off to prevent the inadvertent venting of gas and the docking fixture 2315 is operated to release the balloon shuttle 2350. The balloon shuttle, now positively buoyant, rises along the tether 2330 until it encounters the docking fixture (2325, FIG. 23) associated with the upper airship 2320. At this point, the docking fixture 2325 is operated to securely capture (dock) the balloon shuttle to the docking fixture. This includes the proper mating of gas transfer ports, electrical and/or mechanical interfaces, and latching of the balloon shuttle to the docking fixture 2325 to prevent uncommanded separation. At this point, the pump/valve assembly 2324 and valve 2353 are operated to transfer a portion of the lifting gas from the balloon shuttle 2350 to the upper airship 2320. This partially or completely replenishes the lifting gas of the upper airship, makes the upper airship more buoyant, and makes the balloon shuttle 2350 less buoyant. When a suitable increment of lifting gas has been transferred, the pump/valve assembly 2324 and valve 2353 are shut off to prevent the inadvertent venting of lifting gas, and the docking fixture 2325 is operated to release the balloon shuttle. The balloon shuttle, now negatively buoyant, descends along the tether 2330 until it encounters the docking fixture (2315, FIG. 23) associated with the lower airship, where it is docked to await further operations.

Optionally, in some embodiments, lifting gas can be pumped from the balloon shuttle 2350 into the reservoir 2312 in order to minimize the leakage of lifting gas as well as the overall volume of the balloon shuttle when it is not in use, allowing for more compact external storage on the lower airship 2310, or even internal storage.

Initial Sizing Example

As one sizing example for the present inventive replenishment systems and methods, consider a tethered airship system comprising a lower airship with length of roughly 111 m and lifting volume of roughly 60,000 $m^3$, designed to operate at altitudes between 18 km and 19 km, and an upper airship designed as a balloon with a lifting volume at maximum altitude of slightly under 500,000 $m^3$, a radius at maximum altitude of slightly less than 50 m, and designed to operate at altitudes between 27 km and 37 km. The tether connecting the two could be "reeled in" or deployed by the lower airship to vary the altitude separation.

For this sizing example, it will be assumed that the replenishment system is designed to deliver roughly 1% of the lifting volume of the upper airship (5,000 $m^3$) in a single delivery to the maximum design altitude of the upper airship (37 km). This is equivalent to roughly 2.5 kg of H2 at a density of 0.5 $g/m^3$, associated with a balloon pressure of about 520 Pa. If the balloon material of the upper airship achieves the scaled leakage rate implied by Oike, this replenishment volume (or mass) would compensate for leakage over roughly 250 days. Clearly these design assumptions could be varied in several ways to accommodate various system and mission requirements, as well as various alternative system designs including other shapes and sizes of the lower and upper airships.

The balloon shuttle for this first illustrative example is assumed to be built with a balloon material and construction technique such that the mass of the balloon shuttle, less mating fixtures, valves, and internal structure, is no greater than 25 $g/m^2$ of balloon surface area. This is justified on the basis that the balloon shuttle is not required to maintain a significant pressure difference through day/night cycles at its maximum design altitude. By way of comparison, the Japanese space agency JAXA baselined a large stratospheric balloon (300,000 $m^3$) intended for a 10 day mission (therefore able to sustain a pressure difference through multiple day/night cycles of about 100 Pa) with a total balloon weight of 1200 kg. This is equivalent to an areal density (for the hull as a whole) of 54 $g/m^2$.

The mating fixtures and valves are assumed to weigh 5 kg for the upper fixture/valve set and 5 kg for the lower fixture/valve set; furthermore, an additional 5 kg is assessed for internal structure of the balloon shuttle (see discussion below). The lifting gas in the upper airship has a density at maximum altitude of about 0.5 $g/m^3$, so the 5000 $m^3$ of replenishment gas only weighs approximately 2.5 kg. Nevertheless, delivering this mass to the upper airship requires a balloon shuttle with a total lifting volume (at maximum altitude) of at least 20,000 m$^3$. An approximately spherical (pumpkin-lobed) balloon of this size has a radius of about 17 m and a surface area of about 3600 m$^2$, thus a total hull weight of about 90 kg. Adding the contributions from the upper and lower mating fixtures and valves, and internal structure, the total balloon shuttle mass would be roughly 105-110 kg. The lifting capacity of hydrogen at 37 km altitude is about 5.5 g/m$^3$. Therefore, a balloon shuttle with lifting volume of 20,000 m$^3$ or slightly larger has a lifting capacity of about 110 kg, and can carry itself to altitude. This is especially true when considering solar warming of the balloon, which allows slightly greater buoyancy during the day (assuming the balloon can grow to a slightly larger size). Therefore, it is clear that a balloon of this approximate size and weight could be filled to be neutrally buoyant at the altitude of the upper airship (no higher than 37 km), assuming ambient temperature, yet achieve positive contact with the mating fixture of the upper airship during daytime operation (when the balloon is slightly warmer than the surrounding air).

In order to provide design margin with respect to lifting capacity, the balloon shuttle in this example is augmented to comprise a lifting volume of 22,000 m$^3$. This results in a balloon radius of about 17.4 m and a surface area of about 3800 m$^2$. The hull weighs about 95 kg and the total balloon shuttle weighs about 110 kg. It has a lifting capacity at maximum design altitude of about 120 kg, and can carry itself to altitude. Its "excess buoyancy" at maximum attitude is about 10 kg.

After offloading 2.5 kg of lifting gas, the balloon shuttle is now negatively buoyant and can be released to descend down the tether to the lower airship (optionally, waiting for nightfall may also be part of the operational procedure). The hydrogen gas in the balloon shuttle is at slightly lower pressure than the internal design pressure of the upper airship (assumed to be 520 Pa in this illustrative example). Therefore, offloading 2.5 kg of lifting gas reduces the lifting volume of the balloon shuttle by about 6000 m$^3$, to roughly 16,000 m$^3$. The total mass is reduced to about 107.5 kg, but the new (smaller) lifting volume can only carry a load of about 88 kg. Thus, after being depleted by the resupply activity, the balloon shuttle is negatively buoyant by about 20 kg. The descent to lower altitude results in an increase in ambient pressure by a factor of about 18:1 and a corresponding decrease in volume, an at the lower altitude (18 km), the lifting volume is ~16,000/18=890 m$^3$. Its lifting capacity at this lower altitude is 113 g/m$^3$, for a total of about 100 kg. Hence it is negatively buoyant by about 7 kg even at the lowest operating altitude of concern, and will positively mate with the mating fixture associated with the lower airship.

The preceding discussion has demonstrated that it is possible to repeatedly transfer lifting gas from a lower airship to an upper airship in a tethered airship system, using a passive or substantially passive balloon shuttle running along the tether, relying on changes in buoyancy associated with the on-loading and off-loading of lifting gas. The size of the balloon shuttle, and other details of the system, can be varied according a number of principles. For example, solar warming of the balloon shuttle during the day (and cooling during the night) can be advantageously employed to enhance the desired positive or negative buoyancy for the upward and downward journeys, respectively. If additional buoyancy margin is desired, the altitude of the upper airship can also be reduced or the airships can be operated so that wind forces tend to push the balloon shuttle along the tether in the desired direction.

Additional Considerations

Figure 25A:
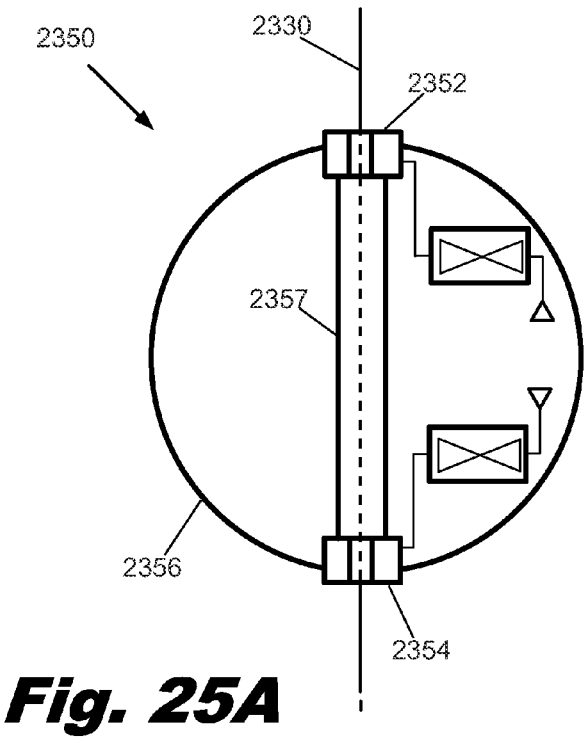
FIGS. 25A-25E illustrate additional features of an illustrative balloon shuttle, according to one example of principles described herein.

FIG. 23 illustrates the balloon shuttle as riding along the tether, with the tether actually running through the axis of the balloon, entering and exiting the balloon through its "north pole" and "south pole" at the location of the mating fixtures 2352 and 2354. Several techniques can be employed to prevent the leakage of lifting gas from the balloon through the points of ingress and egress of the tether. One option is to build the mating fixtures such that they can pass the tether with relatively low frictional losses, but prevent the leakage of lifting gas. FIG. 24 is a diagram showing this approach. Another option is to provide an inner balloon surface 2357 running along the axis of the shuttle as illustrated in FIG. 25A. Here, the lifting volume of the balloon is topologically equivalent to a torus. It is bounded by the outer balloon surface 2356, the inner balloon surface 2357, and the mating fixtures 2352 and 2354 that serve as the junction between the outer surface and the inner surface. The central hole, or tube, accommodates the free passage of the tether 2330. The mating fixtures 2352 and 2354 at top and bottom are still located at the "poles" of the balloon and surround the tether (at least in this embodiment), but the toroidal balloon design avoids the need for a gas-tight seal around the tether. Pneumatic ports and valves, shown in this figure, can be incorporated in the mating fixtures. For a balloon shuttle with an overall radius of 17.4 m (hence diameter of about 35 meters) and a central shaft with radius 10 cm, as illustrated in FIG. 25B, the inner surface 2357 has a surface area of (2*pi*0.1 m)×(35 m)=22 m$^2$ and a mass of about 0.6 kg if constructed of the same material as the outer surface (assumed herein to have an areal mass density of 25 g/m$^2$).

Figure 25B:
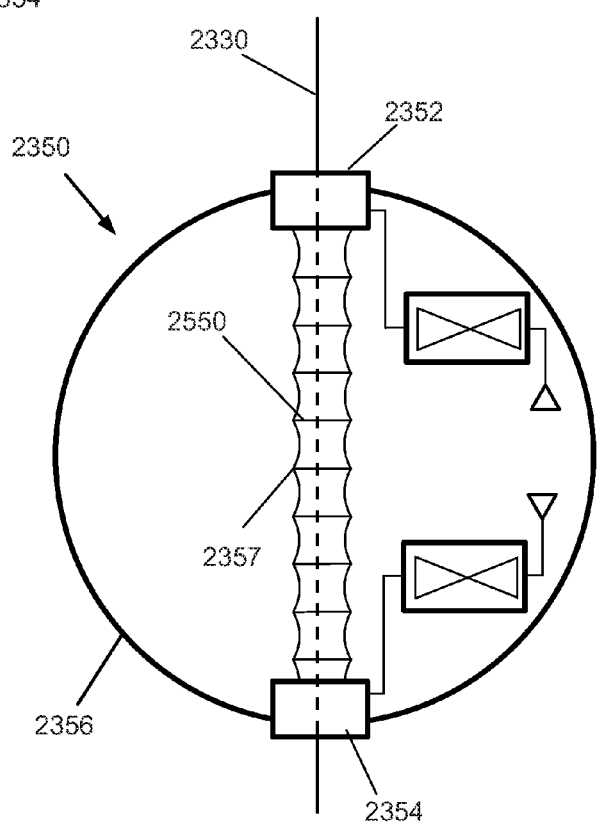
Figure 25C:
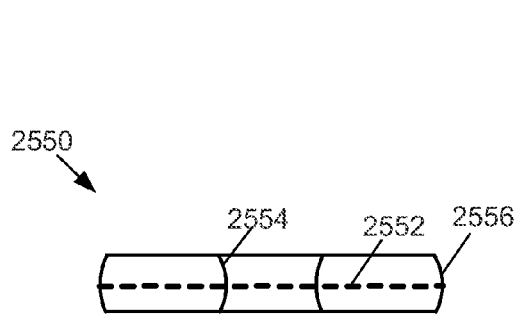

In order to prevent the inner surface 2357 from contacting the tether and potentially becoming worn over time, the embodiment illustrated in FIG. 25A can be equipped with internal structure as shown in FIG. 25B, including a plurality of hoops 2550 that provide a reinforcing framework for the inner surface 2357. The hoops can be constructed of a lightweight material such as carbon composite, and should be designed to minimize strain on the inner surface 2357, provide for free passage of the tether while minimizing the chance that the tether will contact the inner surface material where it may be curved inward between the hoops, and minimize the chance of abrasion between the tether and the hoops themselves. One suitable design for a hoop 2550 is illustrated in the side view of FIG. 25C. It is essentially a disk or "washer" of carbon composite material 2552 with an inner curved surface 2554 and outer curved surface 2556 intended to minimize friction with the tether (for the inner curved surface 2554) and minimize strain on the inner surface of the balloon 2557 (for the outer curved surface 2556). If the hoop 2550 is constructed of carbon composite material 1 mm thick, with density 1800 kg/m$^3$, and the hoop is 20 cm in diameter with inner and outer curved surfaces 5 cm high, the volume of each hoop is less than $10^{-4}$ m$^3$ and 16 such hoops (i.e., spaced 2 m apart along the central shaft) would have a total weight of about 3 kg. Hence the reinforced tube comprising the inner balloon surface 2357 and plurality of hoops 2550 have a total weight less than 4 kg (for the illustrated design), thereby validating the initial design assumption of 5 kg additional internal structure.

Figure 25D:
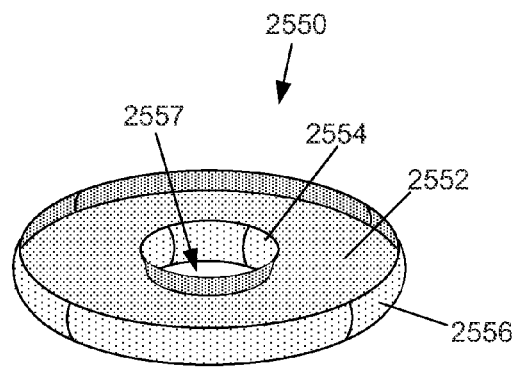
Figure 25E:
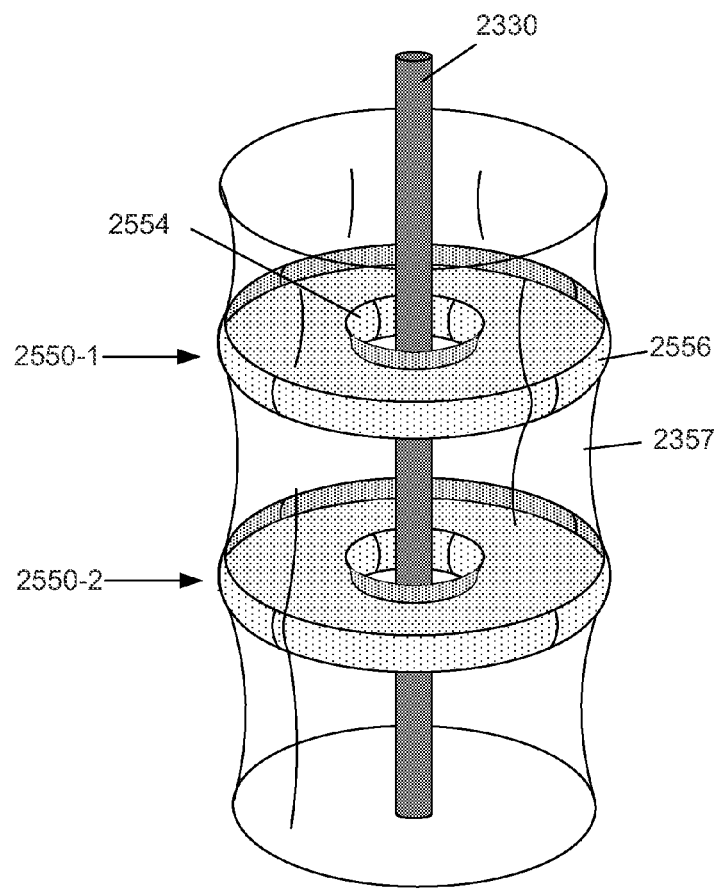

FIG. 25D is a perspective view of the hoop 2550 and shows the central disk 2552 that connects the curved inner surface 2554 and the curved outer surface 2556. The curved inner surface 2554 defines a central aperture 2557. FIG. 25E is a perspective view of a segment of the reinforced tube that passes through the center of the balloon shuttle 2350. As discussed above, a number of hoops 2550 are spaced along the reinforced tube. The outer curved surfaces 2556 support the inner balloon surface 2357 and hold it away from the tether 2330. The curvature of the inner balloon surface 2357 is influenced by a number of factors including the spacing between the hoops 2550, the internal pressure of the balloon and the atmospheric pressure.

The tether 2330 passes through the central apertures 2557. The inner curved surfaces 2554 are configured to contact the tether without damaging it. The inner curved surfaces 2554 may be covered with a dry lubricant or lubricious material to minimize friction and abrasion of the tether. For example, the curved inner surfaces may include a coating of polytetrafluoroethylene. Of course, the inventive concept is not limited to balloon shuttles of this illustrative design, or balloon shuttles with the weight characteristics as described illustratively above. A variety of other designs can be implemented using the principles described herein.

Figure 26:
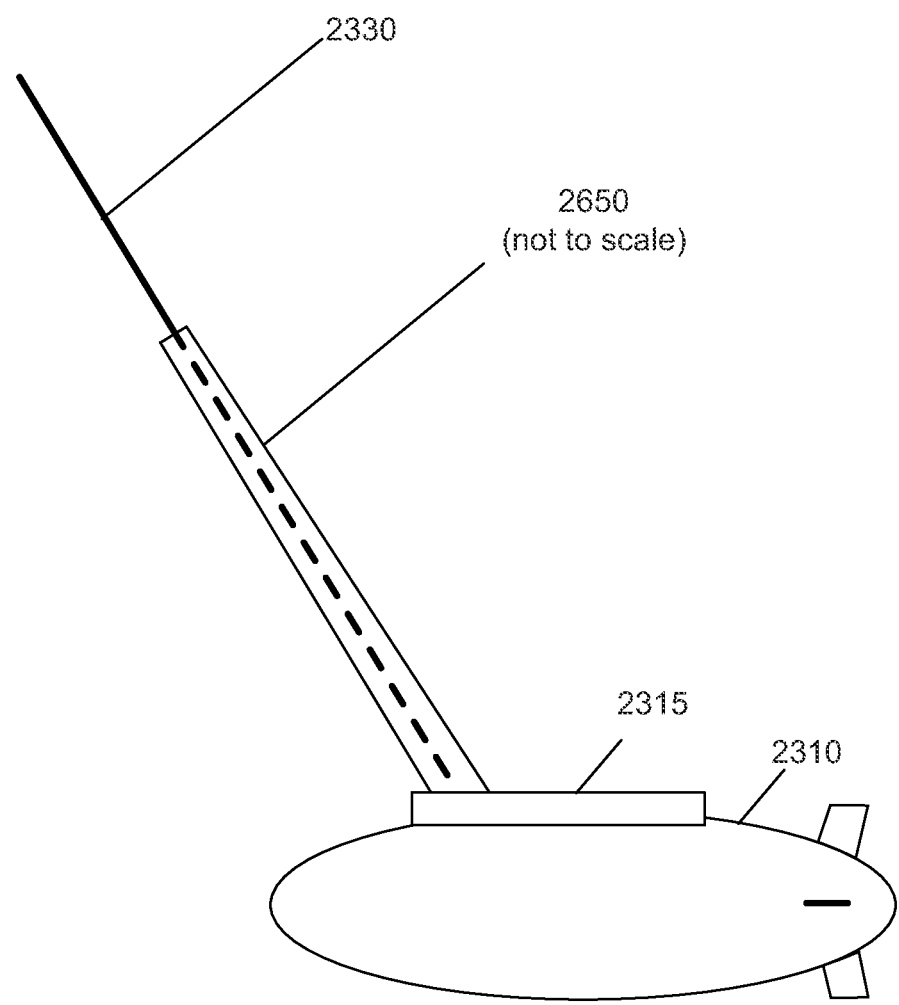
FIG. 26 illustrates an additional element of a lower airship and its associated docking system that can be used to minimize risk of damage to a balloon shuttle mated to the lower airship, according to one example of principles described herein.

While the balloon shuttle is mated to the lower airship between resupply missions, it may encounter strong winds and the lower airship may adjust the length of the tether that passes through the shuttle. In order to enhance survivability and endurance, the inventive system can incorporate the additional apparatus of FIG. 26. Specifically, a small-diameter sheath 2650 is included as part of the tether attachment/deployment system of the lower airship, surrounding the tether 2330, and within (or passing through) the docking fixture 2315. The sheath can also pass through the mating fixtures 2352 and 2354 of the balloon shuttle, as well as central holes of the hoops 2650, as the balloon shuttle settles down to, and mates with, the lower airship after completion of a resupply run. The curved inner walls 2554, of the hoops 2550, also serve to ensure that the hoops will reliably pass over the end of the sheath without getting snagged.

Once the balloon shuttle has settled over the sheath 2650 and mated to the lower airship 2310, the sheath protects the inner surface 2357 of the balloon shuttle from abrasion as the tether is deployed and retracted.

In order to minimize wind resistance and potential damage to the balloon shuttle from high winds, when it is mated to the lower airship and not engaged in a resupply mission, the balloon shuttle can be fully deflated (de-gassed) using the pump/valve assembly 2314, with the gas compressed and stored in reservoir 2312 (or a similar reservoir). The loose material can then be left to flap in the wind, or it can be secured and/or stowed.

Figure 27:
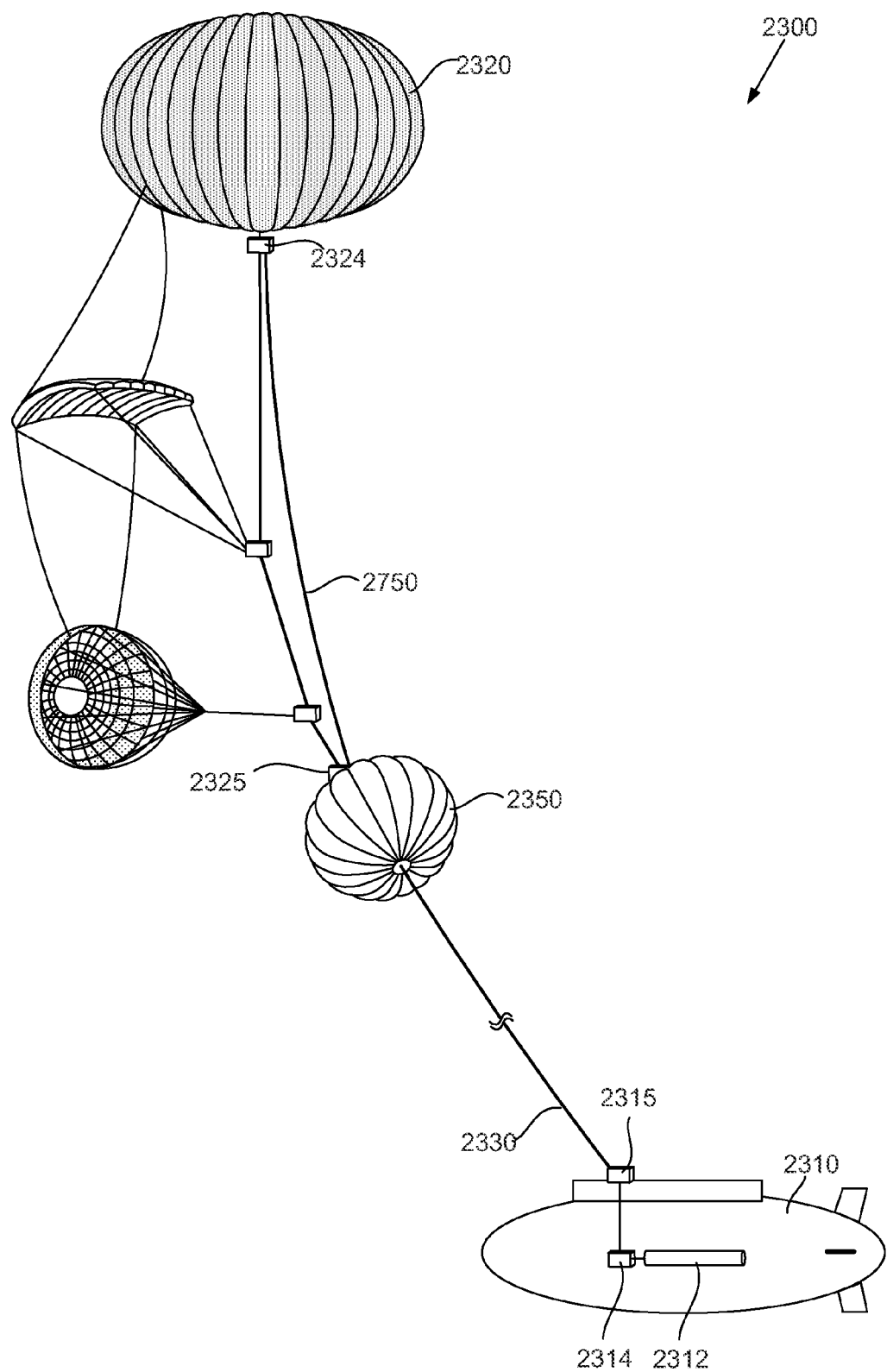
FIG. 27 illustrates the balloon shuttle delivering lifting gas to the upper airship, according to one example of principles described herein.

FIG. 27 illustrates the balloon shuttle mated to the upper airship with a pneumatic tube 2750 allowing the transfer of lifting gas from the docking fixture 2325, to the pump/valve assembly 2324 (shown as integrated with the tether attachment mechanism in this view, although this is not an inherent requirement of the inventive concept), and thence to the upper airship 2320.

Operating Schedule and Consideration of High Winds

When the winds are light or non-existent, the tether is essentially vertical and the two airships are at roughly the same latitude and longitude, separated only by altitude. The balloon shuttle operates as described above, ascending and descending along the tether affected primarily by its positive or negative buoyancy (which in turn is affected by the amount of lifting gas and its pressure and temperature relative to ambient conditions). As discussed above, historical data indicate that winds in the stratosphere tend to reach a minimum every 14 months on average, at which point they tend to switch directions. Therefore, there are good opportunities to perform resupply every 14 months or so, along an essentially vertical tether with minimal impact from the wind. Several resupply trips could be performed within a single "lull" in the wind. For example, with the leak rate and balloon shuttle design described above, the tethered airship system in toto and the upper airship in particular could be designed to allow depletion by several percent, anticipating two or more resupply missions at each "lull" in the wind spaced roughly 14 months apart.

If the overall system design is such that more frequent resupply is needed (i.e., not relying solely on the periods of very low wind), several techniques can be employed to operate in high winds when the tether is not substantially vertical.

Figure 28:
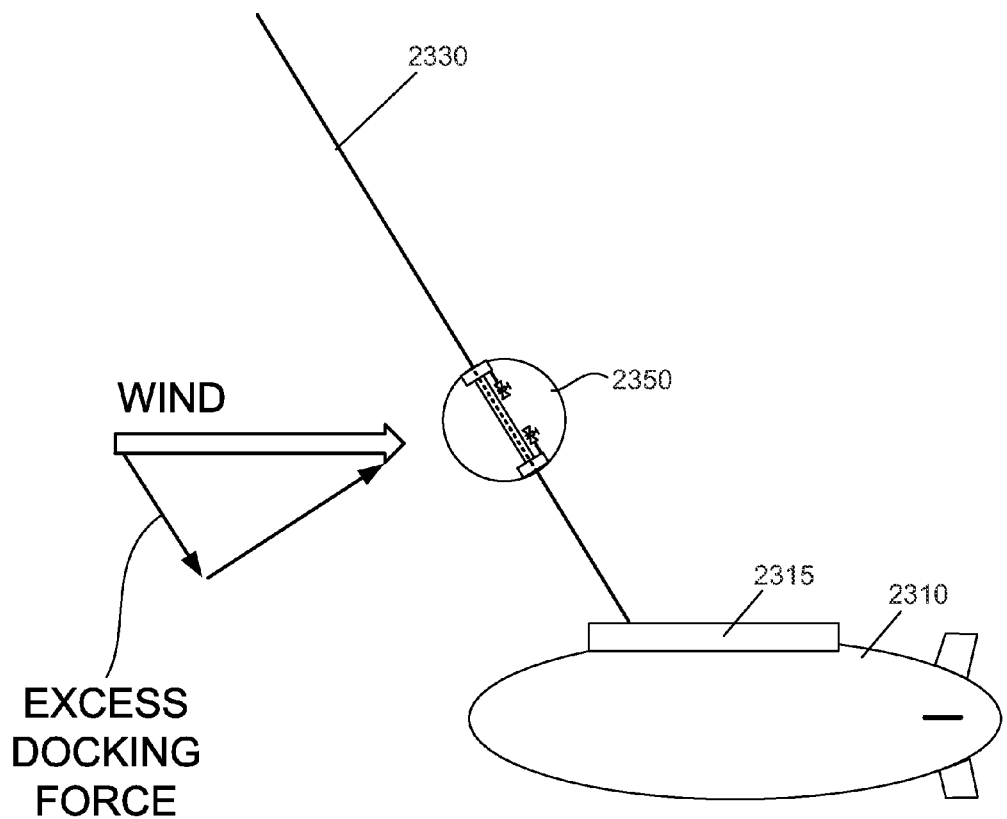
FIG. 28 is a force diagram showing wind-induced forces on the balloon shuttle as it is mated to a lower airship, according to one example of principles described herein.

First, it is useful to recognize that high winds operating on a tethered airship system with a balloon shuttle will tend to provide an additional "docking force" that promotes docking with each airship but impedes departure. This is clear from consideration of FIG. 28 that shows the direction of the wind for a typical operating scenario. Taking the balloon shuttle mated to the lower airship of FIG. 28 as an example, the ambient winds impart a force along the tether directed toward the airship. This tends to support docking but hamper departure. The force that must be overcome is a function of the wind speed, ambient atmospheric density, tether angle from the vertical (which is a function of wind speed at both the lower and upper airships, as well as the detailed design and current operating characteristics of the airships), and the drag characteristics of the balloon shuttle itself (which depend on the surface material, overall size, and degree of inflation). High winds tend to result in non-vertical tethers, and both high winds and non-vertical tethers contribute to the excess "docking force" that must be overcome to depart an airship. In many high-wind scenarios, the excess "docking force" will exceed the forces tending to favor departure (i.e., due to the positive or negative buoyancy of the balloon shuttle, considering the angle of the tether), and the shuttle will not depart without assistance.

One method that can be employed to enable departure in high wind conditions, in some meteorological scenarios, is to adjust tether length so that both the lower and upper airships are experiencing similar winds. In combination with the propulsion capability of the lower airship, the tether angle can be partially controlled and this may be sufficient to enable the balloon shuttle to depart its current docking point. The overall system may not be able to maintain station-keeping relative to a fixed point on the Earth during this exercise, but this may be an acceptable penalty if resupply is necessary.

Detailed simulation can be used to gain an appreciation for the relative periods of time during which resupply operations will be feasible without adjusting tether length, versus those periods of time when resupply will only be feasible with an adjustment of tether length (and possible loss of station-keeping), or not feasible at all (given the design constraints of the system).

Another method that can be used, for departure from the lower airship, is to heat the lifting gas of the balloon shuttle so that it increases its lifting volume, thereby increasing buoyancy and overcoming the "docking force" caused by the wind. The heating can be achieved with ambient solar incidence or an internal heater in the balloon shuttle powered by the lower airship, or passive heating by the lower airship (perhaps by painting the area under the balloon shuttle a dark color, or by circulating the lifting gas of the balloon shuttle through the lower airship and heating it with a gas heater contained within the lower airship). This method, regardless of the source of heat, takes advantage of the fact that the balloon shuttle is nominally quite "flaccid" when it is docked at the lower airship, with lifting volume on the order of only 1/20th of the volume it will display at maximum altitude. So there is no risk of damage to the balloon shuttle due to overpressure while it is in the vicinity of the lower airship, and buoyancy can be increased simply by increasing the temperature of the balloon shuttle's lifting gas, and thus its volume. However, it is important, when using this technique, to verify through analysis or simulation that an overpressure condition (due to excessively high gas temperature) will not occur as the balloon shuttle ascends to altitude.

If it becomes necessary to depart the upper airship under high winds, and the nominal negative buoyancy of the balloon shuttle (i.e., after performing its resupply mission) and the normal day/night temperature variations are inadequate to allow departure, the upper airship could pump off additional lifting gas and either store it internally in a high-pressure reservoir, or add it to its own lifting volume (if the additional pressure is tolerable), or vent it to the atmosphere. By any of these mechanisms, the balloon shuttle can be made more negatively buoyant, so as to enable undocking and descent down the tether.

Additional Embodiments

The preceding discussion has focused on a passive or substantially passive embodiment of a balloon shuttle system that has no active electronics or energy storage devices on board, or, if such apparatus exists, it is substantially unused during ascent and descent. However, additional operational and safety functionality can be achieved with a more capable shuttle that contains electronics, energy storage, and possibly other hardware. For example, a small tractor motor could be installed in each mating fixture of the balloon shuttle to allow the shuttle to pull itself either up or down the tether, if buoyancy forces are inadequate (e.g., to assist in departure from the upper or lower airship, and even to provide propulsion along the length of the tether). Additionally, a small brake assembly could be incorporated in the mating fixture(s) of the balloon shuttle, and used to limit the speed of ascent or descent if it becomes excessive, to facilitate safe docking, or even to stop the shuttle completely if such action is needed (e.g., to wait for temperature change to protect the shuttle from an overpressure condition during ascent). Onboard sensors, microcontrollers or computers, and communication equipment can provide for status monitoring and reporting and command reception. Active systems can also be used to help stow and/or secure the shuttle when it is docked at the lower airship for long periods of time. Electronically actuated components, such as valves and sensors, could be powered via electrical contacts in the mating fixtures of the upper and lower airships, and used/operated while the balloon shuttle is mated to one airship or the other.

While docked at the upper airship, after delivering its intended load of lifting gas, the balloon shuttle will be partially depleted and the total volume of lifting gas in the shuttle will be on the order of 16,000 m³ (for the numerical example discussed above). The balloon shuttle will, therefore, appear somewhat "flaccid" and its surface could become subject to fluttering and damage. In order to maintain a marginally positive differential pressure relative to ambient, in at least some embodiments, the balloon shuttle can be "compressed" along its axis to force the overall shape of the balloon shuttle into an approximation of a horn torus. For example, whereas a sphere of radius 17.5 m has a volume of approximately 22,000 m³, a horn torus with major and minor radii of 8.75 m has a volume of approximately 13,000 m³. This is about 3000 m³ less than the volume of lifting gas contained in the balloon shuttle after it has delivered its intended load (for the numerical example given above). Thus, by bringing the upper and lower mating fixtures of the balloon shuttle into closer proximity along the shuttle's axis, an approximate torus of proper internal volume can be achieved with marginally positive differential pressure relative to ambient (at maximum altitude). One way to achieve this goal with a passive shuttle as illustrated in FIG. 25B is to equip the docking fixture 2325 of the upper, airship with a small-diameter, adjustable-length sheath that can penetrate the length of the balloon shuttle's axis, releasably latch or capture the lower mating fixture 2354 of the balloon shuttle, and then retract back toward the docking fixture 2325 so as to reduce the separation distance between the mating fixtures 2352 and 2354 of the balloon shuttle. Thus, while docked at the upper airship and following resupply, the balloon shuttle can be forced into a shape that approximates a torus and maintains a marginally positive pressure differential relative to ambient atmospheric pressure.

The preceding discussion has focused primarily on a passive (or substantially passive) shuttle that delivers an increment of lifting gas in each "visit" to the upper airship, and which retains a significant volume of lifting gas for its downward journey, so that buoyancy is only slightly negative (see numerical example above). If it is desired to deliver a greater increment of lifting gas, potentially the entire contents of the balloon shuttle could be pumped into the upper airship. However, this would increase the magnitude of the negative buoyancy of the shuttle on descent. For the numerical example given above, the "negative buoyancy" would be roughly 100 kg (the empty weight of the shuttle) if it were fully depleted. Furthermore, whereas a partially-depleted shuttle experiences significant atmospheric drag on descent as its speed increases, a completely empty shuttle might experience very little drag, and consequently its speed—if unchecked—could become quite high. This could endanger the lower airship as well as, potentially, the tether. In an embodiment that is adapted to completely (or nearly completely) depleting the shuttle at the upper airship (as well as other embodiments), the downward velocity can be checked or controlled by use of a brake that is in contact with the tether (or by use of a brake that interacts with the tether in other ways, such as electromagnetically), or a parachute attached to the shuttle and designed and operated to manage the velocity on descent. Such systems could be controlled by use of a microcomputer, suitable actuators, and an energy storage device on the shuttle such as a battery. A regenerative braking system could be used to recharge the battery, or run other onboard systems, as the shuttle descends down the tether.

The embodiments discussed above do not include any pumps on the shuttle itself (the pumps being hosted on the upper and lower airship). However, in another embodiment, the shuttle comprises a pump that can pump the lifting gas from the shuttle into a higher-pressure environment such as the lifting volume of the upper airship, the lifting volume of the lower airship, or a high-pressure reservoir such as tank 2312 illustrated in FIG. 23 (or its equivalent). Power to drive the pump can be derived from the upper or lower airship via electrical contacts in the mating fixtures. In an embodiment where the balloon shuttle comprises a pump capable of delivering gas to the (possibly higher-pressure) lifting volume of the upper airship, the pump on the upper airship can be eliminated unless it is desired to be retained for redundancy and safety purposes.

Figure 29:
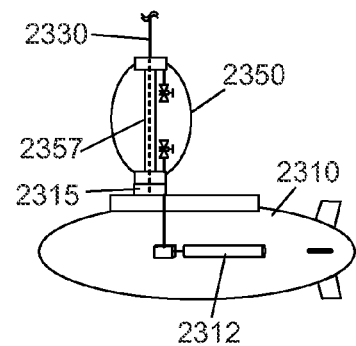
FIG. 29 is a flowchart of an illustrative method for replenishing lifting gas in an airship, according to one example of principles described herein.
Figure 29:
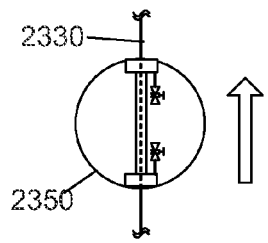
Figure 29:
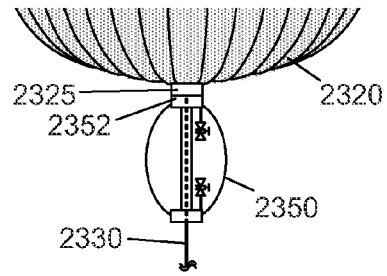
Figure 29:
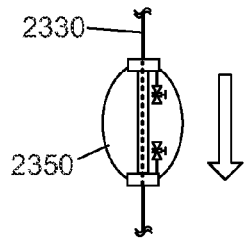
Figure 29:
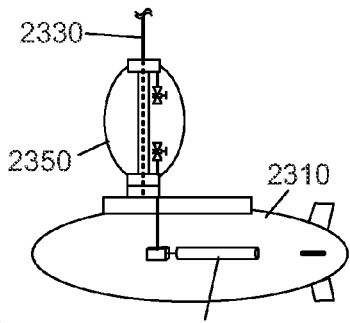

FIG. 29 illustrates a method for gas replenishment of an airship 2320. As discussed above, and in this example, a tether 2330 extends from an upper airship 2320 down to a lower airship 2310. In this example, the upper and lower airships along with the tether comprise a free flying airship system that is designed for long duration operations and stationkeeping via drag equalization (at least in part). In other embodiments, the airship 2320 may be tethered to a fixed anchor point or structure on the ground (i.e., instead of a lower airship), or to a movable anchor platform such as a truck or ship.

To replenish the lifting gas supply of an (upper) airship 2320, a balloon shuttle 2350 is inflated with lifting gas (step 2905). This lifting gas is supplied and transferred to the balloon shuttle 2350 by the lower airship 2310 (or a suitable structure and apparatus associated with a fixed ground anchor point or movable anchor platform). When inflated with lifting gas, the balloon shuttle 2350 is positively buoyant with sufficient buoyancy to reach the airship 2320 at the airship's current operating altitude. In some situations, the balloon shuttle 2350 moves upward along the tether 2330 to the airship 2320 under its own buoyant force.

In one implementation, the tether 2330 is threaded through a tube 2357 in the interior of the balloon shuttle 2350. As discussed above, the tube 2357 may have a variety of configurations, including internal reinforcements that approximately maintain the shape of the tube 2357 when the balloon shuttle 2350 is pressurized, and which also prevent contact with the tether.

The balloon shuttle 2350 is disengaged from the lower docking fixture 2315 (or suitable equivalent) and moves upward along the tether 2330 toward the airship 2320 (step 2910). A mating fixture 2352 on the balloon shuttle 2350 engages and mates with a docking fixture 2325 connected to the airship 2320. For example, the docking fixture 2325 may be located a distance down the tether 2330 from the airship 2320 as illustrated in FIGS. 23 and 27. Alternatively, the docking fixture may be located on, or proximate to, a lower portion of the airship 2320 as shown in FIG. 29.

The lifting gas from the balloon shuttle 2350 is transferred to the airship 2320 (step 2915). The transfer of lifting gas to the airship 2320 may be active or passive. For example, a pump may be used to transfer lifting gas from the balloon shuttle 2350 to the airship 2320. Additionally or alternatively, if the pressure of the lifting gas in the balloon shuttle 2350 is higher than a pressure of lifting gas in the airship 2320, this pressure differential can be used to transfer at least a portion of the lifting gas.

After transferring a portion of the lifting gas, the balloon shuttle 2350 is negatively buoyant and descends along the tether 2330 under its own weight (step 2920). As discussed above, the remaining lifting gas can prevent the balloon shuttle from descending too rapidly down the tether. In other embodiments, substantially all of the lifting gas can be transferred to the airship 2320 and the balloon shuttle 2350 can utilize a braking mechanism during descent.

Where wind conditions make motion of the balloon shuttle 2350 along the tether 2330 difficult, the free flying airship system may change its speed, direction, or altitude to reduce the aerodynamic forces experienced by the balloon shuttle 2350. In some implementations, the system may include active drive mechanisms that move the balloon shuttle 2350 away from a docking fixture associated with the upper or lower end of the tether, or use temporary buoyancy enhancement techniques (such as heating of the lifting gas) to move the balloon shuttle 2350 away from the docking fixture associated with the lower end of the tether. This can assist the balloon shuttle 2350 motion in adverse wind conditions. The balloon shuttle 2350 docks with the lower airship 2310 (step 2925). The lifting gas in the balloon shuttle 2350 can remain in the balloon shuttle or be moved into the lower airship. The balloon shuttle may remain outside the lower airship or be stowed internally.

The systems and methods described above transfer lifting gas from a lower airship to an upper airship to overcome the problem of gas leakage for the upper airship. However, this system reties on a gas reservoir on the lower airship. Eventually, this gas reservoir will become depleted. The principles and methods described below overcome the leakage of lifting gas, degradation/failure of individual components and systems, and provision of energy for housekeeping, propulsion and station-keeping (if required for the mission) and payload operations for long-endurance stratospheric operations.

Figure 30:
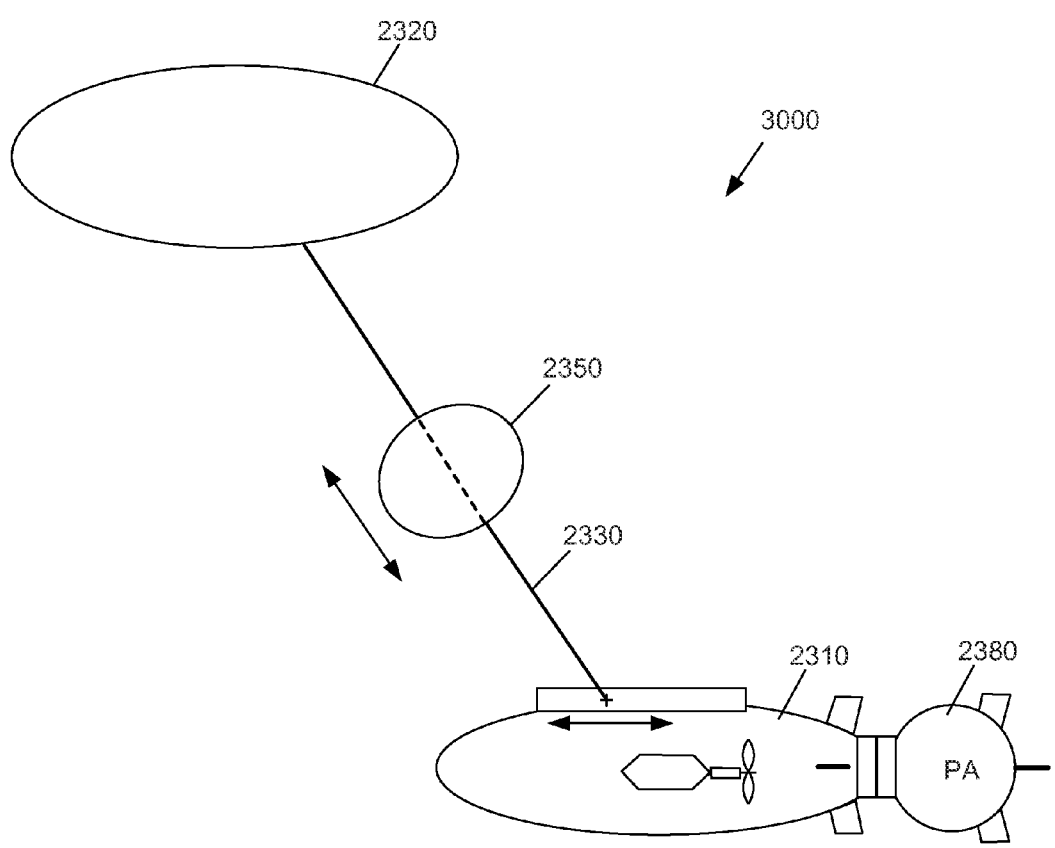
FIG. 30 is a schematic diagram identifying several of the subsystems of a tethered airship system designed to replenish the lifting gas of the upper airship with a reservoir of lifting gas carried by the lower airship, with the lower airship additionally "tending" an attached payload airship, according to one example of principles described herein.

FIG. 30 illustrates in schematic form a free flying tethered airship system with gas replenishment capability (for the upper logistics airship 2320), where the lower logistics airship 2310 is reversibly mated to a payload airship 2380 so as to provide at least electrical power, and possibly other services such as (without limitation) lifting gas replenishment, station-keeping, and relay communications. Lifting gas replenishment for the upper airship is achieved through the operation of a shuttle 2350, here illustrated as a balloon shuttle, running up and down along the tether 2330 between the lower airship 2310 and the upper airship 2320. As discussed above, the upper airship 2320 may comprise a variety of subsystems including a buoyant element such as a stratospheric balloon, a parafoil, a parachute, a solar collection/ energy storage and power distribution system, electronics, actuators, and the like. One of the purposes of the upper airship and its associated systems is to provide for drag compensation so as to minimize station-keeping power requirements for the system as a whole (including the lower airship). Operational altitudes of the upper airship and lower airship are selected such that wind forces on the lower airship are in a substantially different direction than wind forces on the upper airship. The tether connects the upper airship and lower airship to allow the difference in winds to be used to minimize energy required to maintain stationkeeping. While the tether will generally be discussed as a single element, the reader should understand that the tether may comprise multiple elements that together provide tension between the lower airship and upper airship (and possibly other functions).

The lower airship 2310 contains an energy and power distribution subsystem that may be based on renewable energy (e.g., solar), non-renewable (e.g., hydrogen fuel cells), or a hybrid system comprising both renewable and non-renewable sources. It also contains a replenishable reservoir of lifting gas in either cryogenic (cold liquid) or non-cryogenic (gaseous) form. The bulk of this disclosure will emphasize non-cryogenic handling of lifting gas, but this is not a limitation of the concepts and principles presented. If the energy and power subsystem uses non-renewable sources in whole or in part, the lower airship also contains a replenishable reservoir of fuel. If the fuel is the same as the lifting gas (e.g., hydrogen), optionally a single reservoir may be used for both purposes. In some embodiments, the lower airship may contain a plurality of mating fixtures. The lower airship 2310 may also comprise lift and drag adjustment subsystems such as a parafoil and parachute (not shown) that can be used to adjust lift and drag forces (in coordination with the upper airship) so as to minimize station-keeping power expenditures, and support maneuvering.

The payload airship 2380 is capable of maintaining an internal or external payload (not shown) at roughly a desired altitude, and may optionally provide for short-term unattended operations (i.e., when it is not mated to another airship such as the lower airship 2310 illustrated in the figure). Short-term unattended operations could include, for example, autonomous power generation capability for housekeeping and payload operations, attitude control and even propulsion and maneuvering (propulsion and maneuvering features are not explicitly shown). However, as illustrated, the payload airship 2380 is typically mated to another airship (in this case the lower airship 2310). The airships and mating fixtures are designed to provide for mating and demating and delivery of electrical power from the supporting airship (in this case lower airship 2310) to the payload airship 2380. In addition to electrical power, the airships and mating fixtures may be designed to deliver fluids (such as fuel and/or lifting gas, in liquid or gaseous form) from the supporting airship to the payload airship. FIG. 30 illustrates the payload airship 2380 as reversibly mated to the lower airship 2310 at the rear or stern of lower airship 2310; however, this is not a limitation of the inventive concept. The payload airship could also be mated at the front or bow of the lower airship 2310, or below (fully external carriage or in a "cavity" so that it is partially surrounded by the lower airship), or even above. The payload airship 2380 can be detached from the lower airship and replaced by another payload airship as necessary to meet mission requirements.

Depending on the mating location, one or more of the lift and drag adjustment subsystems described above may also be hosted by the payload airship 2380. For example, if the payload airship is mated at the stern of the lower airship 2310, the payload airship may support a parachute that can be used in lieu of the parachute previously described for the lower airship. Several alternative embodiments may be envisioned. For example, the tethered airship system by itself may not require a parachute on the lower airship (i.e., in the absence of a mated payload airship), but the system as a whole may require (or benefit from) a parachute when a payload airship is attached. In this case, the parachute could be supported on the payload airship alone and used when it is mated to the stern of the lower airship 110. Alternatively, the lower airship 2310 could host the parachute and the payload airship 2380 could be mated at the front (or bow) of the lower airship. In yet another embodiment, both the lower airship and the payload airship host a parachute, and the parachute of the lower airship is retracted and stowed safely prior to mating of the payload airship at the stern of the lower airship (i.e., so the lower airship uses its own parachute when there is no payload airship attached, and relies on the parachute hosted on the payload airship when there is a payload airship attached).

Similarly, if the payload airship is intended to mate with the lower airship in a "under-slung" configuration, multiple embodiments include a parafoil only on the payload airship, or on both the lower airship and the payload airship, with the lower airship's parafoil retracted and stowed safely prior to payload airship mating.

The inventive concept also includes embodiments where a parafoil and/or parachute is not used at all for the lower airship alone, or the mated combination of the lower airship and payload airship (although such devices are still hosted by the upper airship). These embodiments rely on propulsive maneuvering, and control of heading and attitude via rudder and elevator, and the like, to manage drag of the lower airship (and lower airship+payload airship) and support stationkeeping.

In some embodiments, the payload airship 2380 may have a plurality of mating fixtures and design features to allow trans-shipment of fluids from a first external airship (i.e., not the payload airship) to a second external airship, said external airships mated to a first and second of the plurality of mating fixtures. The design features may include plumbing, pumps and valves that can be employed to commandably deliver fluids (such as H2 in liquid or gaseous form) to e.g. internal storage devices (e.g., tanks) or another external airship.

As noted, the lower airship contains a reservoir of lifting gas to replenish the lifting gas of the upper airship using the shuttle 2350. The reservoir may also be used to replenish the lifting gas of the lower airship itself, and the lifting gas of the payload airship.

Figure 31:
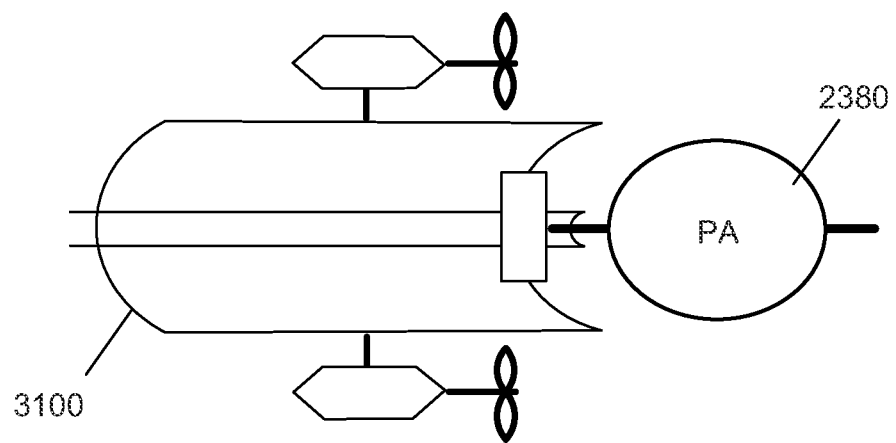
FIG. 31 illustrates a logistics airship mated to a payload airship, according to one example of principles described herein.

FIG. 31 illustrates a logistics airship 3100 (a "logistics tug") adapted to shuttle a payload airship 2380 between a ground station and a mission area, or between a ground station and another logistics airship (such as the lower airship 2310 previously discussed), or between and among logistics airships. The logistics tug comprises standard housekeeping and command and control subsystems, energy storage, power generation, attitude control, propulsion, and maneuvering subsystems adapted to allow it to perform these shuttle missions in the intended atmospheric environment. In keeping with its intended mission, the logistics tug is designed to provide for robust and reliable operation near the ground and in the lower atmosphere, so as to minimize risk to the payload airship. In some embodiments, as illustrated in FIG. 31 includes design features to grapple/mate to a payload airship at one point on the tug, and maneuver the payload airship to another point on the tug. This may be used, for example, to grapple a payload airship at the bow, move it to the stern, and subsequently move it back to the bow (or some other location). In some embodiments, the logistics tug is adapted to provide electrical power to the payload airship 2380 while the payload airship 2380 is mated to the logistics tug.

In some embodiments, the logistics tug additionally comprises a storage subsystem for fuel and/or lifting gas, and is adapted (through e.g. suitable plumbing, pumps, valves and mating fixtures) to deliver said fuel and/or lifting gas to another compatible airship through a mating fixture. The compatible airship could, for example, be the lower airship 2310 illustrated in FIG. 30, or the payload airship 2380 illustrated in FIG. 31. Thus, the logistics tug can, in some embodiments, perform the functions of a payload airship shuttle and a fuel/lifting gas tanker. It should be noted that the functions of a payload airship shuttle, and a fuel/lifting gas tanker, can also be performed by two separate logistics airships adapted to these individual tasks.

In some embodiments, the logistics tug comprises a plurality of mating fixtures, some or all of which are adapted to variously grapple a payload airship, mate to another logistics airship, provide electrical power, and exchange fluids in liquid or gaseous form.

Numerical Example

This section provides an exemplary sizing exercise for one embodiment of the inventive concept. It is not intended as a final or refined point design, which in any case would require a detailed consideration of currently-available materials and construction techniques, as well as detailed simulations of intended missions in the intended environments; instead, it is intended to expose some of the design considerations and tradeoffs particularly involved in the inventive concept.

For this sizing exercise, the payload airship, and the shuttle intended to resupply lifting gas to the upper airship, are assumed to be roughly spherical in shape. The payload airship is assumed to be mated to the front (or bow) of the lower airship 2310. As a consequence, the payload airship does not support a parachute. Instead, the lower airship 2310 supports both a parachute and a parafoil generally consistent with the concepts described in FIGS. 16-18.

The payload airship is sized first. It is assumed to carry a payload that weighs 212 kg and two mating fixtures that each weigh 50 kg. A first mating fixture is configured to detachably connect the payload airship to the logistics tug and a second mating fixture is configured to detachably connect the payload airship to the lower airship. These may have interchangeable functions; indeed, in some embodiments the two mating fixtures are of identical construction.

In an alternative embodiment, the payload airship has only a single mating fixture, and other system elements are employed to reliably demate the payload airship from one external airship (such as the logistics tug) and mate it to another external airship (such as the lower airship). This could include, for example, a robotic manipulator such as the robotic arms used on the Space Shuttle and International Space Station. With only a single mating fixture, trans-shipment of fluids through the payload airship could still be accommodated, although it would require temporary storage of fluid on the payload airship.

This payload airship is assumed to normally rely on power from a larger airship to support housekeeping and payload operations. However, in order to support autonomous operations (optional), in this example it has a solar power capability for continuous housekeeping and payload operations assumed to require 2 kW of power), and a hydrogen fuel storage and fuel cell capability for propulsion adapted to maintain an airspeed of 10 m/s for a period of 10 days.

In general the payload airship is designed to achieve neutral buoyancy in the working altitude range of the lower airship. In this example, the payload airship is designed for neutral buoyancy at 18 km altitude, with a relative pressure differential between interior lifting space and ambient of 1 kPa, but has a hull designed for 2 kPa so as to support operations up to an altitude of 19 km (consistent with minimum altitude separation of the lower and upper airships). The hull, inclusive of all structural features and lifting spaces, is assumed to have a weight which scales as 560 grams per square meter of surface area for a sphere with internal volume equal to the required lifting volume of the airship. This scaling factor and methodology is similar to the hull design of the lower airship are similar to the examples described above, although the payload airship is here assumed (for the numerical example) to be spherical instead of similar in shape to the NASA concept airship. The relatively robust hull, matching the sizing coefficient of the lower airship hull (which is similarly assumed to be 560 grams/m$^2$ of equivalent surface area), is intended to allow the payload airship to operate while mated to such a lower airship of a tethered airship system, considering the changes in altitude that may occur, without the use of internal ballonets to manage pressure changes (potentially, hull areal density and overall system weight could be reduced by relying on internal ballonets instead of a stronger hull). Ballonets could be used to contain atmospheric gases and keep them separated from a volume of lifting gas within which the ballonets are situated; alternatively, ballonets could be used to contain lifting gas and keep it separated from a volume of atmospheric gases within which they are situated.

It may be noted that, as the altitude separation of the tethered airship subsystem is reduced, the mated combination of the lower airship and the payload airship will both rise in altitude and become negatively buoyant. Because the two mated airships are not identical in size, the change in buoyancy will be different for the two airships. This can be compensated or mitigated, in some embodiments, by reliance on the control surfaces on either the lower airship or the payload airship (or both), or a change in the point at which the tether is effectively joined to the lower airship (and, therefore, the point of application of the tensile load).

The power subsystem of the payload airship is roughly sized to include 8 kg of solar arrays based on typical solar incidence in the continental United States, substantially horizontal orientation of the array, array efficiency of 20%, and a peak to average safety factor of 1.75. A weight budget of 25 kg for a storage battery is arbitrarily assigned, as is a weight budget of 6 kg for power management and distribution (PMAD).

In addition to the solar power and storage capability, the payload airship includes stored hydrogen fuel and a system of fuel cells sufficient to drive a propulsion system adapted to achieve an airspeed of 10 m/s for 10 days. This component is affected by overall airship size that, in turn, is affected by the weight of the supporting subsystems (including hydrogen storage, power generation and propulsion). It is assumed that fuel cells weight 6.1 kg/kW of output, are 50% efficient in terms of energy conversion, and that tankage has a mass fraction (H2 fuel versus total tankage plus fuel) of 0.268. The spherical payload airship is expected to have a higher drag coefficient than the lower airship or the NASA conceptual baseline from which the lower airship was derived; a drag coefficient of 0.1 is assumed for the payload airship in this example. Considering these factors, an iterative solution indicates that a payload airship of 40 m diameter could support all its associated subsystems including 69 kg for a propulsion subsystem and 616 kg of energy and power subsystems, of which 93 kg is fuel cells and 483 kg is tankage and stored hydrogen. Gross vehicle weight is slightly over 3800 kg. As will be appreciated, given the assessed weight of the energy and power subsystems, the overall design and sizing of this airship is dominated by the assumed need to support autonomous propulsion of 10 m/s airspeed for 10 days using stored hydrogen. Other design assumptions and mission requirements would affect the overall size, weight and cost of the airship, as would changes in assumed construction materials, sizing coefficients, and construction techniques (including, inter alia, overall shape). A greater reliance on solar energy could be examined for weight and cost impact within planned mission scenarios; however, this baseline is adopted for the present illustrative sizing exercise.

It is also noted that, as fuel is burned during autonomous operations, lifting gas can be vented (or used as a source of low-pressure fuel) in order to maintain neutral buoyancy close to a desired altitude.

The lower airship embodies the general concepts described above and also supports a mating fixture in its bow for mating with the payload airship. The lower airship may include a mating fixture in its bow for mating to the payload airship and can resupply lifting gas to the payload airship (as well as stored fuel, if required), and can support all the electrical power needs of the payload airship while mated. The lower airship can also accept hydrogen (or some other fuel and/or lifting gas) through its mating fixture (e.g., from the payload airship), for example when a shuttle airship (described below) transships hydrogen through a payload airship.

The lower airship is assumed to rely entirely on renewable energy (solar) for its own needs, the needs of the payload airship, and propulsive station keeping when drag compensation with the upper airship is inadequate or imperfect. It is assumed that the lower airship can maintain a relative airspeed of 20 m/s using its propulsive capability alone, considering the combined drag of itself and the payload airship. For this sizing exercise, the assumed drag coefficient is taken from the NASA concept baseline and the effective surface area is calculated as the surface area of a similarly-shaped airship with a total lifting volume equal to the combined volumes of the lower airship and the payload airship. Detailed aerodynamic simulation and testing can be readily performed to refine these assumptions. The size and weight of the propulsion system depends on, inter alia, the effective size and effective drag coefficient of the combination of the lower airship and the payload airship. The size and weight of the energy and power subsystem solar cells, battery, power distribution) depends on, inter alia, the need to support housekeeping and payload operations, and the expected need to rely on the propulsion system (that in turn requires an excess of energy collection and storage relative to baseline housekeeping and payload operations). Propulsion needs can be estimated with detailed mission simulations. For this sizing exercise, a propulsion subsystem of 171 kg, solar array complement of 115 kg, and battery of 375 kg are assumed. The total airship has a length of roughly 100 m, a lifting volume of roughly 45,000 m$^3$, a hull mass of roughly 4200 kg, and a gross vehicle weight of roughly 5100 kg including a parafoil, parachute and tether attachment/deployment mechanism.

For this sizing example, the upper airship and balloon shuttle (i.e., used to resupply lifting gas to the upper airship) are assumed to be similar in size, shape and construction to those described above. As with the other airship sizing estimates, detailed mission simulations and analysis can serve to refine the estimated size and weight of the airships and their associated subsystems.

The "logistics tug" used to transport the payload airship, and also perform resupply of consumables (e.g., hydrogen), may need to operate in peak winds for a significant period of time. Detailed mission simulation in the relevant operational environment is needed to develop a reasonable sizing estimate for this airship. However, as a single illustrative example, one among many alternative embodiments, the following assumptions may be adopted: a) it operates completely on stored hydrogen fuel; b) it supports payload airship housekeeping and payload operations while the payload airship is mated to it; c) the weight of the hull and lifting volume is estimated by multiplying the surface area of the lifting volume by 560 g/m$^2$; d) the overall shape of the airship is similar to that of the NASA Concept 12; e) it is intended for a mission duration of 30 days over which time its average power consumption is half of the value required to achieve an airspeed of 56 m/s; f) the airship supports two mating fixtures and is adapted to shift the payload airship from one mating fixture to the other, if desired, with the total for these features and adaptations weighing 150 kg; and g) the sizes of the propulsion system, fuel cell stack and hydrogen tankage are determined using the same sizing coefficients as for the lower airship discussed above.

If these assumptions are adopted for illustration, the logistics tug could be estimated at roughly 150 m in length, with a gross vehicle weight of about 15,400 kg, of which 8800 kg is hull, 2200 kg is propulsion, and 4200 kg is energy storage and power generation and distribution. It is emphasized that the logistics tug is preferably designed to operate in peak wind conditions for the operational environment of the lower airship of the tethered system (i.e. since it may have to rendezvous and mate with this airship, with or without a payload airship, under these conditions), but detailed mission simulations and requirements tradeoff analysis must still be performed to determine expected energy consumption over time, length of mission, and mitigation techniques if operating conditions exceed expectation. In other embodiments, the logistics tug may be intentionally designed to operate in conditions that are less severe (or more severe) than those baselined for the lower airship of the tethered airship system, or may be designed to operate in equivalent conditions, but for a shorter or longer period of time.

Operational Methods

Figure 32:
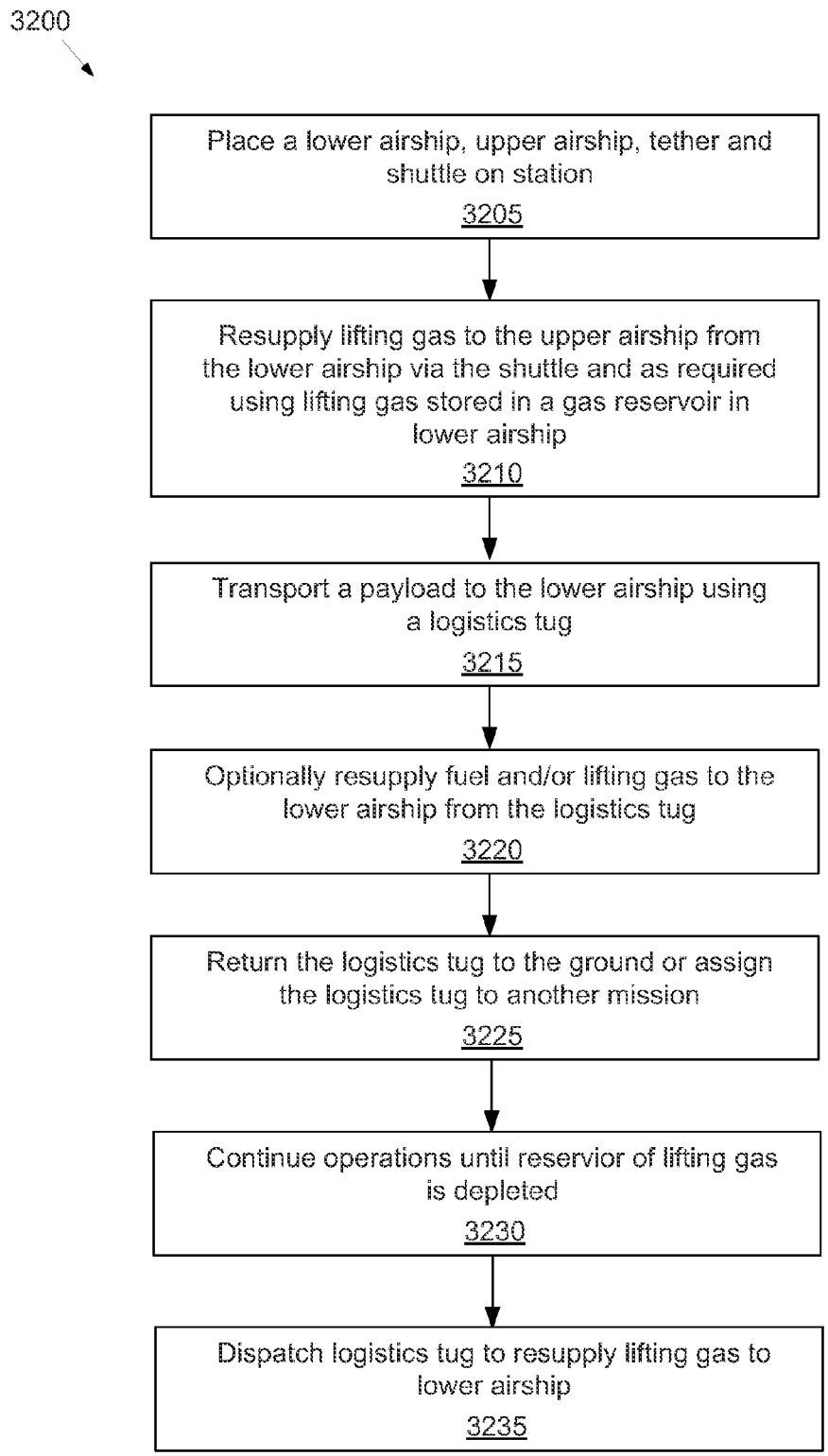
FIG. 32 is a flow chart of an illustrative method for long endurance stratospheric operations, according to one example of principles described herein.

FIG. 32 is a flowchart showing one illustrative method 300 for long term stratospheric airship operation. In typical operation, a tethered airship system comprising a lower airship 2310, upper airship 2320, tether 2330 and shuttle 2350 will be on-station in a desired mission area, but initially lack a payload airship adapted to perform a desired mission (step 3205). Although, it is noted that useful payloads can also be installed on the lower airship 110, upper airship 120, and potentially even the tether 130 and/or shuttle 150. According to the concepts described above, the tethered airship system is able to perform station-keeping in the mission area with minimal expenditure of fuel relying primarily on drag equalization between the lower and upper airships) and is able to resupply lifting gas to the upper airship from the lower airship, as required, retying on a stored gas reservoir in the lower airship 2310 and a shuttle subsystem 2350 riding on, or along, the tether as described above (step 3210).

At the start of a mission involving a payload airship, such as payload airship 2380, the payload airship is shuttled from the ground to the lower airship 2310 by a logistics airship 3100 (the logistics tug) (step 3215). Following rendezvous in the mission area, the logistics tug maneuvers (with the payload airship still mated/attached) to allow the payload airship to mate with the lower airship 2310. The logistics tug may also, optionally, resupply fuel and/or lifting gas to the lower airship 2310 through the payload airship, if the payload airship is adapted to trans-ship such fluids (step 3220). Alternatively (and still optionally) the logistics tug may resupply fuel and/or lifting gas to the lower airship 2310 through a separate mating fixture (if available) following demating/disengagement with the payload airship. Note that this separate mating fixture on the lower airship 2310 was not included in the numerical sizing example given above. Following completion of its delivery mission(s), the logistics tug may be returned to the ground or assigned to another mission (step 3225). The logistics airship 200 may also remain mated to the payload airship or the lower airship 110, pending a decision regarding further tasking.

For a period of time, the tethered airship system plus payload airship can perform a desired mission, maintain station-keeping, and maintain suitable inflation of the various airships by relying on the reservoir of lifting gas contained in the lower airship 2310. Eventually, the reservoir of lifting gas will be depleted or nearly depleted (step 3230). At this time, the logistics airship 3100 (or a similar airship adapted to support only a gas resupply mission) can be dispatched to resupply lifting gas to the lower airship (step 3235). Rendezvous, mating, and resupply may be performed using the same or similar techniques employed during (and/or following) initial delivery of the payload airship. The resupply procedure can be repeated indefinitely while the overall system remains free of significant failures. In this system, the upper airship 2320, the lower airship 2310 and the logistics tug 3100 can all be considered logistics airships that support the function of the payload airship 2380.

The inventive system provides long-term support for a payload in the stratosphere with a relatively low-cost support system. Preferably, the tethered airship system is able to provide station-keeping for itself and the attached payload with no expenditure of consumable fuels, relying only on relatively small and low-cost solar energy collection and storage systems, electric propulsion systems, and the like. Under normal operation, the only "consumable" (a resource that is depleted over time) is lifting gas. This is compensated primarily by a reservoir on the lower airship 2310, and other features to deliver this lifting gas to the lifting volume of the lower airship 2310, the upper airship 2320, and the payload airship. When the reservoir of lifting gas on the lower airship 2310 is depleted or nearly depleted, it can be resupplied by a logistics airship 3100 dispatched for this purpose. The tethered airship and the payload airship remain in the stratosphere for months or years at a time (potentially indefinitely), thereby minimizing the risks of operating near the ground and in the lower atmosphere. The only element of the system that is consistently exposed to these risks is the logistics airship 3100.

As generally described above, the tethered airship system and the logistics airship 3100 may be "standardized" so as to support a variety of payload airships. In this way, development costs of the tethered airship system and logistics airships can be amortized over multiple missions and a standard mating subsystem can be used by multiple payload airships (thereby simplifying the design of the payload airships). The payload airships are relatively low-cost compared to custom stratospheric systems with embedded payloads, since the payload airships are not required to autonomously provide station-keeping for long periods of time in high winds. Furthermore, barring spares that may be required for catastrophic failures, only a single payload airship (and payload) is required for continuous mission operations (instead of multiple airships and payloads as would be required if several airships with custom payloads are cycled between the ground and a mission area to provide continuous operational support). In one example, long term support of at least one free-flying payload-carrying airship with endurance greater than 30 days may include providing a plurality of logistics airships that are adapted to provide logistics support to the at least one free-flying payload-carrying airship. The free-flying payload-carrying airship may be one of: a single airship carrying a payload, a combined airship comprising a mated combination of at least one logistics airship and at least one payload airship, or a tethered airship comprising an upper airship and a lower airship where the lower airship is one of: a single airship or a mated combination of at least one logistics airship and a payload airship.

At least one of the logistics airships is dispatched to the at least one free-flying payload-carrying airship to provide logistics support. This logistics support may include at least one of fuel replenishment for propulsion or power generation, lifting gas replenishment, change-out of payloads, delivery of a payload airship, return of a payload airship to the ground, provision of thrust, or replacement of an existing logistics airship in a combined airship. In some implementations, a plurality of free-flying payload-carrying airships receives logistics support from the plurality of logistics airships. The plurality of free-flying payload-carrying airships may not all be identical with respect to size, weight, design, or payload. However, each of the logistics airships may be designed to mate with at least two of the non-identical payload-carrying airships. Ideally, the plurality of logistics airships are each designed to mate with a plurality of non-identical free-flying payload-carrying airships.

Additionally, the plurality of logistics airships may not all be identical to one another and may be configured to provide differing levels of logistics services according to their differing designs. The differing levels of logistics services may include at least one of differing quantities of fuel replenishment, differing quantities of lifting gas replenishment, differing ability to change-out payloads, differing ability to deliver a payload airship to an operational altitude, differing ability return the payload airship to the ground, and differing ability to provide thrust. For example, the differing quantities and abilities may include the possibility that a particular logistics airship may not provide one or more of the logistics services. For example, one logistics airship may act solely as a refueling tanker and does not provide lifting gas replenishment or payload change out. However, each logistics airship will have some level of at least one logistics service.

The launch of a logistics airship to may be responsive to any of a number of factors, including a request from a customer (typically the owner or operator of the payload-carrying airship) or a decision based on telemetry data originating from the free-flying payload-carrying airship.

Rendezvous and Altitude Matching

Under normal operation, the lower airship 2310 of the tethered airship system may operate over a range of altitudes including an altitude range of 18-19 km, even though the lower airship by itself is negatively buoyant at the higher altitude. In order to provide for rendezvous and altitude matching, the logistics airship 3100 (at least) should be designed to operate up to the highest design altitude of the lower airship 2310. The payload airship may also be designed to achieve neutral buoyancy at this highest operating altitude of the lower airship 2310, although this capability is not a required element of the inventive concept. If the payload airship is not designed to achieve neutral buoyancy at the highest design altitude of the lower airship 2310, the logistics airship 3100 should be designed to compensate for the marginal negative buoyancy (and asymmetric buoyancy for the combination of the logistics airship 3100 and payload airship) that results from this constraint, so as to assure reliable rendezvous, mating, and demating throughout the altitude range (for rendezvous, mating and demating) expected to be experienced during operation of the system. Suitable accommodation could include, without limitation, additional lifting volume, augmented propulsion systems, lifting surfaces (aerodynamic control surfaces) that can be employed when airspeed is greater than zero, and mating fixtures that are adjustable with respect to attitude or mounting angle.

Preferably, the logistics airship 3100 is adapted to adjust its nominal altitude within a design range by pumping lifting gas from a storage reservoir into a lifting volume (to increase altitude), or from a lifting volume into a storage reservoir (to decrease altitude), so as to perform altitude matching with the lower airship of the tethered airship system. Alternatively, in order to avoid the need for a high-pressure pump to move gas from a lifting volume into a storage reservoir, and recognizing that the logistics airship will be returned to the ground after a relatively short time, the logistics airship could vent lifting gas to the atmosphere in order to decrease altitude in a controlled manner.

Consideration of Subsystem Failures

If the payload suffers a substantial failure, the payload airship can be grappled (mated) with a logistics tug, demoted from the lower airship 2310, and returned to the ground for payload repair or replacement followed by a return to the mission area and re-mating with the lower airship 2310. Alternatively, the entire payload airship (with payload) could be replaced with an identical or similar payload airship (and payload) assembled for this purpose. A single logistics tug, if adapted to support two mating fixtures (or at least docking fixtures) could remove a failed or defective payload airship and provide a replacement payload airship (of similar or different design, or even adapted to a different mission) in a single trip.

If the inventive system is adapted to support rendezvous and mating with a logistics tug under worst-case environmental conditions e.g., peak wind) while the tethered airship system remains approximately at its previously-defined position, at least one of the logistics tugs in the system may have sufficient energy stores, power generation capability, and propulsion capability to also perform station-keeping under worst-case environmental conditions. However, if the tethered airship system is allowed to drift off-station, additional design tradeoffs become feasible. For example, the tethered airship system could be operated to allow a net drift in the direction of the winds experienced by the lower airship, thereby minimizing the propulsion power needed by the logistics tug for rendezvous and mating. Operating parameters of the tethered airship system, that could be adjusted to promote mocha net drift, include the length of the tether, the lift and drag generated by the parafoil(s), and the drag generated by the parachute(s).

If the payload airship loses buoyancy, the tethered combination including the payload airship will descend to a lower altitude. If the balloon shuttle 2350 is mated to the lower airship 2310 and is able to receive lifting gas from the storage reservoir on lower airship 2310, it may be partially or completely inflated to increase total buoyancy of the tandem combination. Also, the lower airship 2310 may use its aerodynamic control surfaces, and optionally its propulsion capability (depending on ambient conditions) to trim out the tandem combination, if required, to enable grappling and mating of the payload airship by the logistics tug for return of the payload airship to the ground for refurbishment/repair. Additionally, if the tether attachment/deployment subsystem on the lower airship is adapted to allow a change in the point of attachment (specifically, adjusting the longitudinal point at which tension forces are applied), a shift of the point of attachment may be employed to minimize the trim forces required. It should be noted that additional adaptations may be needed to properly manage a buoyancy failure; for example, rapid venting capability of the balloon shuttle to prevent unintended and excessive altitude gain of the tethered airship subsystem following demating of the payload airship. Also, the logistics airship 3100 may need to be designed (adapted) to rendezvous and mate with a lower airship (and payload airship) that has lost altitude, and may have asymmetric buoyancy and attitude, and it may also need to be designed (adapted) to maneuver reliably in the intended environment, and near the ground, while mated to a payload airship that has lost buoyancy.

If the payload and payload airship remains functional, and the tethered airship system maintains buoyancy but loses station-keeping capability due to a hardware failure, a logistics tug can be tasked to rendezvous with the system wherever it may have drifted, and return the payload airship (with its payload) to the mission area for short-term operations consistent with the energy stores of the logistics tug, pending delivery of a replacement tethered airship system that could support long-term operations. Of course, if such replacement cannot be achieved within the endurance of the logistics tug, it could be relieved by a second (or additional) logistics tug(s), or returned to the ground to await the availability of additional assets.

If the lower airship suffers a catastrophic toss of buoyancy, the payload airship can be demoted (either by command from the ground or autonomously) so that it remains at (or returns to) roughly the correct operational altitude. It may drift with the wind if it has no autonomous propulsion capability (or if the prevailing winds exceed its propulsion capability). A limited propulsion capability is beneficial, even if it cannot overcome the ambient wind, since it allows the payload airship to at least maintain heading and attitude control (e.g., using standard aerodynamic control surfaces and its nonzero airspeed), thereby facilitating eventual rendezvous and mating with a logistics tug dispatched to recover it. It can then, e.g., be returned to the mission area for mating with a replacement tethered airship system.

If the upper airship suffers a catastrophic toss of buoyancy, the tandem combination of the lower airship and the payload airship may be unable to maintain station-keeping (depending on the ambient conditions) and may descend to a lower altitude since the weight of the upper airship and tether is now borne entirely by the lower airship. To overcome this problem, the tether can be retracted (reeled-in) and the upper airship can be jettisoned by releasing a latch, firing a set of explosive bolts, or other method (ideally at a place and time that minimizes danger to persons or property on the ground). Also, if the shuttle 2350 is still attached to the lower airship and if it is still functional, it can be partially filled with lifting gas, while remaining latched/mated to the lower airship, to counterbalance the weight of the tether now borne by the lower airship. A logistics tug can rendezvous and mate with the payload airship, allowing the lower airship to dentate and return to base (if it is able). The payload airship can then e.g. be returned to the mission area for mating with a replacement tethered airship system.

Similarly, if the tether fails, the lower airship and upper airship are no longer connected and the tandem combination of the lower airship and the payload airship may be unable to maintain station-keeping (depending on the ambient conditions) and may descend to a lower altitude since the weight of the remaining portion of the tether is now borne entirely by the lower airship. The portion of the tether that is still attached to the lower airship can be retracted (reeled-in). Also, if the shuttle 2350 is still attached to the lower airship and if it is still functional, it can be partially filled with lifting gas, white remaining latched/mated to the lower airship, to counterbalance the weight of the tether. A logistics tug can rendezvous and mate with the payload airship, allowing the lower airship to dentate and return to base (if it is able). The payload airship can then e.g. returned to the mission area for mating with a replacement tethered airship system.

If the shuttle 2350 fails, no immediate emergency response is warranted but the tethered airship system must be replaced over time (or the shuttle must be replaced) since the upper airship will steadily lose buoyancy. The entire tethered airship system can be replaced by maneuvering a replacement tethered airship system into the mission area and transferring the payload airship from the damaged system to the undamaged system. This can be achieved with the assistance of a logistics tug, although in some embodiments the transfer could be achieved by action of the payload airship and the two tethered airship systems alone. Following transfer of the payload airship to the undamaged tethered airship system, the damaged system can be maneuvered to a location where the upper airship can be safely jettisoned and ditched, the tether retraced (reeled-in), and the lower airship returned to base for repair. If the system is designed such that the lower airship alone cannot be safely recovered while carrying the tether, the tether can be deployed to its maximum length (possibly relying on commanded excess lateral drag forces to separate the lower and upper airships) and cut at or near its point of attachment to the tether attachment/deployment subsystem of the lower airship. In an alternative embodiment, the lower airship is designed to be safely recovered while carrying the full weight of the tether.

Alternative Embodiments and Operations Concepts

In one alternative embodiment, there is no payload airship although there is a payload that is delivered to a tethered airship system and mated directly to the lower airship (i.e., without being supported by a payload airship designed to counteract the weight of the payload). This external payload could either be retrieved by a logistics tug at a later date, or simply jettisoned when e.g. its mission is completed.

In another alternative embodiment, a "payload package" is attached. The payload package may comprise multiple payloads that can be separately retrieved or jettisoned. In another alternative embodiment, the lower airship comprises multiple mating ports so as to accommodate multiple external payloads or payload packages.

In one alternative embodiment, all electrical power needs of the tethered airship system with attached payload airship (and payload) are satisfied with solar arrays and electrical storage and distribution systems on the lower airship, upper airship and potentially the payload airship. In another embodiment, at least a portion of the aforementioned electrical power needs are satisfied by hydrogen fuel cells relying on stored hydrogen. In this embodiment, a single reservoir may optionally be used on the lower airship for replenishment of lifting gas as well as fuel supply for power generation.

In one alternative embodiment, airships that are "mated" to one another are not required to be "docked" to one another. For example, a payload airship may be mated to a logistics airship (either a logistics tug or a lower airship of a tethered system) via a flexible member that does not provide for transfer of torque. It should also be noted that the logistics tug 3100 can be used as an "aerial tugboat" to provide augmented propulsion and maneuvering to the lower airship.

It should also be noted that lifting gas (e.g., hydrogen) could be transported by the logistics tug 3100 as a cryogenic liquid, and transferred to the lower airship and payload airship (directly or via trans-shipment) as a cryogenic liquid. This could potentially increase the hydrogen mass fraction of the storage reservoir on the lower airship, but would also have an impact on the mating technology, valves, pumps, and plumbing. Additionally, such a system would either have to accommodate boil-off of cryogen over time (this has an adverse impact on endurance, although the lifetime of the cryogenic reservoir could be sufficient to mitigate this concern), or support a cooling system to keep the cryogenic reservoir at a suitable temperature to prevent boil-off. Such a cooling system would place another load on the energy and power distribution system.

If lifting gas is handled as a cryogenic liquid, the cryogenic adaptations could be limited to the logistics tug and the lower airship alone (relying on liquid-to-gas transformation on the lower airship and gas-phase handling of lifting gas for the payload airship, balloon shuttle, and upper airship), or extended to some or all of these other airships. This could, for example, allow a relatively compact and light-weight reservoir of lifting gas on the upper airship (although as noted above, the system would have to deal with boil-off or active cooling, as well as cryogenic mating fixtures, valves, pumps and plumbing). Also, a balloon shuttle that transfers only cryogenic liquids would get more buoyant instead of less buoyant following transfer, so other accommodations would be necessary (e.g., venting of lifting gas from the balloon shuttle, or transfer of lifting gas from the balloon shuttle to the upper airship in addition to the transfer of the cryogenic liquid, or a tractor motor to pull the balloon airship down the tether despite its positive buoyancy).

One advantage of a cryogenic storage system is that the cryogenic liquid (or cold gas resulting from boil-off) could be used to cool certain instruments, such as infra-red cameras and the like, without requiring a separate cooling system.

With suitable enhancement of the mating structures and supporting apparatus, it would also be possible to transport and transfer lifting gas as a (relatively high-temperature) gas, and transport and transfer a cryogenic liquid, if required, for the same or other purposes such as payload operations.

In conclusion, the long term stratospheric airship systems and methods describe above provide for indefinite airship operations by replenishing/redistributing lifting gas, replacing/mitigating component and subsystem failures, and replenishing fuel supplies. Further, the long term stratospheric airship systems and methods minimize the overall cost and risk involved with airship operations by providing modularity, reducing energy required for stationkeeping, allowing modular airships to be replaced as necessary, and reducing the need for airship operations near the ground.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A long endurance airship system comprising:
   a payload airship comprising a payload and a lifting volume, the lifting volume sufficient for the payload airship to achieve neutral buoyancy at an operational altitude above the ground; and
   first logistics airship mechanically joined to the payload airship to form a first combined airship, wherein:
   the first logistics airship is adapted to operate at altitudes between ground level and the operational altitude of the payload airship, including travel to and from a selected base of operation, while optionally detached from the payload airship;
   the payload airship and the logistics airship having design capabilities differing by at least a factor of two with regard to at least one of: power generation capability, propulsion capability, endurance capability, and lift capability; and
   the first combined airship is free flying, lighter-than-air, and configured to remain aloft for greater than 30 days without physical connection to the ground.

2. The system of claim 1, in which the first combined airship is configured for stationkeeping at a predetermined station during meteorological conditions with wind speeds below a predetermined threshold; the system further comprising a reconfiguration of the first combined airship to form a second combined airship comprising the payload airship and at least a second logistics airship, the second combined airship being configured for stationkeeping at the predetermined station in meteorological conditions with wind speeds above the predetermined threshold.

3. The system of claim 1, in which the first combined airship operates at an altitude above 15 kilometers.

4. The system of claim 1, in which the payload airship and first logistics airship are mechanically joined with a flexible umbilical adapted to support the transfer of at least one of: electrical power, lifting gas, other gases, liquid fuel, other liquids, and data.

5. The system of claim 4, in which the combined airship is adapted to support a drafting mode of flight that reduces drag on the combined airship to a value that is less than the sum of the drags on the two airships individually.

6. The system of claim 1, in which the payload airship and the first logistics airship are reversibly mated together, in which the payload airship and first logistics airship support rendezvous, mating, and demating, while in flight.

7. The system of claim 1, in which a mate between the payload airship and first logistics airship is configured to transfer structural loads between the payload airship and the first logistics airship.

8. The system of claim 1, in which the first combined airship has at least twice the station keeping endurance of the payload airship alone, in the same meteorological conditions.

9. The system of claim 1, further comprising a second logistics airship configured to reversibly mate with the payload airship.

10. A free-flying, lighter-than-air, combined airship comprising:
    a lower airship;
    an upper airship; and
    a tether connecting the lower airship and the upper airship;
    in which:
        the upper airship is configured to be equiliberally buoyant, while carrying the tether, in a first altitude range; and
        the lower airship is configured to be equiliberally buoyant in a second altitude range while carrying a payload, the first altitude range being higher than the second altitude range, such that the upper airship is at least one kilometer above the lower airship and the tether mechanically transmits drag forces and lift forces between the airships.

11. The system of claim 10, in which the first altitude range is between 20 and 50 kilometers above sea level and the second altitude range is between 10 and 30 kilometers above sea level.

12. The system of claim 10, further comprising a balloon shuttle configured to:
    travel up the tether toward the upper airship while carrying a payload of lifting gas for the upper airship; and
    travel down the tether toward the lower airship after delivering a payload of lifting gas to the upper airship.

13. The system of claim 12, in which the lower airship comprises a supply of lifting gas for transfer to the balloon shuttle.

14. The system of claim 10, in which the lower airship is configured to receive replenishment from a logistics airship, the replenishment comprising at least one of: fuel, lifting gas, and new payloads.

15. The system of claim 10, in which the lower airship comprises a mated pair of a payload airship and a logistics airship, wherein said payload airship is configured to be equiliberally buoyant in said second altitude range while carrying a payload, and said logistics airship is configured to be equiliberally buoyant in a third altitude range that at least partially overlaps said second altitude range, in which a lower end of the tether is connected to the payload airship.

16. The system of claim 10, in which the lower airship comprises a mated pair of a payload airship and a logistics airship, wherein said payload airship is configured to be equiliberally buoyant in said second altitude range while carrying a payload, and said logistics airship is configured to be equiliberally buoyant in a third altitude range that at least partially overlaps said second altitude range, in which a lower end of the tether is connected to the logistics airship.

17. The system of claim 10, wherein at least one of the airships further comprises an apparatus to adjust its angle of attack relative to the wind.

18. The system of claim 10, wherein at least one of the airships further comprises a parachute to provide a controllable amount of drag, wherein the parachute is connected to one of: the airship, the tether connected to the airship, or the airship and the tether.

19. The system of claim 10, wherein at least one of the airships further comprises a parafoil to provide a controllable amount of lift and drag wherein the parafoil is connected to one of: the airship, the tether, or the airship and the tether.

20. The system of claim 10, in which at least two of the airships further comprise both a parachute and parafoil to provide by their joint operation a controllable amount of lift and drag.

21. The system of claim 10, in which at least one of the airships attached to the tether comprises a tether deployment and retraction mechanism adapted to deploy and retract the tether to a controllable length.

22. The system of claim 21, further comprising a heater adapted to warm the tether as the tether is deployed from and retracted into said deployment and retraction mechanism.

23. A method for providing aeronautical operations with a free-flying lighter-than-air, combined airship, the method comprising:
    monitoring available resource reserves of at least one of: fuel, lifting gas, or stored energy capacity of the combined airship while the combined airship is airborne, wherein the combined airship comprises at least two airships, wherein at least one airship is adapted to mate and demate from at least one other airship while in flight and wherein capabilities of the combined airship with regard to achievable thrust, achievable lift, and achievable drag, in various meteorological conditions, are known within uncertainty limits;
    forecasting future meteorological conditions along a projected route of the combined airship;
    determining if the available resource reserves and capabilities of the combined airship are sufficient for operation along the projected route over a planning period during the forecasted meteorological conditions;
    if the available resource reserves and capabilities of the combined airship are not sufficient to operate along the projected route over the planning period, launching a relief logistics airship to provide additional resources, the additional resources comprising at least one of: additional thrust capability, additional fuel, additional lifting gas, additional stored energy, additional energy capacity, or additional electrical power; and
    performing rendezvous and reconfiguring the combined airship to include resources from the relief logistics airship such that the reconfigured combined airship has additional resources and capabilities for operation along the projected route.

24. The method of claim 23, in which the additional resources are sufficient for operation along the projected route during the forecasted meteorological conditions over the planning period.

25. The method of claim 23, in which the combined airship comprises a mated pair of a first logistics airship and a payload airship, where reconfiguring the combined airship comprises at least one of:
    mating the relief logistics airship to the first logistics airship which is mated to the payload airship;
    demating the first logistics airship from the payload airship and mating the relief logistics airship to the payload airship;
    transferring lifting gas from the relief logistics airship to the first logistics airship;
    transferring lifting gas from the relief logistics airship to the payload airship;
    transferring fuel from the relief logistics airship to the first logistics airship;

transferring fuel from the relief logistics airship to the payload airship;

transferring electrical power from the relief logistics airship to the first logistics airship; and transferring electrical power from the relief logistics airship to the payload airship.

26. The method of claim 23, in which the combined airship comprises an upper airship at a first altitude and a lower airship at a second altitude, the upper airship and the lower airship being connected by a tether, in which the first altitude and second altitude are vertically separated by at least five kilometers; and in which operation along the projected route comprises altering the aerodynamic characteristics of at least one of the upper airship and lower airship to reduce the rate of energy consumption of the combined airship needed to operate along the projected route.

27. The method of claim 26, in which winds at the first altitude and winds at the second altitude are traveling in substantially different directions and in which altering the aerodynamic characteristics of the combined airship comprises at least one of: altering the heading of one of the airships, deploying a parachute, altering aerodynamic characteristics of the parachute, deploying a parafoil, altering the aerodynamic characteristics of the parafoil, and changing at least one of the first altitude and the second altitude.

28. The method of claim 26, further comprising replenishing lifting gas in the upper airship by:

inflating a balloon shuttle with lifting gas;

moving the balloon shuttle upward along the tether toward the upper airship; and transferring the lifting gas from the balloon shuttle to the upper airship.

29. The method of claim 26, wherein the lower airship comprises a mated pair of a first logistics airship and a payload airship, wherein reconfiguring the combined airship comprises at least one of:

demating the first logistics airship from the payload airship;

mating the relief logistics airship to the payload airship;

mating the relief logistics airship to the first logistics airship which is mated to the payload airship;

transferring lifting gas from the relief logistics airship to the first logistics airship;

transferring lifting gas from the relief logistics airship to the payload airship;

transferring fuel from the relief logistics airship to the first logistics airship;

transferring fuel from the relief logistics airship to the payload airship;

transferring electrical power from the relief logistics airship to the first logistics airship; or transferring electrical power from the relief logistics airship to the payload airship.

30. The method of claim 26, wherein at least one of the first altitude and the second altitude comprise a stratospheric altitude.

31. The method of claim 23, where the projected path comprises at least one of: a route between waypoints, stationkeeping at a station, stationkeeping within a range around a station, and stationkeeping at a station by traveling a route around the station.

32. The method of claim 23, wherein reconfiguring the combined airship to include resources from the relief logistics airship comprises a soft mate between the combined airship and the relief logistics airship.

33. The method of claim 23, wherein reconfiguring the combined airship to include resources from the relief logistics airship comprises a hard mate between the combined airship and the relief logistics airship, wherein resources from the relief logistics airship comprise propulsive force transferred through the hard mate.

34. A method of providing logistics support to at least one free-flying payload-carrying airship with endurance greater than 30 days, the method comprising:

providing a plurality of logistics airships that are adapted to provide logistics support to the at least one free-flying payload-carrying airship, and dispatching at least one of said logistics airships to the at least one free-flying payload-carrying airship to provide logistics support.

35. The method of claim 34, wherein the logistics support comprises at least one of: fuel replenishment for propulsion or power generation, lifting gas replenishment, change-out of payloads, delivery of a payload airship, return of a payload airship to the ground, provision of thrust, or replacement of an existing logistics airship in a combined airship.

36. The method of claim 34, wherein the free-flying payload-carrying airship comprises one of: a single airship carrying a payload, a combined airship comprising a mated combination of at least one logistics airship and at least one payload airship, or a tethered airship comprising an upper airship and a lower airship where the lower airship one of: a single airship or a mated combination of at least one logistics airship and a payload airship.

37. The method of claim 34, wherein a plurality of free-flying payload-carrying airships receive logistics support from the plurality of logistics airships.

38. The method of claim 34, wherein the plurality of free-flying payload-carrying airships are not all identical with respect to size, weight, design, or payload, and at least one of the logistics airships is designed to mate with at least two of the non-identical payload-carrying airships.

39. The method of claim 38, wherein a plurality of logistics airships are each designed to mate with a plurality of non-identical free-flying payload-carrying airships.

40. The method of claim 34, wherein the plurality of logistics airships are not all identical to one another and each is configured to provide logistics services with respect to at least one of: fuel replenishment, lifting gas replenishment, change-out payloads, delivering a payload airship to an operational altitude, returning the payload airship to the ground, and thrust.

41. The method of claim 34, wherein the dispatch of the logistics airship is responsive to a request from a customer.

42. The method of claim 34, wherein the dispatch of the logistics airship is responsive to a decision process based on telemetry data originated from the free-flying payload-carrying airship.

* * * * *